United States Patent
Roper, Jr. et al.

(10) Patent No.: US 12,461,717 B2
(45) Date of Patent: Nov. 4, 2025

(54) SOFTWARE-CODE-DEFINED DIGITAL THREADS IN DIGITAL ENGINEERING SYSTEMS WITH ARTIFICIAL INTELLIGENCE (AI) ASSISTANCE

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Peter Galvin, Watertown, MA (US); Baha aldeen E. A. Abunojaim, Roslindale, MA (US); Pranav Sumanth Doijode, Rijswijk (NL); Najem Aldeen Abu Rmaileh, Amman (JO)

(73) Assignee: Istari Digital, Inc., Charleston, SC (US)

( * ) Notice: Subject to any disclaimer, the term of this patent is extended or adjusted under 35 U.S.C. 154(b) by 0 days.

(21) Appl. No.: 18/730,782

(22) PCT Filed: Mar. 10, 2024

(86) PCT No.: PCT/US2024/019297
§ 371 (c)(1),
(2) Date: Jul. 21, 2024

(87) PCT Pub. No.: WO2024/191882
PCT Pub. Date: Sep. 19, 2024

(65) Prior Publication Data
US 2025/0165226 A1 May 22, 2025

Related U.S. Application Data

(60) Provisional application No. 63/451,577, filed on Mar. 11, 2023, provisional application No. 63/516,624, (Continued)

(51) Int. Cl.
*G06F 9/44* (2018.01)
*G06F 8/30* (2018.01)
(Continued)

(52) U.S. Cl.
CPC ............... *G06F 8/30* (2013.01); *G06N 20/00* (2019.01)

(58) Field of Classification Search
CPC .................. G06F 8/30; G06N 20/00
See application file for complete search history.

(56) References Cited

U.S. PATENT DOCUMENTS 11,194,966 B1 * 12/2021 Appel ..................... G06F 40/44
2019/0188056 A1 6/2019 Dimascio et al.
(Continued)

FOREIGN PATENT DOCUMENTS

CN 115114462 A * 9/2022
EP 4120068 A1 * 1/2023 ............... G06F 8/22

OTHER PUBLICATIONS

Yuede Ji, BugGraph: Differentiating Source-Binary Code Similarity with Graph Triplet-Loss Network, 2020, pp. 1-14. https://www2.seas.gwu.edu/~howie/publications/BugGraph-ASIACCS21.pdf (Year: 2020).*

(Continued)

*Primary Examiner* — Mongbao Nguyen
(74) *Attorney, Agent, or Firm* — American Patent Agency PC; Daniar Hussain; Stephen M. Hou

(57) ABSTRACT

Methods and systems for generating digital threads that connect models and software tools for an interconnected digital engineering and certification ecosystem are provided. In one embodiment, a process for generating a software-code-defined digital thread includes receiving a first model representation of a first engineering model, a second model representation of a second engineering model, and an intent (Continued)

input. Determining, using a machine learning (ML) model, one or more model endpoints in the first and the second model representations. Generating, using a script-generating ML model, a platform orchestration script that accomplishes the intent input by connecting the first model representation and the second model representation, using the one or more model endpoints. Finally, storing the platform orchestration script as the software-code-defined digital thread. The digital threading of digital engineering models, with and without AI assistance, leads to exponential increases in efficiency of designing, testing, certifying, manufacturing, and operating physical products, allowing physical products to be made at digital speeds.

22 Claims, 32 Drawing Sheets

Related U.S. Application Data filed on Jul. 31, 2023, provisional application No. 63/511,583, filed on Jun. 30, 2023, provisional application No. 63/451,545, filed on Mar. 10, 2023, provisional application No. 63/462,988, filed on Apr. 29, 2023.

(51) Int. Cl.
*G06F 9/445* (2018.01)
*G06F 9/455* (2018.01)
*G06N 20/00* (2019.01)

(56) References Cited

U.S. PATENT DOCUMENTS

| | | |
|---|---|---|
| 2021/0191696 A1 | 6/2021 | Ibarra Von Borstel et al. |
| 2022/0035605 A1* | 2/2022 | Ibarra Von Borstel ............... G06F 8/425 |
| 2022/0245153 A1 | 8/2022 | Bangalore et al. |
| 2024/0273398 A1* | 8/2024 | Acharya ............... G06N 20/00 |

OTHER PUBLICATIONS

Jeremy Leipzig, The role of metadata in reproducible computational research, 2021, pp. 1-28. chrome-extension://efaidnbmnn-nibpcajpcglclefindmkaj/https://pmc.ncbi.nlm.nih.gov/articles/PMC8441584/pdf/main.pdf (Year: 2021).*
Ying Ouyang, A Brief Survey and Implementation on Refinement for Intent-Driven Networking, 2021, pp. 1-9. https://ieeexplore.ieee.org/stamp/stamp.jsp?tp=&arnumber=9687516 (Year: 2021).*
Fuji Ren, Intention Detection Based on Siamese Neural Network With Triplet Loss, 2020, pp. 1-13. https://ieeexplore.ieee.org/stamp/stamp.jsp?tp=&arnumber=9082602 (Year: 2020).*
English translation, Brain (EP 4120068 A1), 2023, pp. 1-10. (Year: 2023).*
English translation, Yuan (CN 115114462 A), 2022, pp. 1-21. (Year: 2022).*
Bajaj et al., "System Lifecycle Handler—Spinning a Digital Thread for Manufacturing", 28th Annual INCOSE International Symposium, Washington, DC, Jul. 7-12, 2018.
PCT/US24/19297—International Search Report, mailed on Jul. 9, 2024.

* cited by examiner

FIG. 28

SOFTWARE-CODE-DEFINED DIGITAL THREADS IN DIGITAL ENGINEERING SYSTEMS WITH ARTIFICIAL INTELLIGENCE (AI) ASSISTANCE

REFERENCE TO RELATED APPLICATIONS

If an Application Data Sheet ("ADS") or PCT Request Form ("Request") has been filed on the filing date of this application, it is incorporated by reference herein. Any applications claimed on the ADS or Request for priority under 35 U.S.C. §§ 119, 120, 121, or 365 (c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

PCT patent application No. PCT/US24/18278, filed on Mar. 3, 2024, entitled "Secure and Scalable Model Splicing of Digital Engineering Models for Software-Code-Defined Digital Threads," describes model splicing for digital engineering platforms.

PCT patent application No. PCT/US24/14030, filed on Feb. 1, 2024, entitled "Artificial Intelligence (AI) Assisted Digital Documentation for Digital Engineering," describes AI-assisted documentation for digital engineering platforms.

U.S. provisional patent application No. 63/442,659, filed on Feb. 1, 2023, entitled "AI-Assisted Digital Documentation for Digital Engineering with Supporting Systems and Methods," describes AI-assistance tools for digital engineering (DE), including modeling and simulation applications, and the certification of digitally engineered products.

U.S. provisional patent application No. 63/451,545, filed on Mar. 10, 2023, entitled "Digital Threads in Digital Engineering Systems, and Supporting AI-Assisted Digital Thread Generation," describes model splicer and digital threading technology.

U.S. provisional patent application No. 63/451,577, filed on Mar. 11, 2023, entitled "Model Splicer and Microservice Architecture for Digital Engineering," describes model splicer technology.

U.S. provisional patent application No. 63/462,988, filed on Apr. 29, 2023, also entitled "Model Splicer and Microservice Architecture for Digital Engineering," describes model splicer technology.

U.S. provisional patent application No. 63/511,583, filed on Jun. 30, 2023, entitled "AI-Assisted Model Splicer Generation for Digital Engineering," describes model splicer technology with AI-assistance.

U.S. provisional patent application No. 63/516,624, filed on Jul. 31, 2023, entitled "Document and Model Splicing for Digital Engineering," describes document splicer technology.

U.S. provisional patent application No. 63/520,643, filed on Aug. 20, 2023, entitled "Artificial Intelligence (AI)-Assisted Automation of Testing in a Software Environment," describes software testing with AI-assistance.

U.S. provisional patent application No. 63/590,420, filed on Oct. 14, 2023, entitled "Commenting and Collaboration Capability within Digital Engineering Platform," describes collaborative capabilities.

U.S. provisional patent application No. 63/586,384, filed on Sep. 28, 2023, entitled "Artificial Intelligence (AI)-Assisted Streamlined Model Splice Generation, Unit Testing, and Documentation," describes streamlined model splicing, testing and documentation with AI-assistance.

U.S. provisional patent application No. 63/470,870, filed on Jun. 3, 2023, entitled "Digital Twin and Physical Twin Management with Integrated External Feedback within a Digital Engineering Platform," describes digital and physical twin management and the integration of external feedback within a DE platform.

U.S. provisional patent application No. 63/515,071, filed on Jul. 21, 2023, entitled "Generative Artificial Intelligence (AI) for Digital Engineering," describes an AI-enabled digital engineering task fulfillment process within a DE software platform.

U.S. provisional patent application No. 63/517,136, filed on Aug. 2, 2023, entitled "Machine Learning Engine for Workflow Enhancement in Digital Engineering," describes a machine learning engine for model splicing and DE script generation.

U.S. provisional patent application No. 63/516,891, filed on Aug. 1, 2023, entitled "Multimodal User Interfaces for Digital Engineering," describes multimodal user interfaces for DE systems.

U.S. provisional patent application No. 63/580,384, filed on Sep. 3, 2023, entitled "Multimodal Digital Engineering Document Interfaces for Certification and Security Reviews," describes multimodal user interfaces for certification and security reviews.

U.S. provisional patent application No. 63/613,556, filed on Dec. 21, 2023, entitled "Alternative Tool Selection and Optimization in an Integrated Digital Engineering Platform," describes tool selection and optimization.

U.S. provisional patent application No. 63/584,165, filed on Sep. 20, 2023, entitled "Methods and Systems for Improving Workflows in Digital Engineering," describes workflow optimization in a DE platform.

U.S. provisional patent application No. 63/590,456, filed on Oct. 15, 2023, entitled "Data Sovereignty Assurance for Artificial Intelligence (AI) Models," relates to data sovereignty assurance during AI model training and evaluation.

U.S. provisional patent application No. 63/606,030, filed on Dec. 4, 2023, also entitled "Data Sovereignty Assurance for Artificial Intelligence (AI) Models," further details data sovereignty assurances during AI model training and evaluation.

U.S. provisional patent application No. 63/419,051, filed on Oct. 25, 2022, entitled "Interconnected Digital Engineering and Certification Ecosystem."

U.S. non-provisional patent application Ser. No. 17/973,142, filed on Oct. 25, 2022, entitled "Interconnected Digital Engineering and Certification Ecosystem."

U.S. non-provisional patent application Ser. No. 18/383,635, filed on Oct. 25, 2023, entitled "Interconnected Digital Engineering and Certification Ecosystem."

U.S. provisional patent application No. 63/489,401, filed on Mar. 9, 2023, entitled "Security Architecture for Interconnected Digital Engineering and Certification Ecosystem."

NOTICE OF COPYRIGHTS AND TRADEDRESS

A portion of the disclosure of this patent document contains material which is subject to copyright protection.

This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

ISTARI DIGITAL is a trademark name carrying embodiments of the present invention, and hence, the aforementioned trademark name may be interchangeably used in the specification and drawings to refer to the products/process offered by embodiments of the present invention. The terms ISTARI and ISTARI DIGITAL may be used in this specification to describe the present invention, as well as the company providing said invention.

FIELD OF THE INVENTION

This disclosure relates to software tools for digital engineering, including modeling and simulation applications, and the certification of digitally engineered products. Specifically, this disclosure relates to methods and systems for creating, managing, and executing digital threads that connect engineering models and associated software tools within such ecosystems.

BACKGROUND OF THE INVENTION

The statements in the background of the invention are provided to assist with understanding the invention and its applications and uses, and may not constitute prior art.

Digital engineering software tools, including modeling and simulation tools that accurately virtualize physical systems or processes for real-world decisions, enable iterative and effective development of systems and components. Disparate engineering tools from multiple disciplines are necessary to enable digital engineering, from design to validation, verification, and certification of complex systems. These digital engineering tools and the engineering models they generate are siloed in different software tools. Integration of data and models from the siloed tools is one of the largest expenses in digital engineering and requires massive teams of highly specialized engineers and software developers to integrate. Furthermore, the job of integration is never finished, as digital engineering tools are always evolving. Therefore, integration of the disparate models, or model-type files, requires on-going maintenance by large teams of engineers and software developers, including highly expensive subject matter experts.

Furthermore, certification of these systems and components is complex and requires integration between data from engineering models from disparate tools together with human-readable documentation throughout the certification process. Furthermore, certification still requires information and tests that largely occur in the physical world using physical manifestations of digitally engineered systems and components (sometimes referred to generally herein as "products"). Additionally, physical tests that have been completed for another effort or by another third-party stakeholder (e.g., supplier of a component) are often repeated because the third-party stakeholder may not be willing to share the full data from prior tests. This results in redundant physical tests that add costs and delays to development and certification efforts.

Accordingly, it would be an advancement in the state of the art to enable integration of multidisciplinary engineering models from disparate, disconnected software tools, together with human-readable documentation, in an interconnected digital engineering platform. The interconnected digital engineering platform would enable design, validation, verification, and certification of complex systems. For example, such a platform could be used to ensure the accuracy and reliability of validation and certification processes required to receive full digital certification for a new aerospace vehicle, a new automobile, or even a new biomedical device or chemical process, thus reducing or completely eliminating the need for physical testing before certification.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

One embodiment of the present invention is an interconnected digital engineering platform enabling generation of a software-code-defined digital thread, with or without AI-assistance. The software-code-defined digital thread links two or more engineering models from disparate software tools. In some embodiments, one of the engineering models may be a human-readable document. In some embodiments, the software-code-defined digital thread links one or more other data sources (e.g., live test data).

Accordingly, various methods, systems, and non-transitory storage medium storing program code for executing a process for generation of software-core-defined digital threads in a digital engineering system, are within the scope of the present invention.

According to a first aspect, a non-transitory physical storage medium storing program code is provided. The program code is executable by a hardware processor. The hardware processor when executing the program code causes the hardware processor to execute a computer-implemented process for generating a software-code-defined digital thread. The program code comprises code that may train a script-generating machine learning (ML) model using a training dataset comprising a set of training triplets each comprising a sample intent input, a corresponding sample model representation set, and a corresponding sample platform orchestration script, wherein the sample platform orchestration script connects models within the corresponding sample model representation set to accomplish the corresponding sample intent input. The program code may comprise code to receive a first model representation of a first engineering model. The program code may comprise code to receive a second model representation of a second engineering model. The program code may comprise code to receive an intent input. The program code may comprise code to generate, using the script-generating ML model, a platform orchestration script connecting the first model representation and the second model representation based on the intent input. The platform orchestration script may accomplish the intent input. The program code may comprise code to store the platform orchestration script as the software-code-defined digital thread.

In one embodiment, the non-transitory storage medium further comprises program code to receive a feedback data on the platform orchestration script. The program code may comprise code to train and/or fine-tune the script-generating ML model based on the feedback data.

In one embodiment, the non-transitory storage medium further comprises program code to provide a user interface coding environment in an interconnected digital engineering platform (IDEP). The program code may comprise code to receive a plurality of user selections of the first engineering model and the second engineering model. The first engineering model and the second engineering model may be selected by a user. The program code may comprise code to receive a plurality of corresponding model representations from the first engineering model and the second engineering model. The program code may comprise code to receive a user-defined code for a user-defined platform orchestration script. The program code may comprise code to determine and/or receive a corresponding intent input. The program code may comprise code to determine corresponding model representation endpoints used in the user-defined code from the user-defined platform orchestration script. The program code may comprise code to record the first and the second engineering models, the first and the second model representations, the corresponding intent input, and the corresponding model representation endpoints, and the user-defined platform orchestration script to generate the training dataset. The program code may comprise code to store the training dataset for training the script-generating ML model.

In some embodiments, the connecting the first model representation and the second model representation based on the intent input comprises linking a first endpoint of the first model representation and a second endpoint of the second model representation based on the intent input.

In one embodiment, the non-transitory storage medium further comprises program code to evaluate, using a sufficiency machine learning (ML) model, the first engineering model and the second engineering model within an interconnected digital engineering platform (IDEP) for sufficiency for accomplishing the intent input.

In one embodiment, the non-transitory storage medium further comprises program code to determine, using a recommender ML model or the script-generating machine learning (ML) model, a first endpoint in the first model representation that are relevant to the intent input, in response to sufficiency being determined.

In one embodiment, the non-transitory storage medium further comprises program code to determine, using the recommender ML model, a relationship between the first endpoint and the second endpoint based on the intent input.

In some embodiments, the platform orchestration script comprises scripting code to read data from the first model representation and/or the second model representation.

In some embodiments, the platform orchestration script comprises scripting code to write data to the first model representation and/or the second model representation.

In some embodiments, the platform orchestration script comprises an input for the second model representation connected to an output of the first model representation.

In one embodiment, the non-transitory storage medium further comprises program code to execute the platform orchestration script for the second model representation. An output from the first model representation may be an input for the second model representation.

In one embodiment, the non-transitory storage medium further comprises code to read data from the first model representation. The program code may comprise code to execute a computation on the data. The program code may comprise code to write a result of the computation to the first model representation and/or the second model representation.

In one embodiment, the non-transitory storage medium further comprises program code to receive a third model representation of a third engineering model. The platform orchestration script may further link the first and/or the second model representation with the third model representation.

In one embodiment, the non-transitory storage medium further comprises code to execute the platform orchestration script by invoking one or more API or SDK endpoints associated with the first model representation and/or the second model representation.

In one embodiment, the non-transitory storage medium further comprises program code to determine, using an AI model, a recommended third engineering model based on the first engineering model, the second engineering model, and the training dataset.

In some embodiments, the first engineering model and/or the second engineering model is a human-readable document file.

In one embodiment, the non-transitory storage medium further comprises program code to receive a document template. The program code may comprise code to analyze the document template using the interconnected digital engineering platform (IDEP). The program code may comprise code to determine, using an AI model, output data from the first model representation and/or the second model representation required to generate the document file. The program code may comprise code to execute appropriate actions on the first model representation and/or the second model representation using a predetermined sequence based on the document template's requirements to generate output required for the document file. The program code may comprise code to generate the document file by assembling the document template and the output from the first model representation and/or the second model representation.

In one embodiment, the non-transitory storage medium further comprises program code to predict a change in the first model representation of the first engineering model and/or the second model representation of the second engineering model based on a change in the first model representation of the first engineering model and/or the second model representation of the second engineering model.

In one embodiment, the non-transitory storage medium further comprises program code to predict a change in the first model representation of the first engineering model based on a change in the second model representation of the second engineering model.

In one embodiment, the non-transitory storage medium further comprises program code to call a second software-code-defined digital thread.

In some embodiments, the first engineering model and/or the second engineering model comprises a neural network model.

In one embodiment, the non-transitory storage medium further comprises program code to generate, using an AI model, a magic document associated with the software-code-defined digital thread. The magic document may comprise API endpoints to human-readable text blocks. The magic document may be updated, using the API endpoints, with an audit log in response to an execution of at least a portion of the platform orchestration script.

In some embodiments, the platform orchestration script comprises a code block. The code block may be associated with an information security tag. The information security tag may indicate a restriction on executing the code block.

In one embodiment, the model representation may be a model splice, and the non-transitory storage medium further comprises program code to receive a first engineering model file of the first engineering model having a DE model type. The first engineering model file may be in a native file format. The program code may comprise code to extract model data from the first engineering model file in the native file format. The program code may comprise code to store the model data in a model data storage area. The program code may comprise code to generate one or more external, commonly-accessible splice functions that enable external access to one or more digital artifacts derived from the model data stored in the model data storage area. The one or more external, commonly-accessible splice functions provide addressable Application Programming Interface (API) or Software Development Kit (SDK) endpoints that may be accessible by third-party applications and users. The API or SDK endpoints may enable access to the digital artifacts without access to an entirety of the first engineering model file and without requiring direct engagement by the third-party applications and users with a DE tool associated with the DE model type. The program code may comprise code to generate the first model splice of the first engineering model. The first model splice may comprise access to a selective portion of the one or more digital artifacts. The first model splice may comprise access to at least one of the one or more external, commonly-accessible splice functions. The first model splice may be accessible via the API or SDK endpoints by the third-party applications and users. The API or SDK endpoints may provide a unified programming interface to sharable model splices generated from DE models having the DE model type.

According to a second aspect, a computer-implemented method for generating a software-code-defined digital thread is provided. The method may include the following steps. Training a script-generating machine learning (ML) model using a training dataset comprising a set of training triplets each comprising a sample intent input, a corresponding sample model representation set, and a corresponding sample platform orchestration script. The sample platform orchestration script may connect the corresponding sample model representation set to accomplish the corresponding sample intent input. Receiving a first model representation of a first engineering model, receiving a second model representation of a second engineering model, and receiving an intent input. Generating, using the script-generating ML model, a platform orchestration script connecting the first model representation and the second model representation based on the intent input. The platform orchestration script may accomplish the intent input. Finally, storing the platform orchestration script as the software-code-defined digital thread.

In another aspect of embodiment of the present invention, a non-transitory, computer-readable storage medium is provided, the non-transitory, computer-readable storage medium storing executable instructions which when executed by a processor, causes the processor to perform a process for digital thread generation including the aforementioned steps.

In yet another aspect or embodiment of the present invention, a computer program product is provided. The computer program may be used for digital thread generation, and may include a computer-readable storage medium having program instructions, or program code, embodied therewith, the program instructions executable by a processor to cause the processor to perform the aforementioned steps.

In another aspect or embodiment of the present invention, a system for digital thread generation is provided, the system including a memory that stores computer-executable components, and a hardware processor, operably coupled to the memory, and that executes the computer-executable components stored in the memory, wherein the computer-executable components may include components communicatively coupled with the processor that execute the aforementioned steps.

In yet another aspect or embodiment of the present invention, a system for digital thread generation is provided, the system including a user device having a processor, a display, a first memory; a server including a second memory and a data repository; a communications link between said user device and said server; and a plurality of computer codes embodied on said first and second memory of said user device and said server, said plurality of computer codes which when executed causes said server and said user device to execute a process including the steps described herein.

In another aspect or embodiment of the present invention, a computerized server is provided, including at least one processor, memory, and a plurality of computer codes embodied on said memory, said plurality of computer codes which when executed causes said processor to execute a process including the steps described herein. Other aspects and embodiments of the present invention include the methods, processes, and algorithms including the steps described herein, and also include the processes and modes of operation of the systems and servers described herein.

In yet another aspect or embodiment of the present invention, an edge computerized system is provided, the edge computerized system running on a physical system or physical twin (PTw) with either access to, or dedicated, processing, memory, computer code stored on a non-transitory computer-readable storage medium of the physical system or PTw, and a plurality of sensor data being measured on said physical system or PTw, the computer code causing the processor to perform the aforementioned steps.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory physical storage medium may have corresponding features definable and/or combinable with respect to a digital documentation system and/or method and/or system, or vice versa, and these embodiments are specifically envisaged.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which section headers are provided for ease of explanation:

Interconnected Digital Engineering Platform

Figure 1:
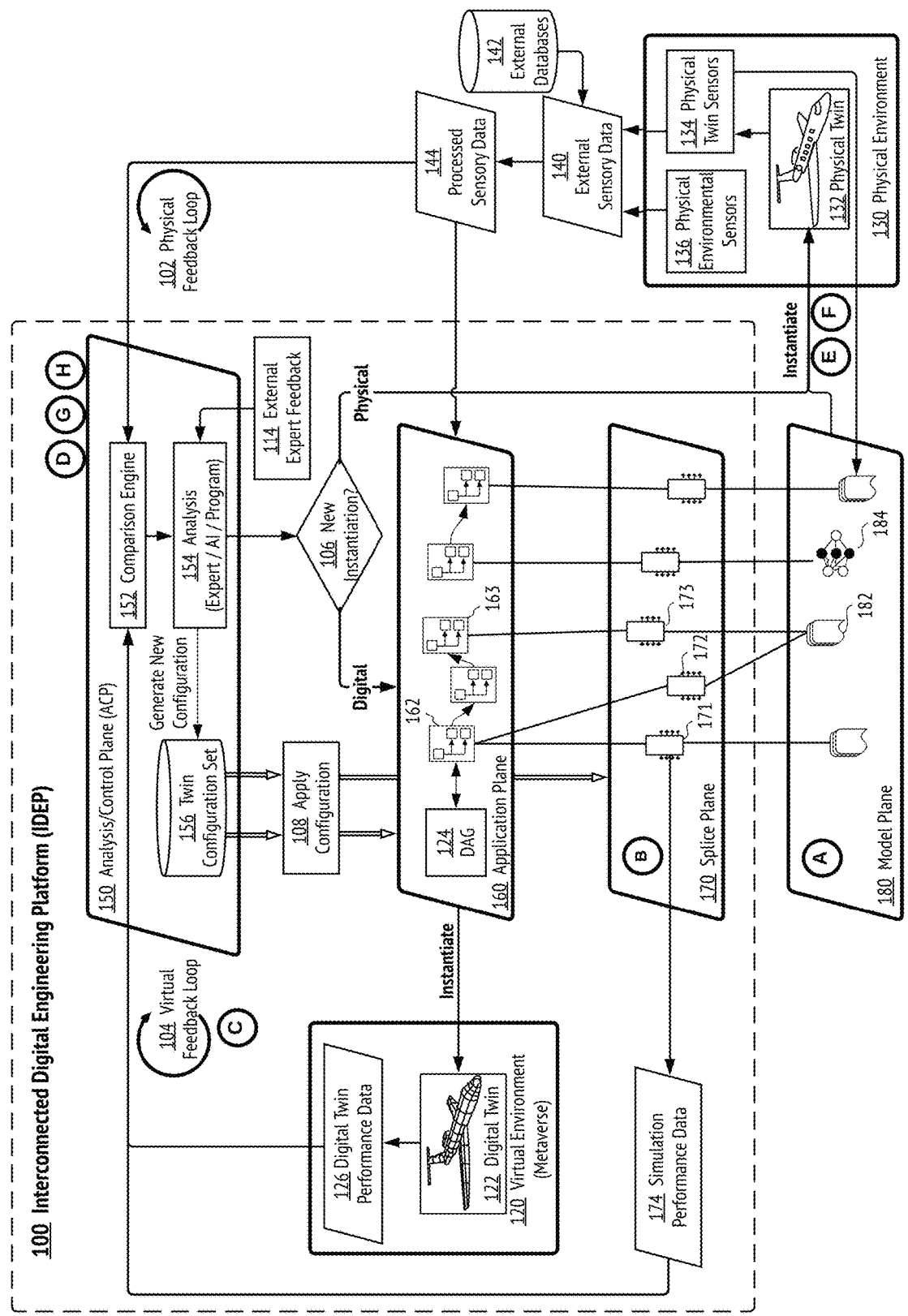

FIG. 1 shows an exemplary interconnected digital engineering platform (IDEP) architecture, in accordance with some embodiments of the present invention.

Figure 2:
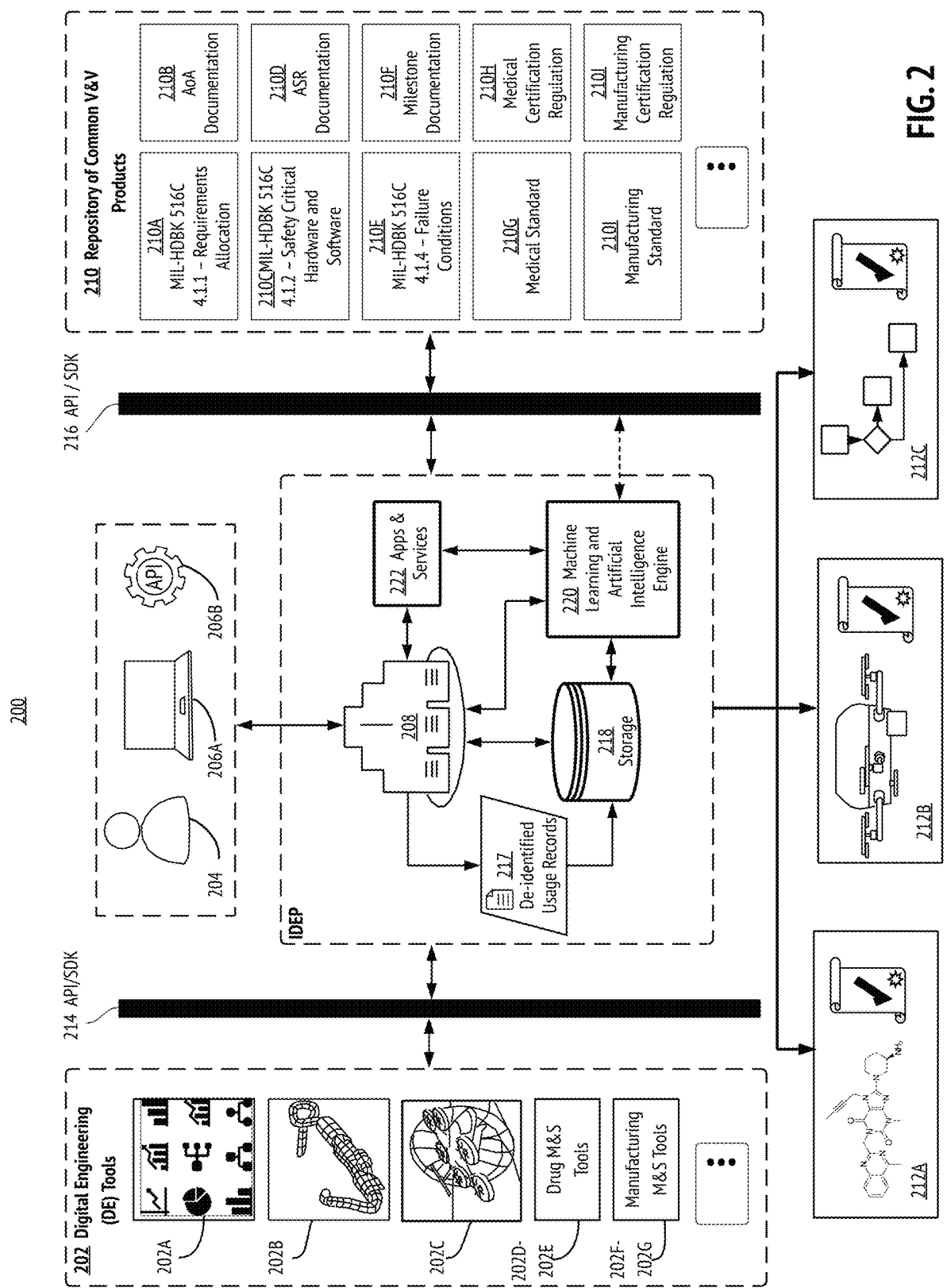

FIG. 2 shows an exemplary implementation of the IDEP as an interconnected digital engineering (DE) and certification ecosystem, and exemplary digitally certified products, in accordance with some embodiments of the present invention.

Figure 3:
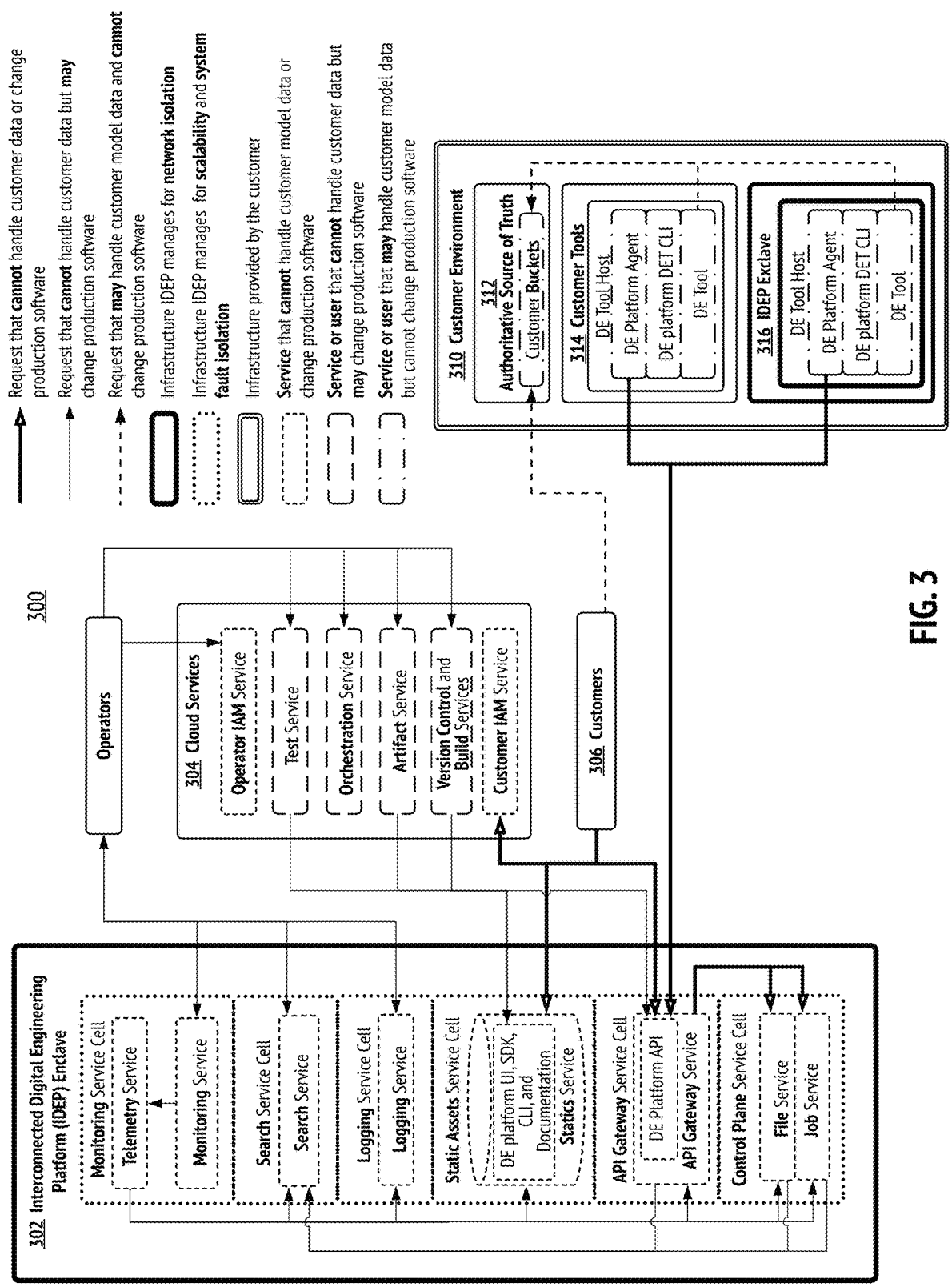

FIG. 3 shows another exemplary implementation of the IDEP illustrating its offered services and features, in accordance with some embodiments of the present invention.

Figure 4:
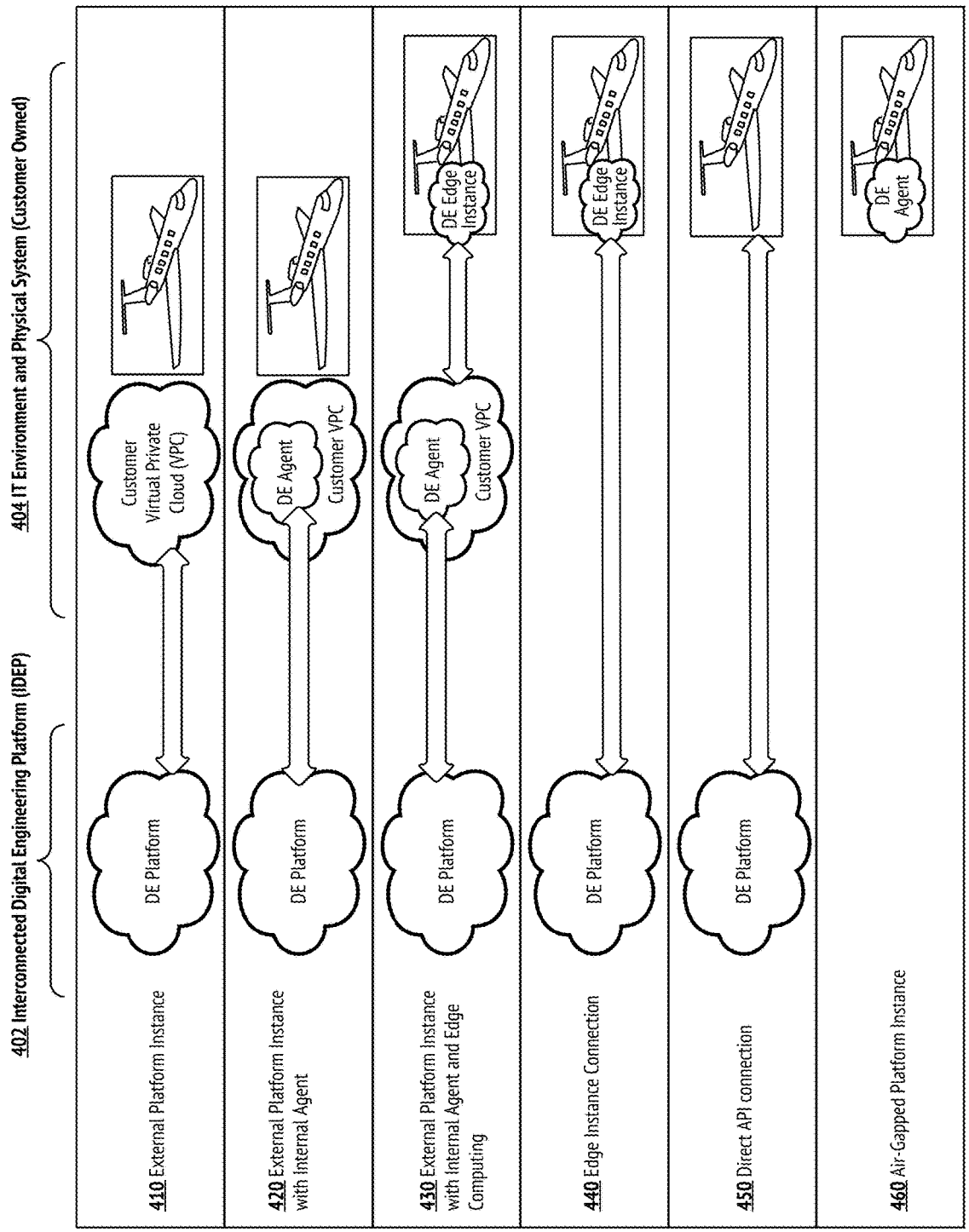

FIG. 4 shows potential scenarios for instantiating an IDEP in connection to a customer's physical system and IT environment, in accordance with some embodiments of the present invention.

Figure 5:
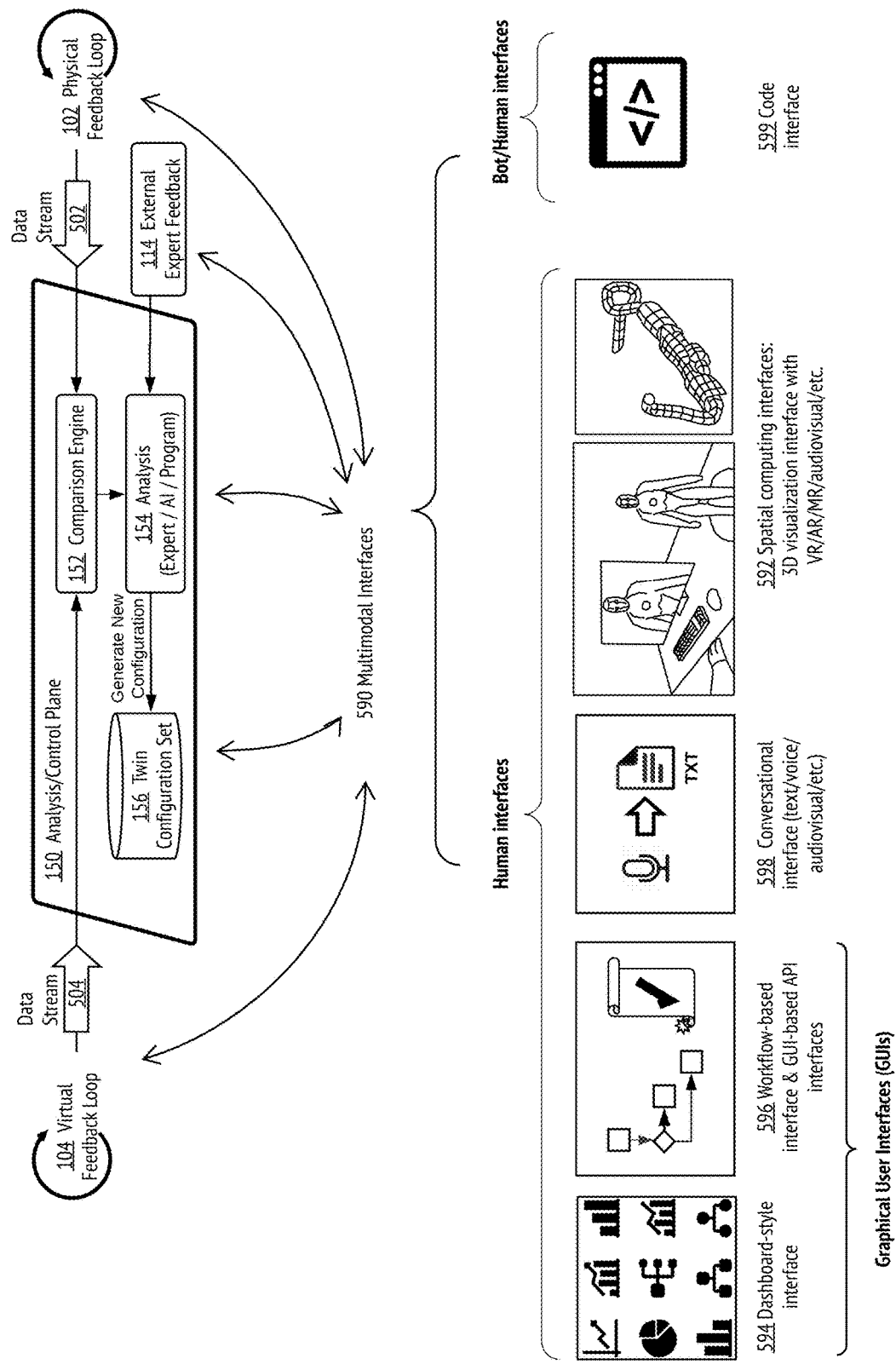

FIG. 5 shows exemplary multimodal interface designs for integration of feedback in am IDEP, in accordance with some embodiments of the present invention.

Digital Engineering Platform Links Digital Models into Digital Threads

Figure 6:
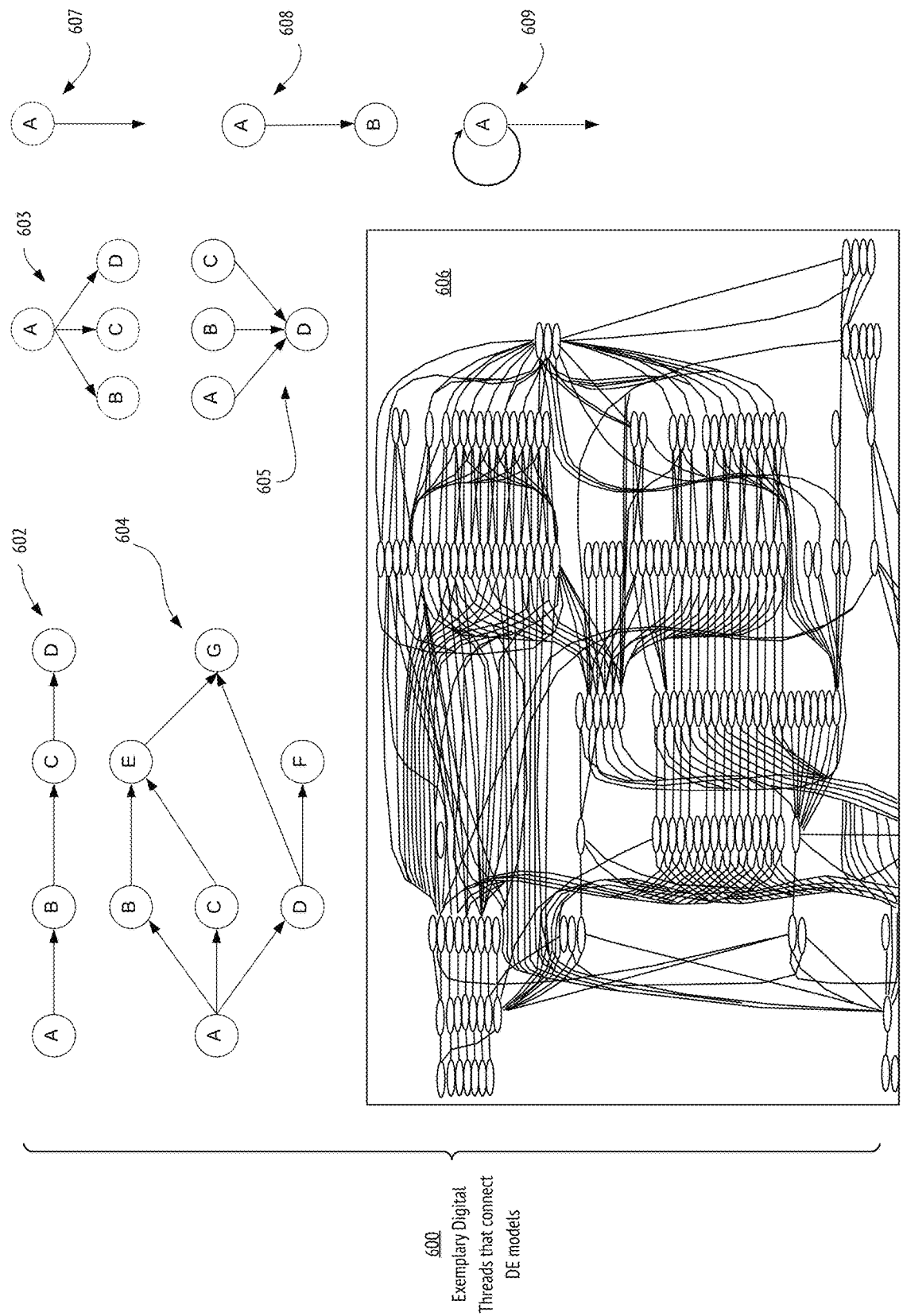

FIG. 6 is a schematic diagram comparing exemplary digital threads that connect DE models, in accordance with some embodiments of the present invention.

Figure 7:
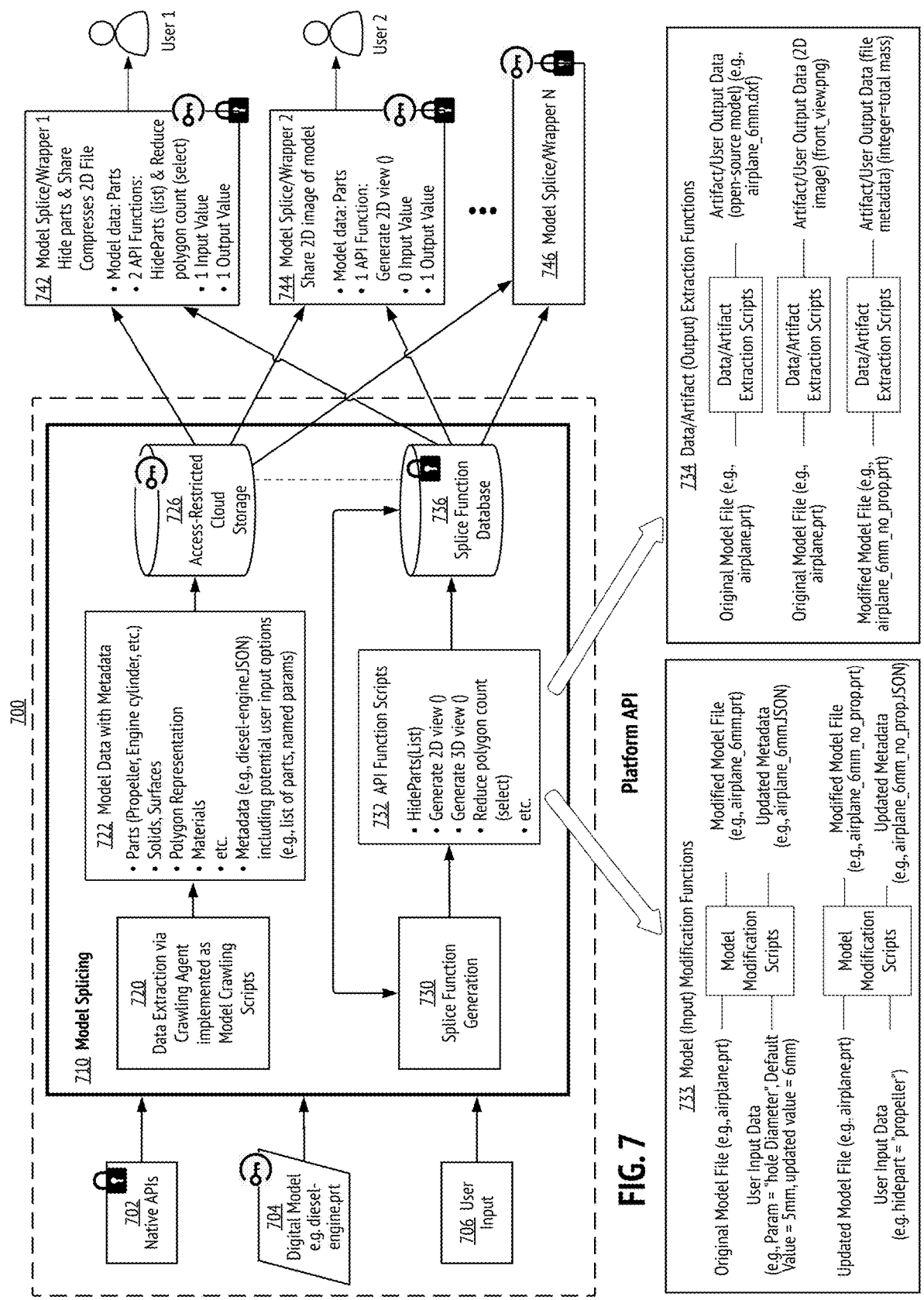

FIG. 7 is a schematic showing an exemplary DE model splicing setup, in accordance with some embodiments of the present invention.

Figure 8:
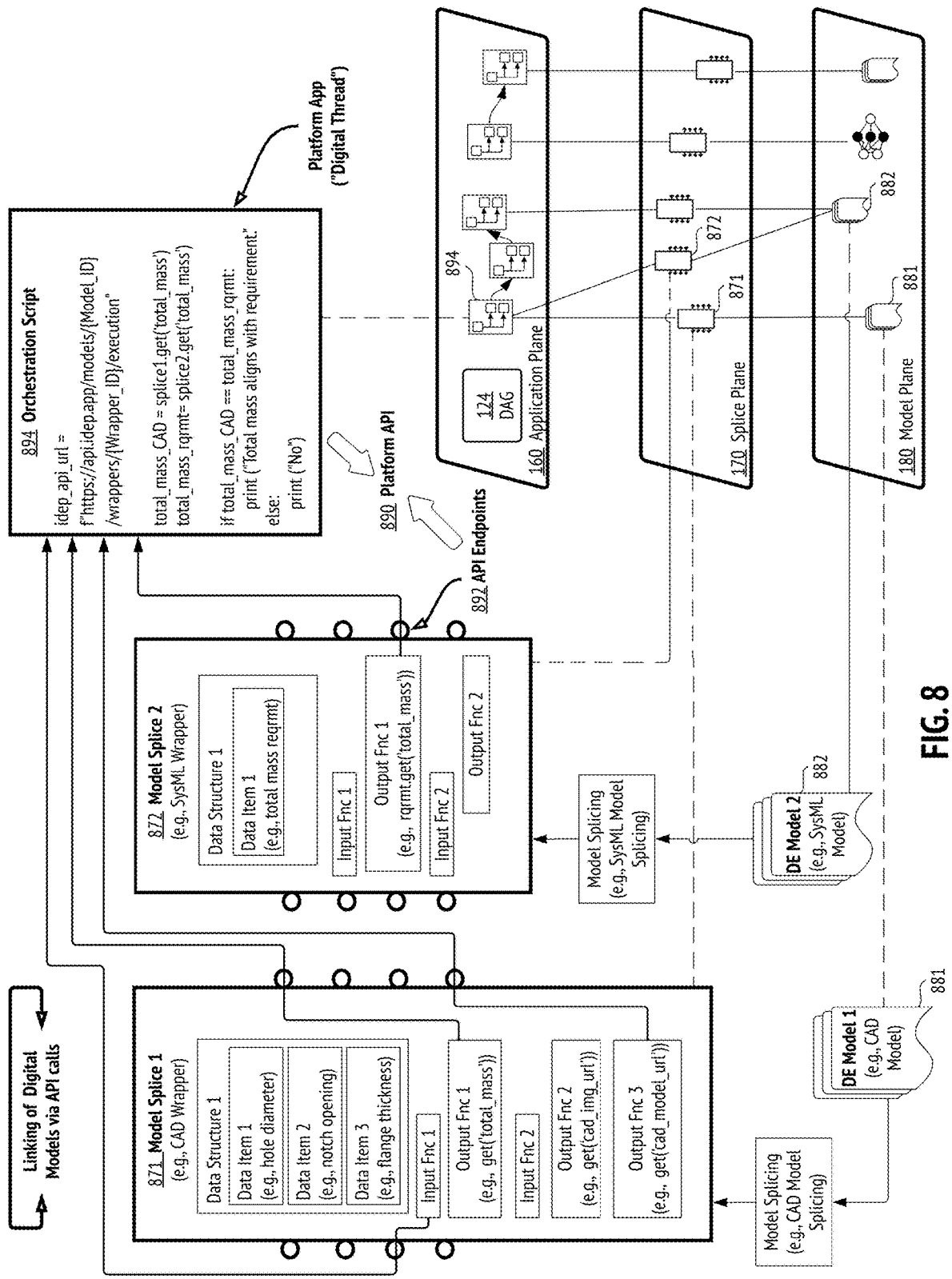

FIG. 8 is a schematic showing digital threading of DE models via model splicing, in accordance with some embodiments of the present invention.

Figure 9:
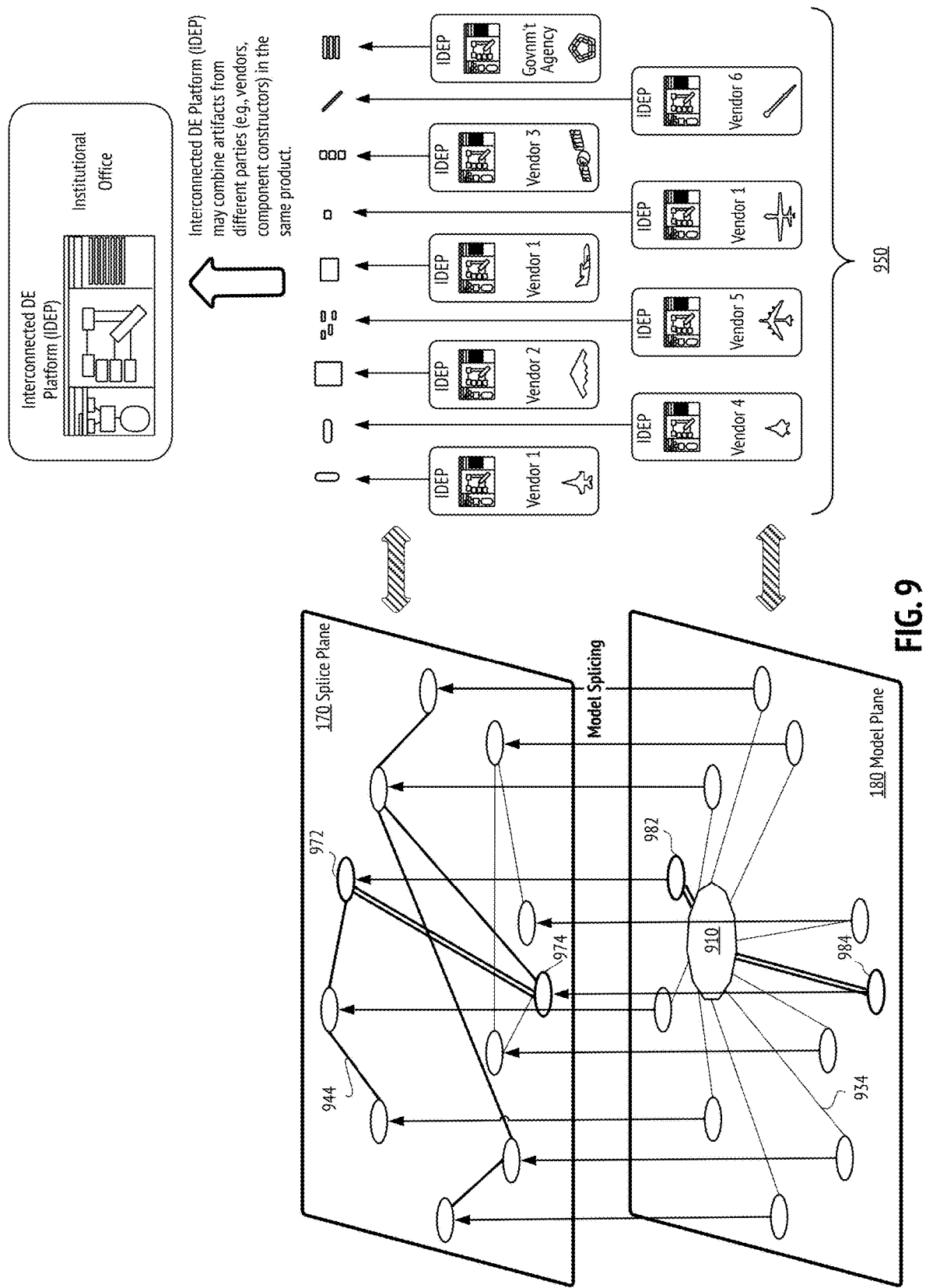

FIG. 9 is a schematic illustrating the linking of DE model splices in a splice plane and comparing digital threading with and without model splicing, in accordance with some embodiments of the present invention.

Figure 10:
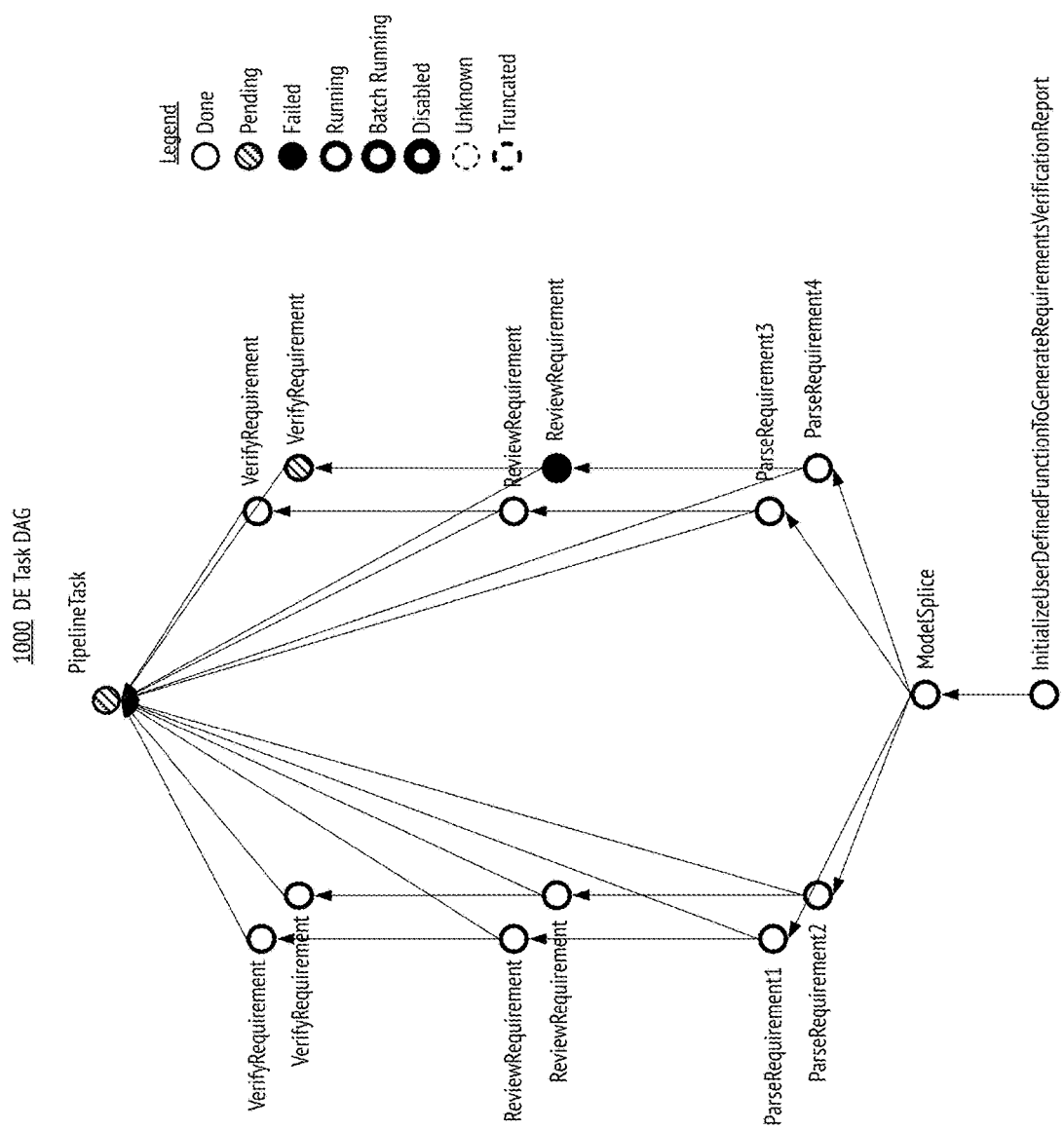

FIG. 10 shows an exemplary directed acyclic graph (DAG) representation of pipelined DE tasks related to digital threads, in accordance with some embodiments of the present invention.

AI-Assisted Versatile Linking of Models to Generate Digital Threads

Figure 11:
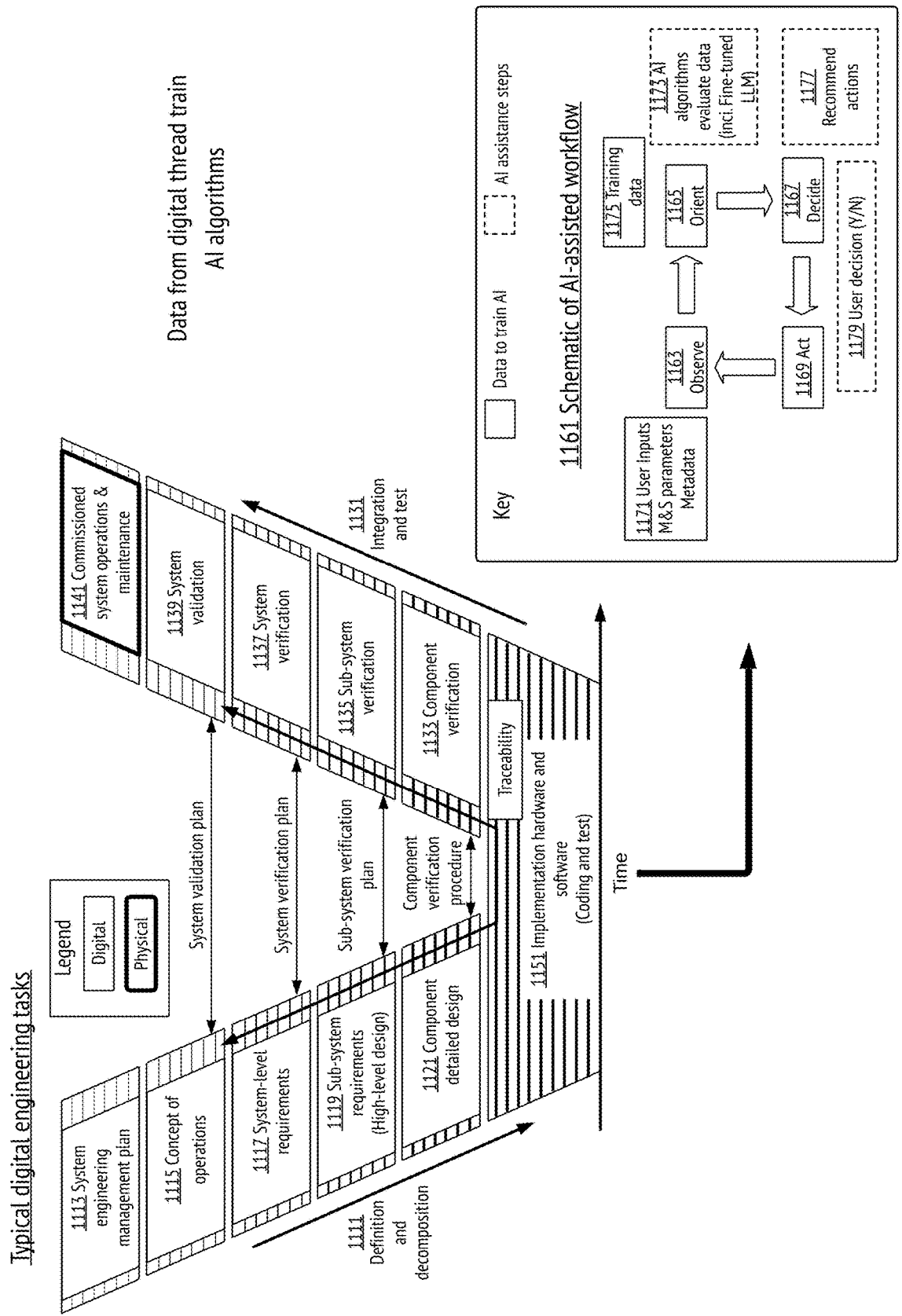

FIG. 11 shows an example schematic of data from digital threads training AI algorithms to assist users in their workflows, in accordance with some embodiments of the present invention.

Figure 12:
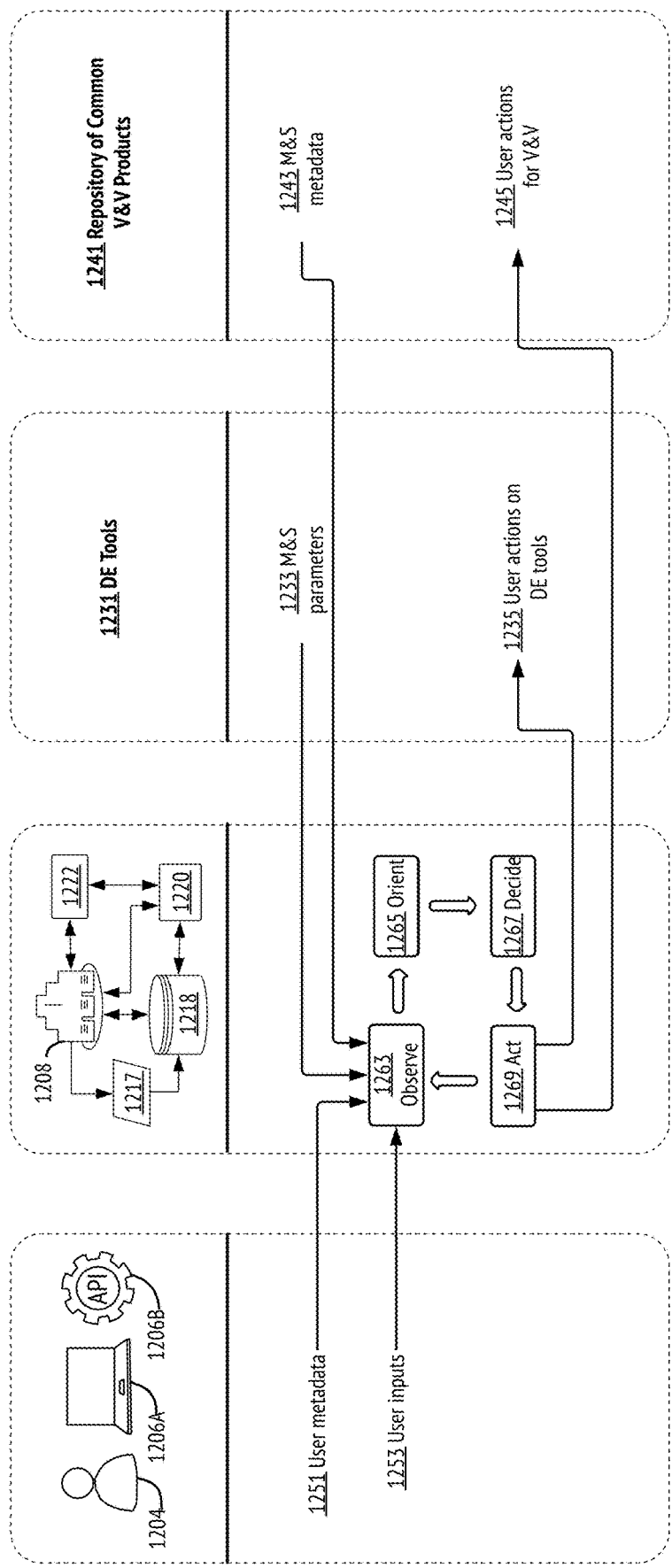

FIG. 12 shows an example schematic of AI-assisted digital threads enabling a variety of DE services, in accordance with some embodiments of the present invention.

Figure 13:
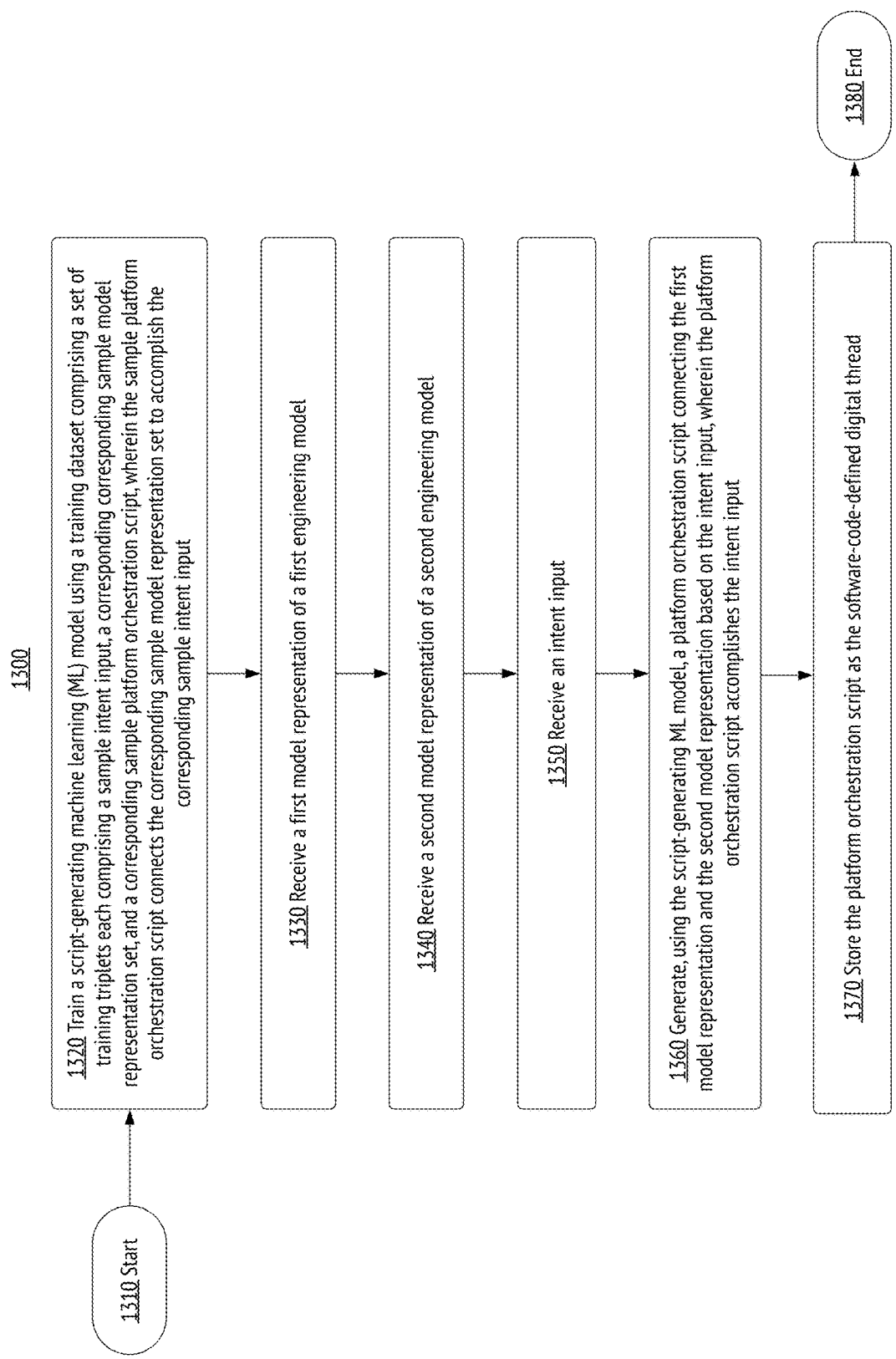

FIG. 13 shows a process flow for generating a software-code-defined digital thread, in accordance with some embodiments of the present invention.

Figure 14:
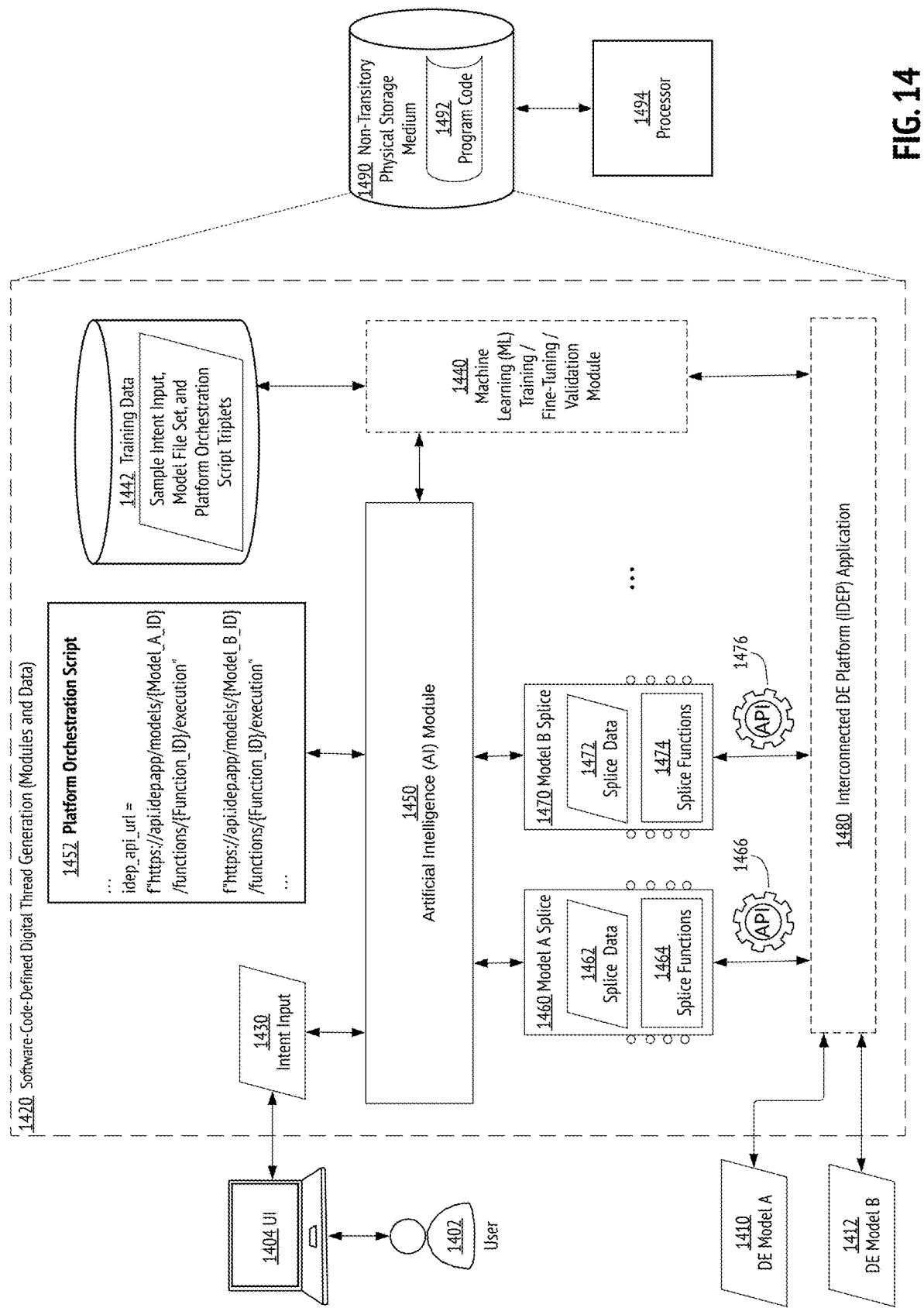

FIG. 14 shows an overview of an IDEP neural network training process, in accordance with some embodiments of the present invention.

Figure 15:
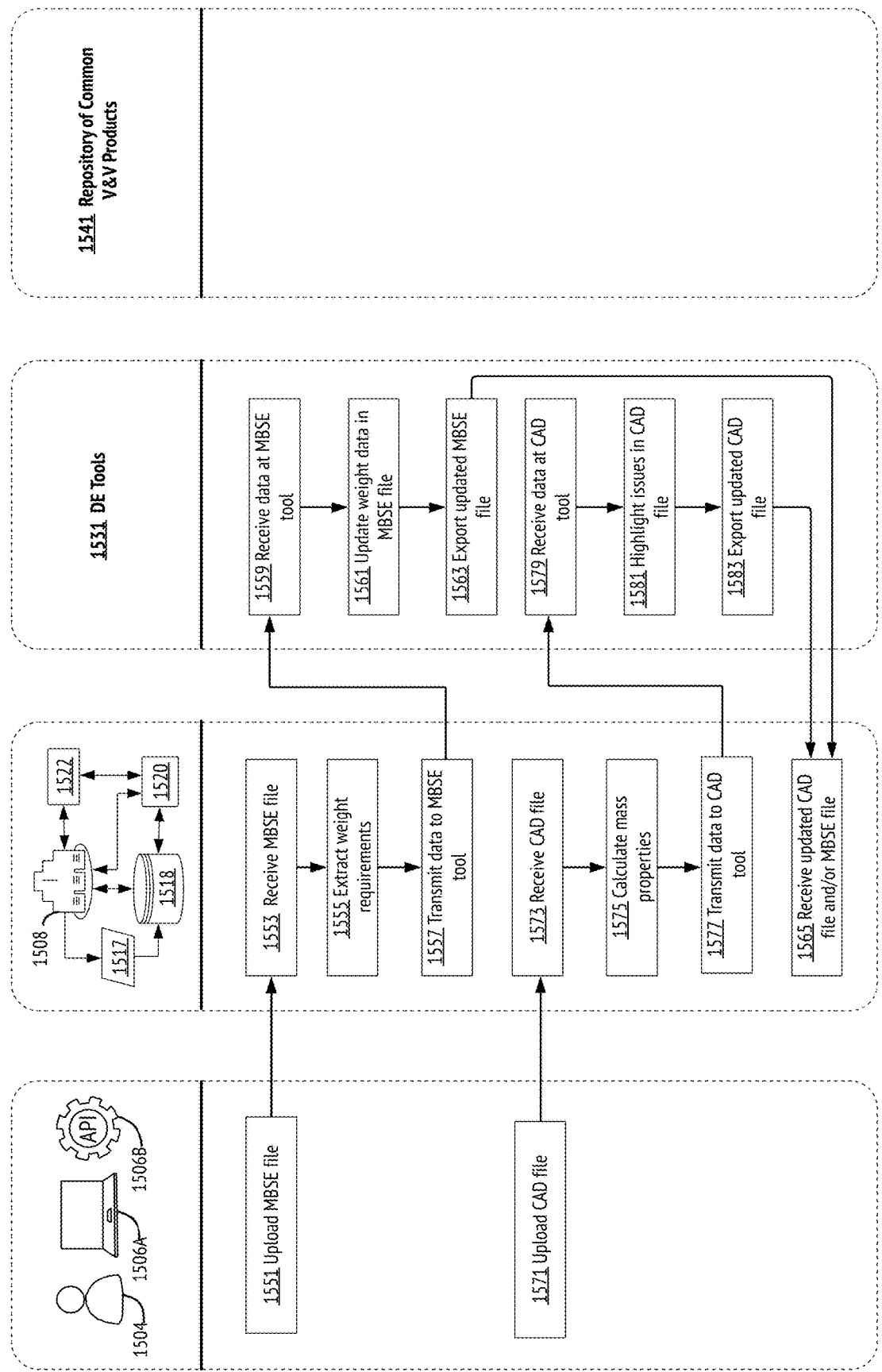

FIG. 15 shows an example schematic of digital engineering tools applied to requirements files and design files, in accordance with some embodiments of the present invention.

Figure 16:
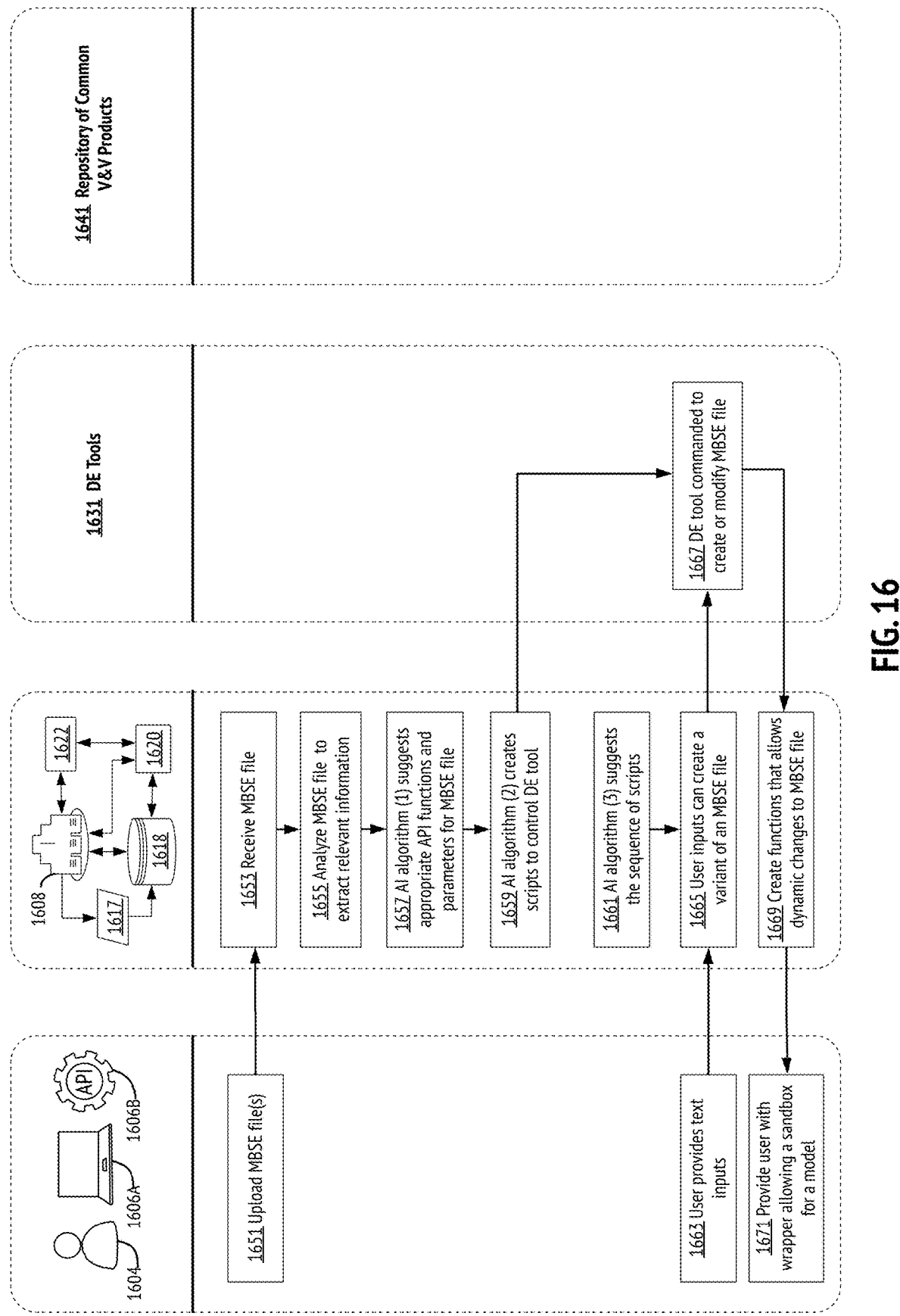

FIG. 16 shows an example of implementation steps of the scalable sharing of models, in accordance with some embodiments of the present invention.

Figure 17:
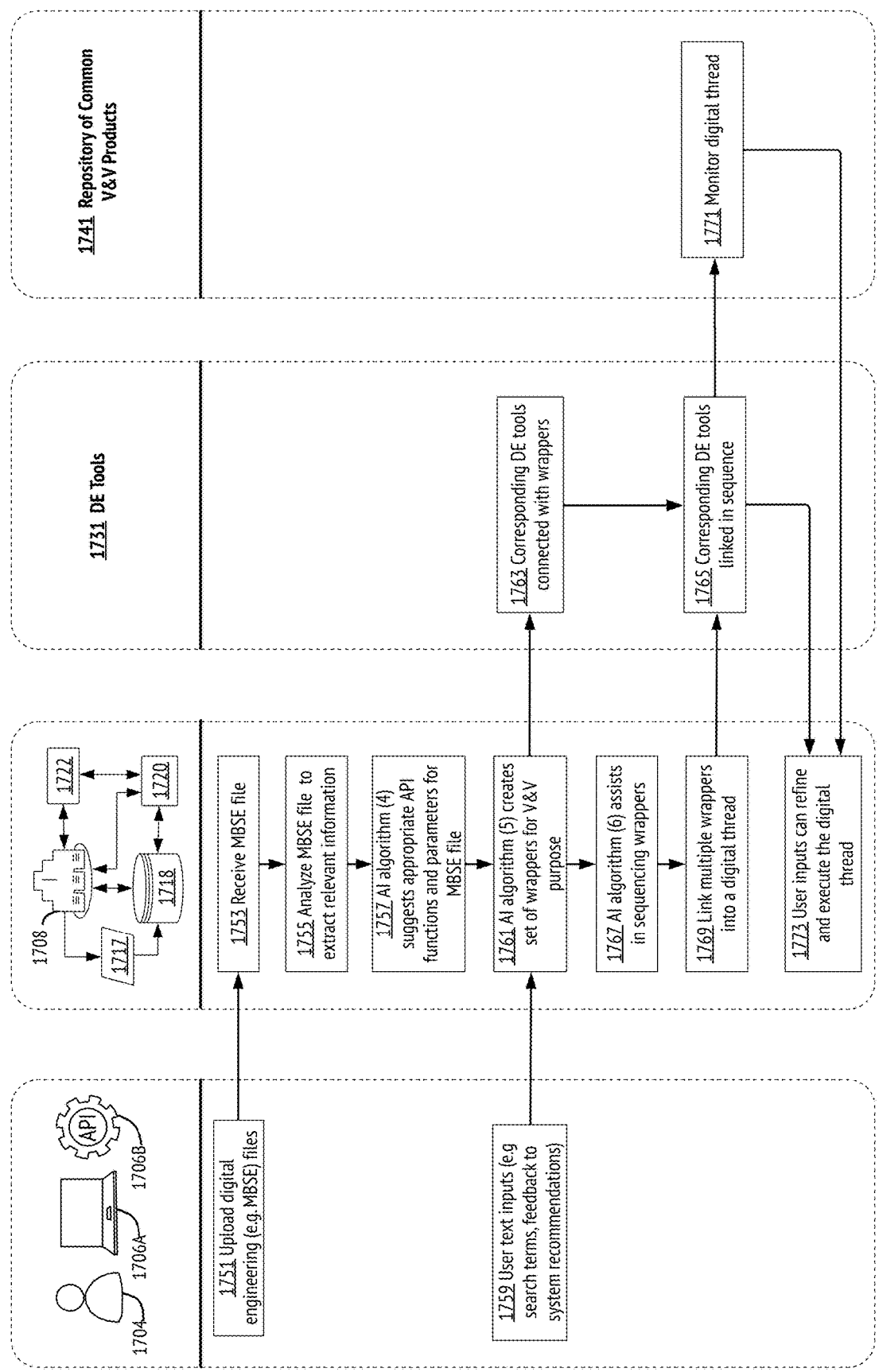

FIG. 17 shows an example schematic of an AI-assisted versatile linking of MBSE files, in accordance with some embodiments of the present invention.

Figure 18:
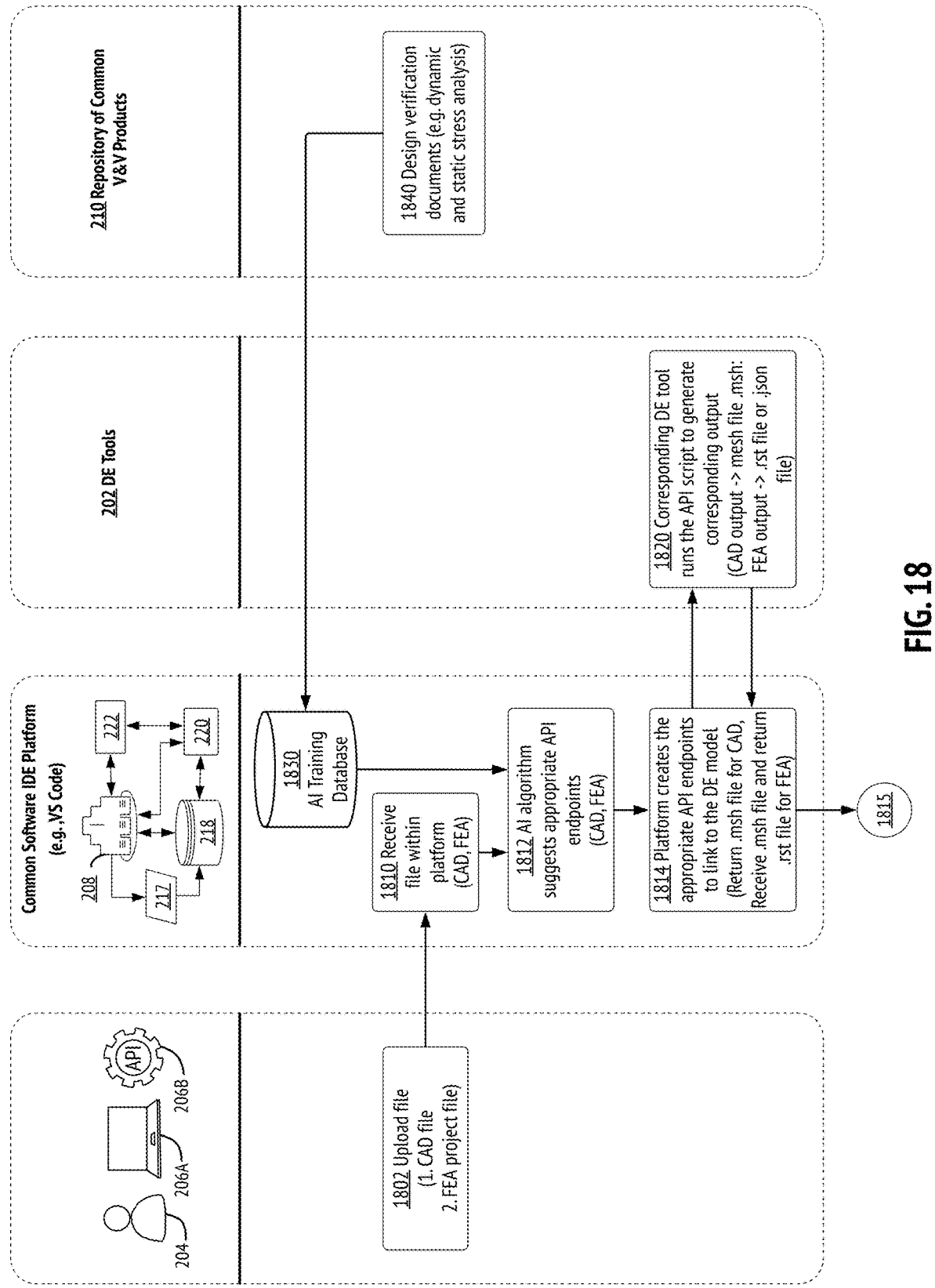

FIG. 18 shows an exemplary process for extracting DE model (CAD or FEA) data for sharing, in accordance with some embodiments of the present invention.

Figure 19:
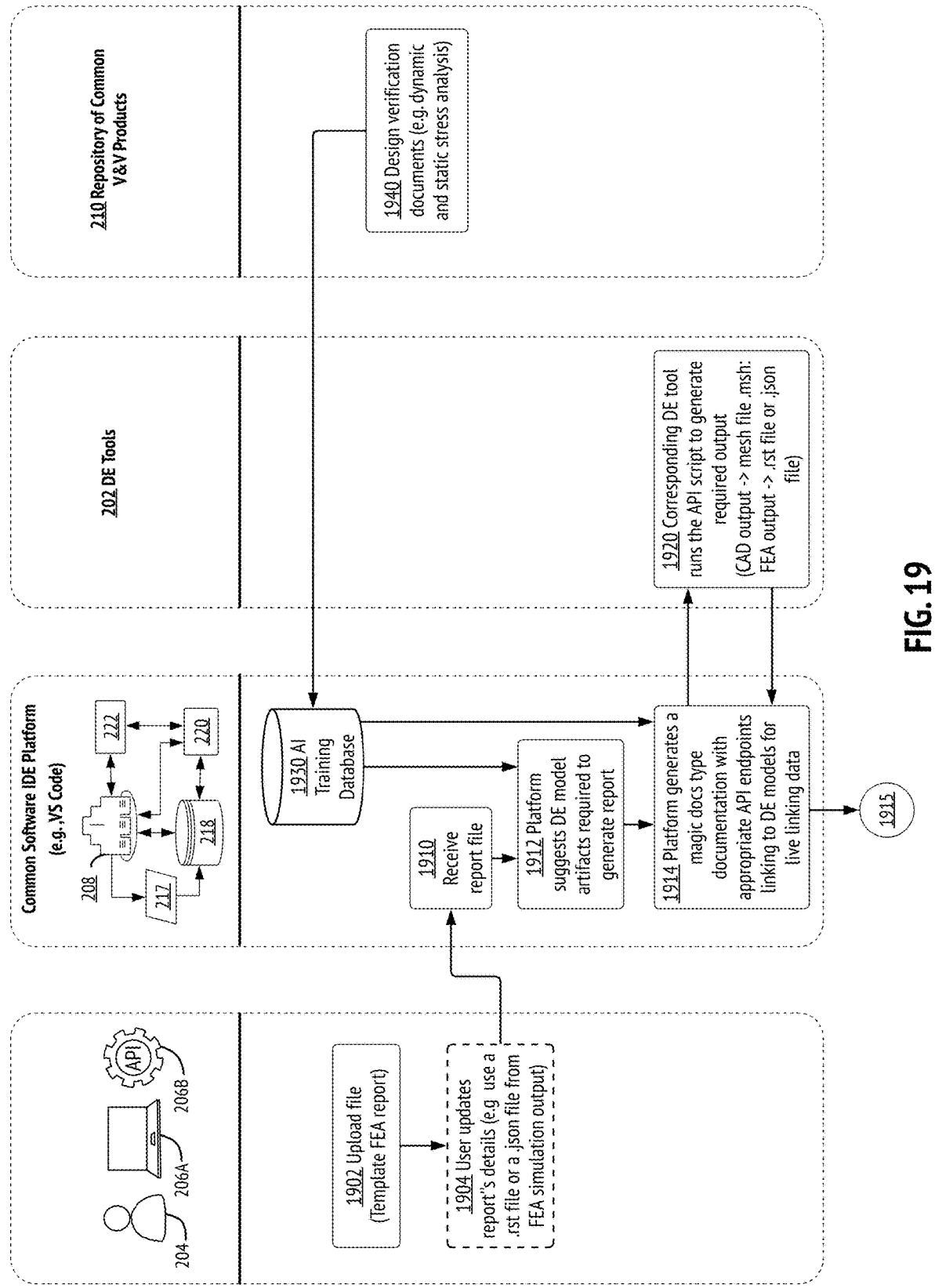

FIG. 19 shows an exemplary process for generating a magic docs-type documentation, in accordance with some embodiments of the present invention.

Figure 20:
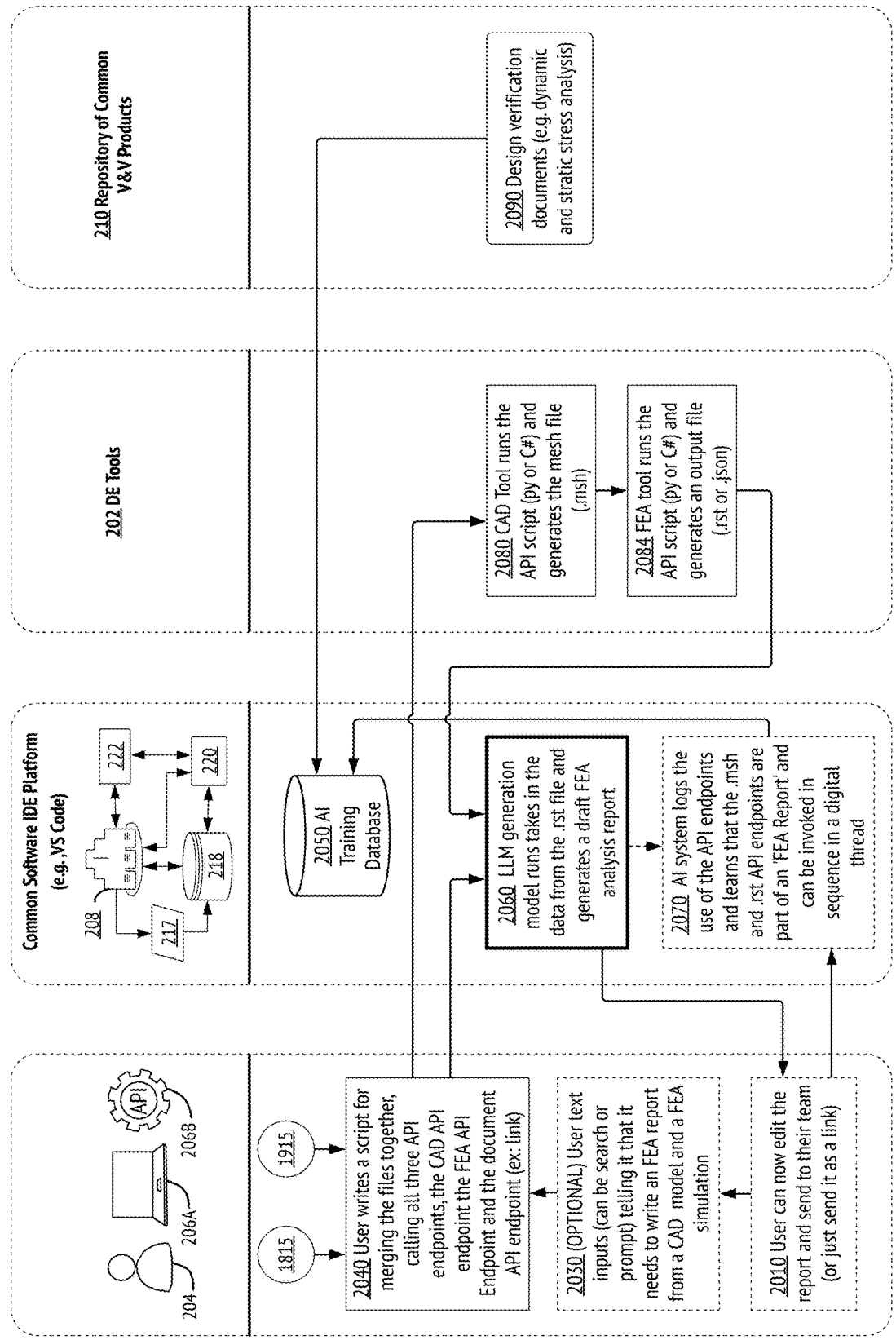

FIG. 20 shows the linking of CAD and FEA models 1815 with the documentation of an analysis 1915, according to exemplary embodiments of the present invention.

Digital Thread and Associated Magic Document Generation and Update

Figure 21:
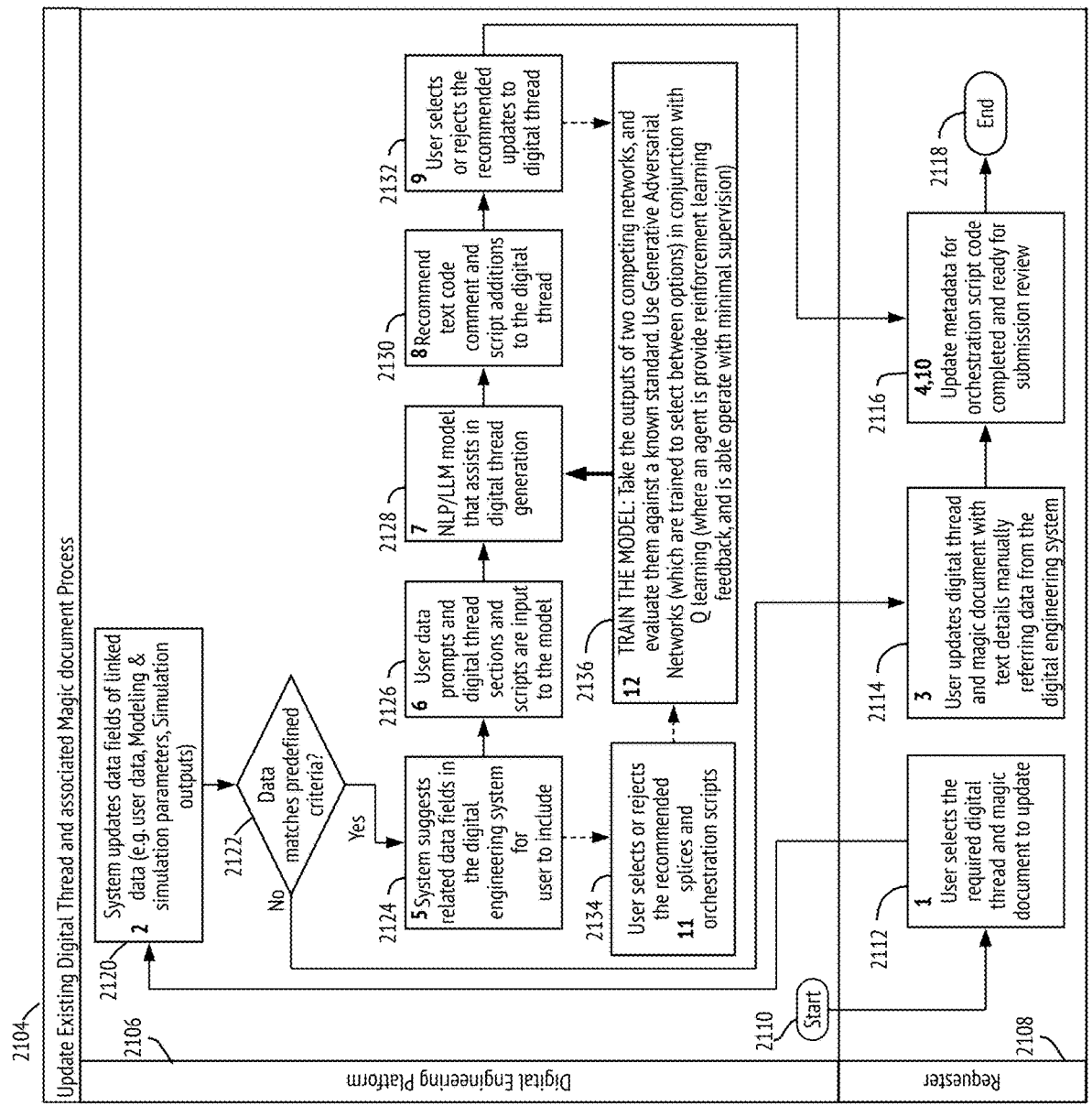

FIG. 21 shows an update process flow swimlane for a digital thread and an associated magic document, in accordance with some embodiments of the present invention.

Figure 22:
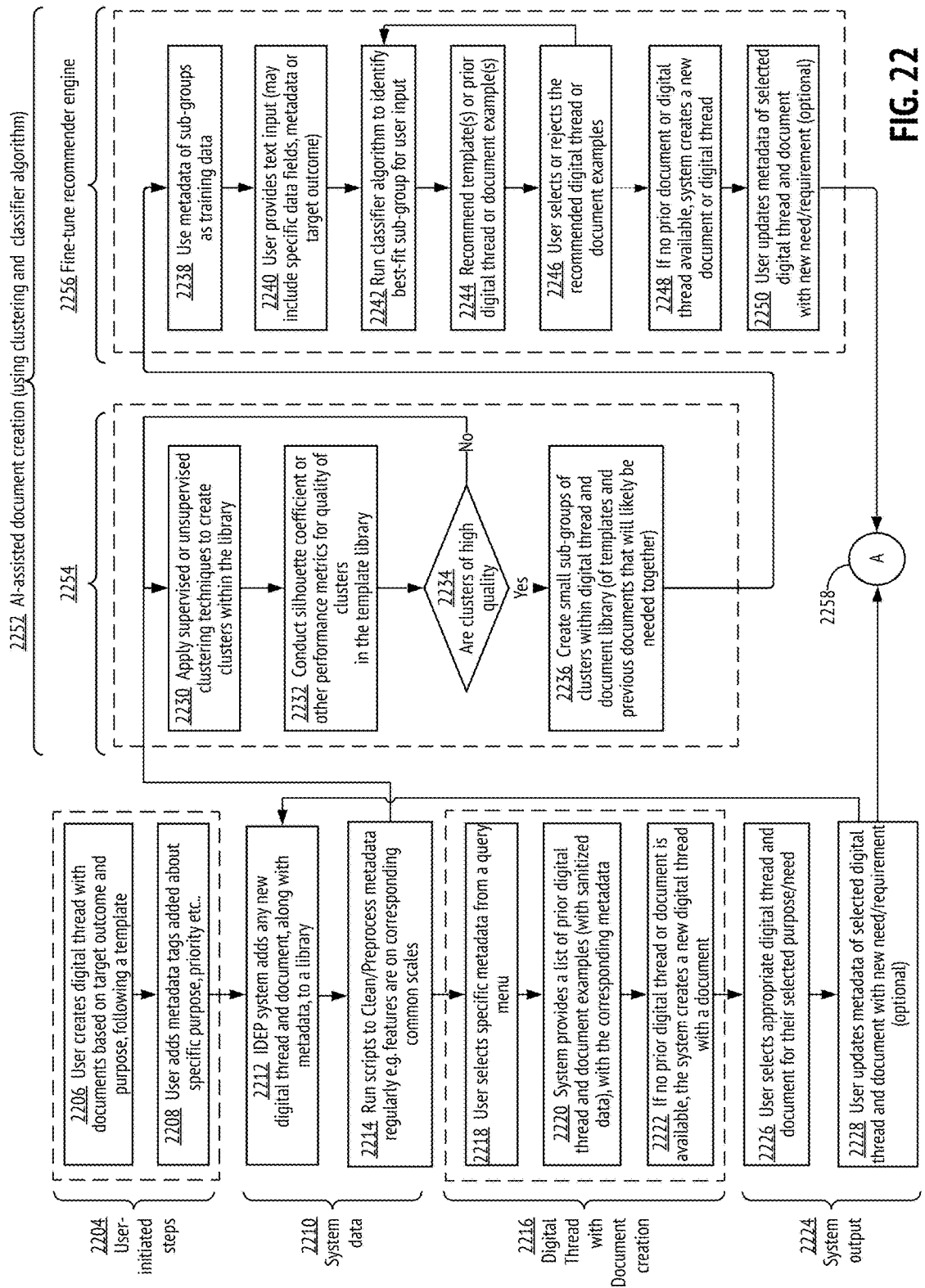

FIG. 22 shows a first part of a detailed process flow for digital thread and magic document recommendation, creation and update, in accordance with some embodiments of the present invention.

Figure 23:
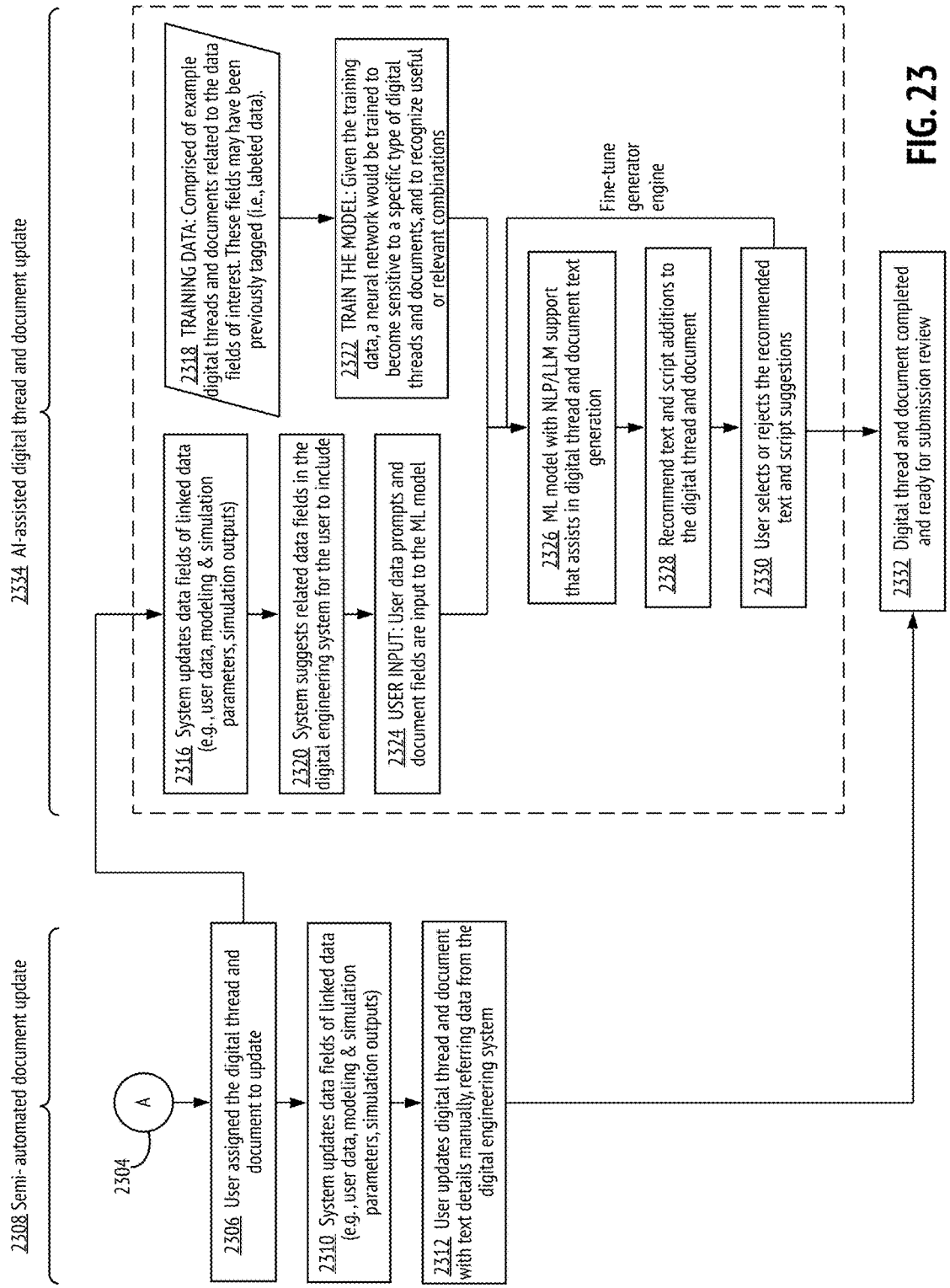

FIG. 23 shows a second part of the detailed process flow for digital thread and magic document recommendation, creation and update, in accordance with some embodiments of the present invention.

Figure 24:
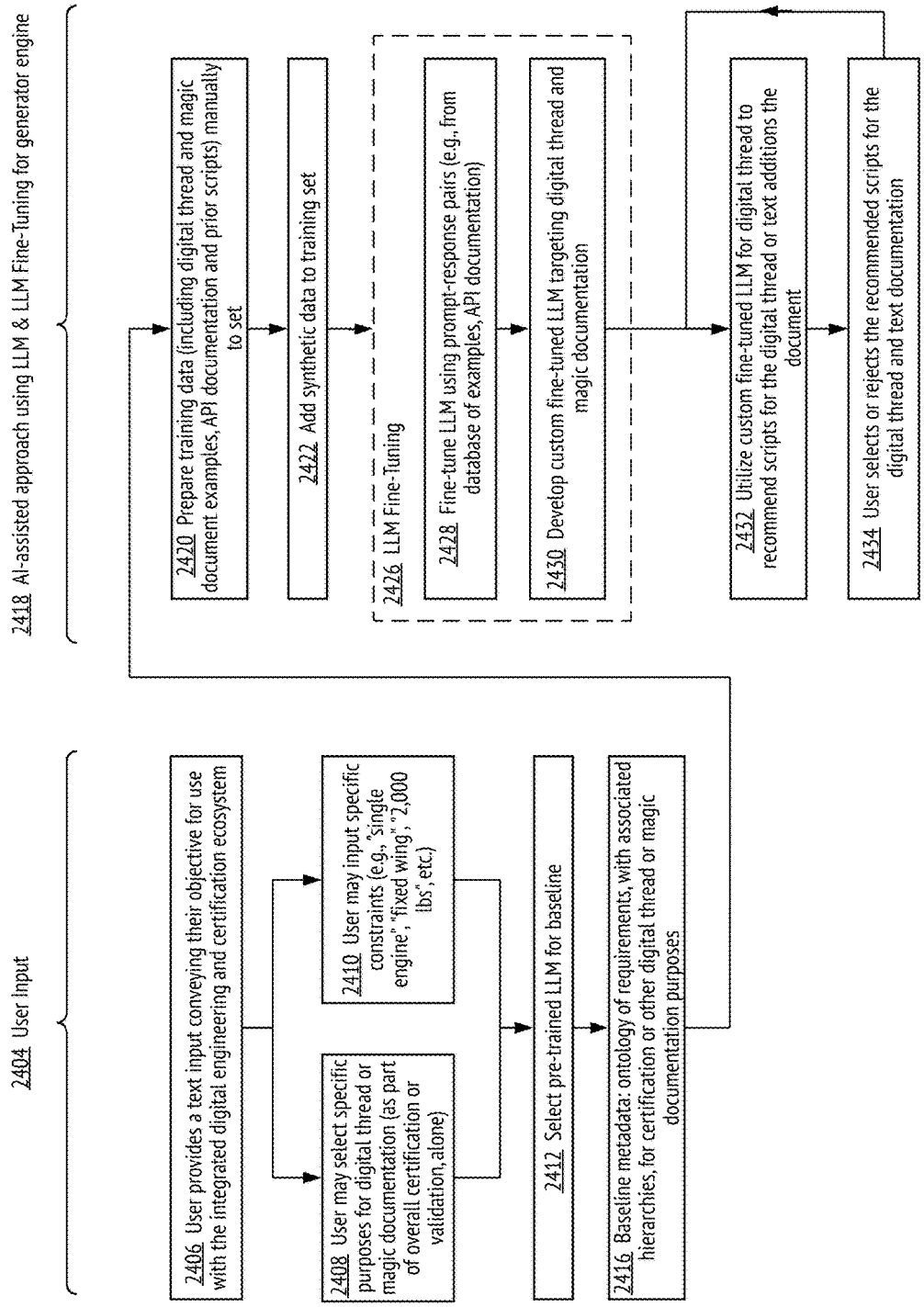

FIG. 24 shows a detailed process flow for digital thread and associated magic document creation using a generative AI-assisted approach, in accordance with the examples disclosed herein.

Exemplary Digital Thread Graphical User Interfaces

Figure 25:
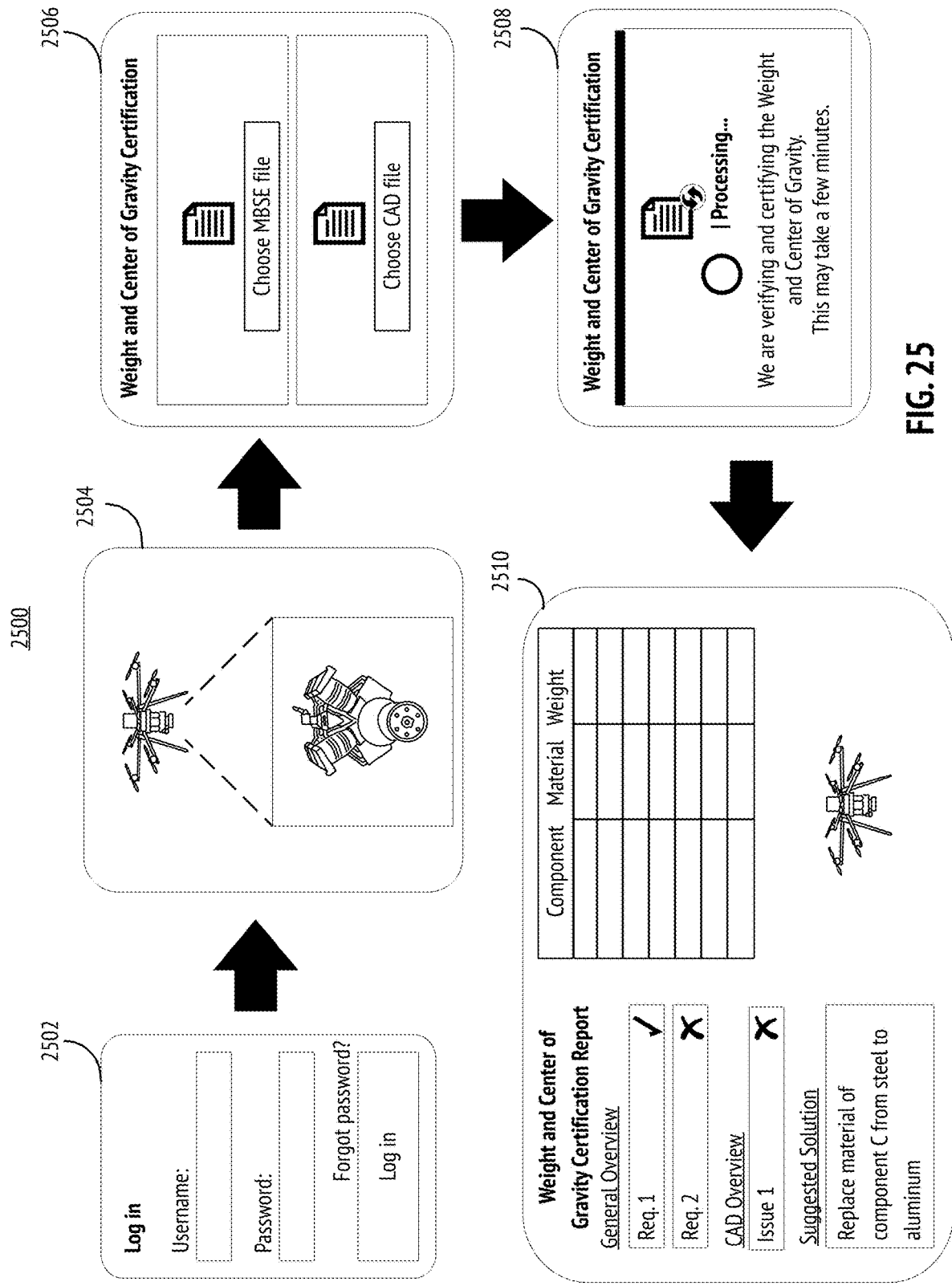

FIG. 25 shows graphical user interfaces (GUIs) associated with an example process flow for verifying and certifying requirements within an IDEP, in accordance with the examples disclosed herein.

Figure 26:
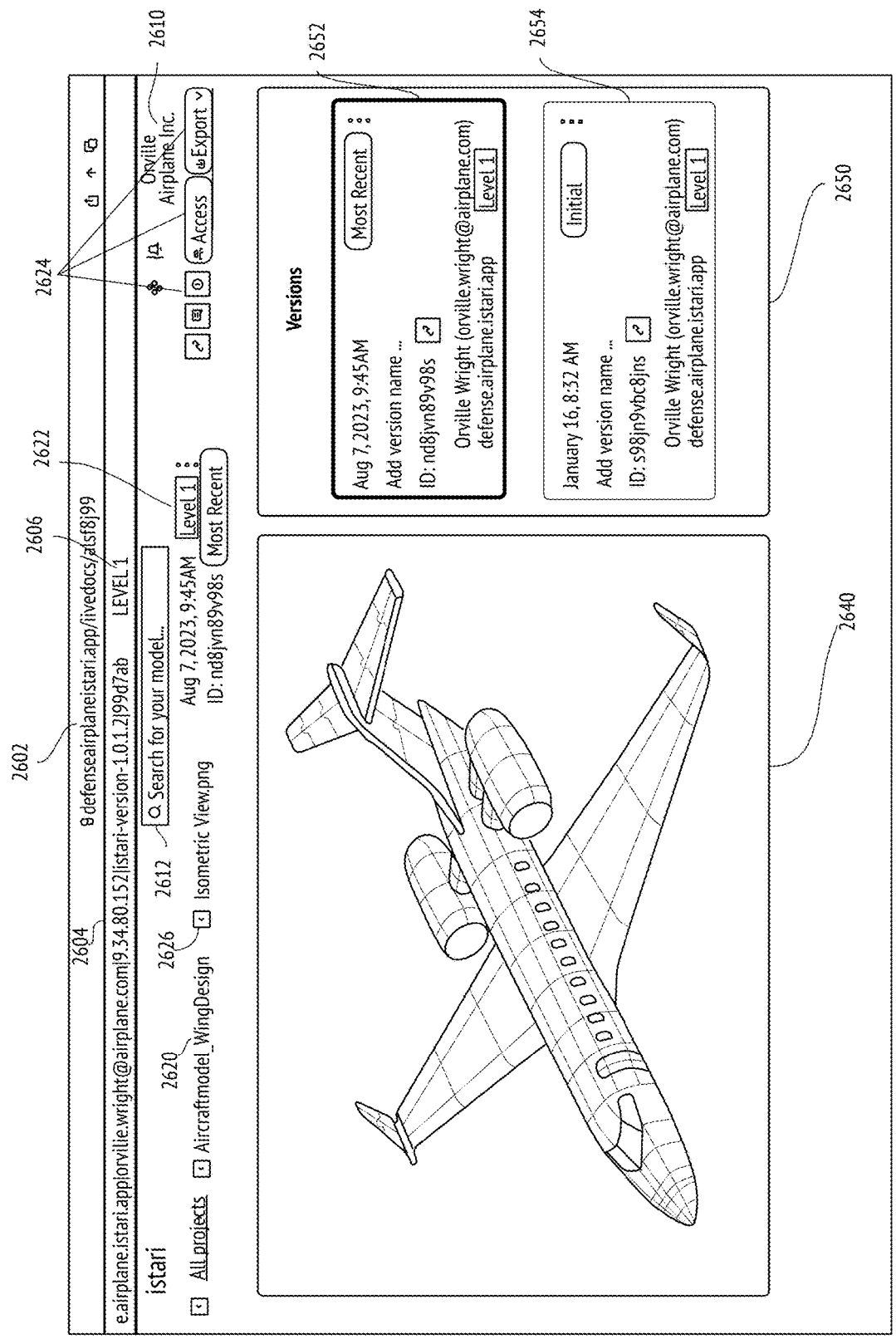

FIG. 26 shows a screenshot of an exemplary graphical user interface (GUI) used to operate a digital thread over the IDEP, according to one embodiment of the present invention.

Figure 27:
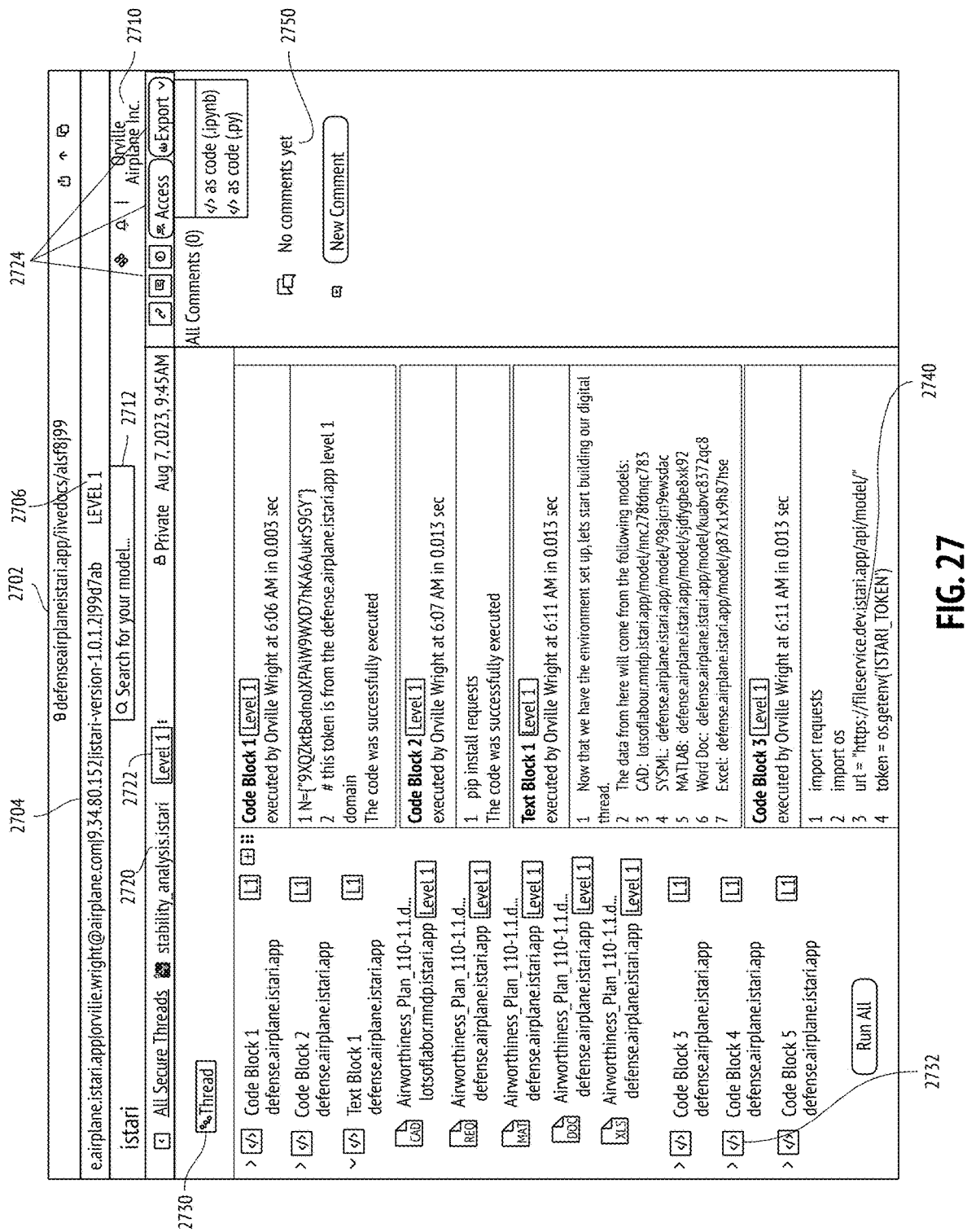

FIG. 27 shows a screenshot of another exemplary graphical user interface (GUI) used to operate a digital thread over the IDEP, according to one embodiment of the present invention.

Figure 28:
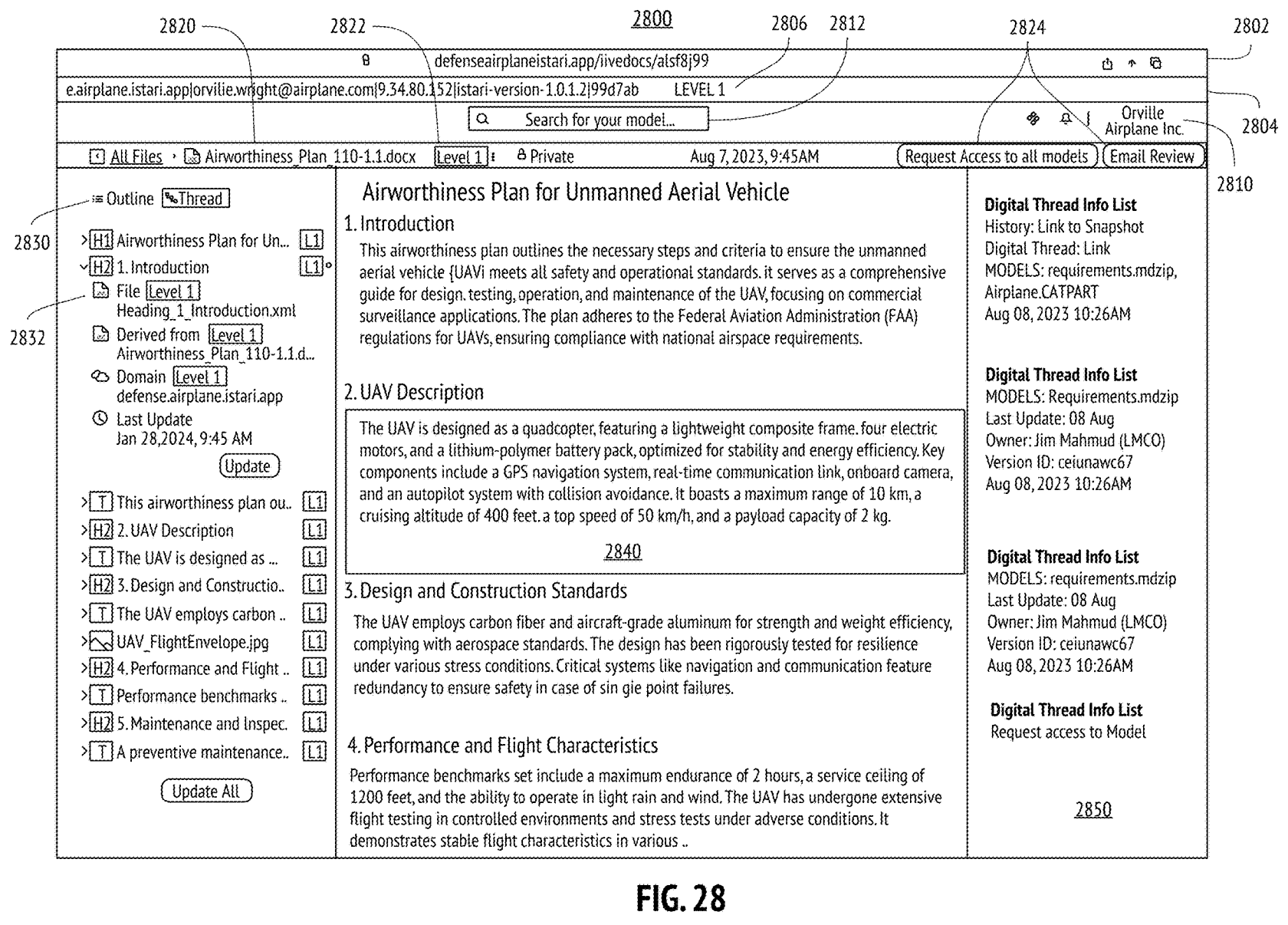

FIG. 28 shows a screenshot of an exemplary graphical user interface (GUI) used with the digital documentation system, according to one embodiment of the present invention.

Machine Learning Implementation Architecture for AI-Assisted Digital Threads

Figure 29:
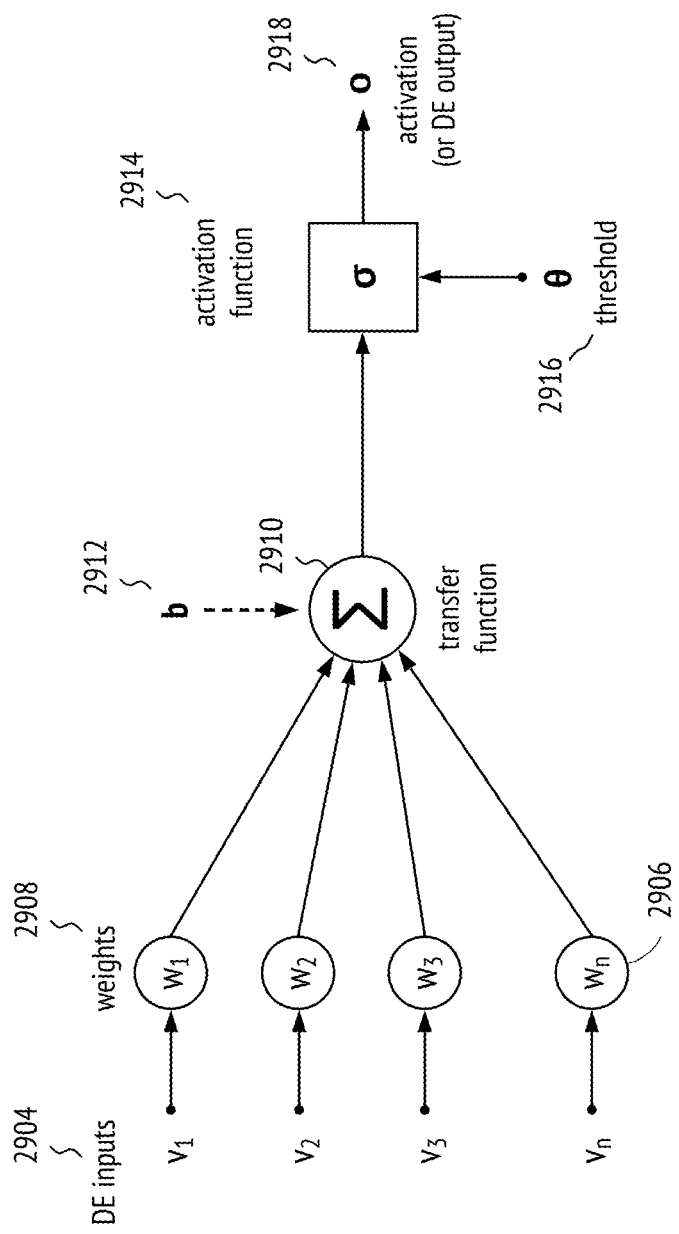

FIG. 29 describes neural network operation fundamentals, in accordance with some embodiments of the present invention.

Figure 30:
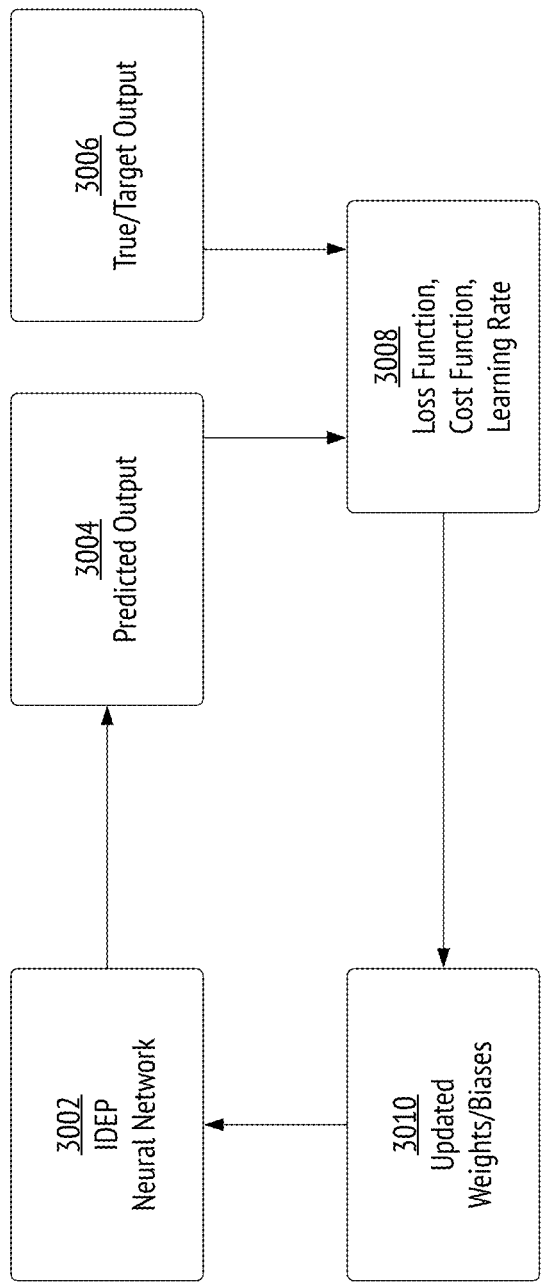

FIG. 30 shows an overview of an IDEP neural network training process, in accordance with some embodiments of the present invention.

Figure 31:
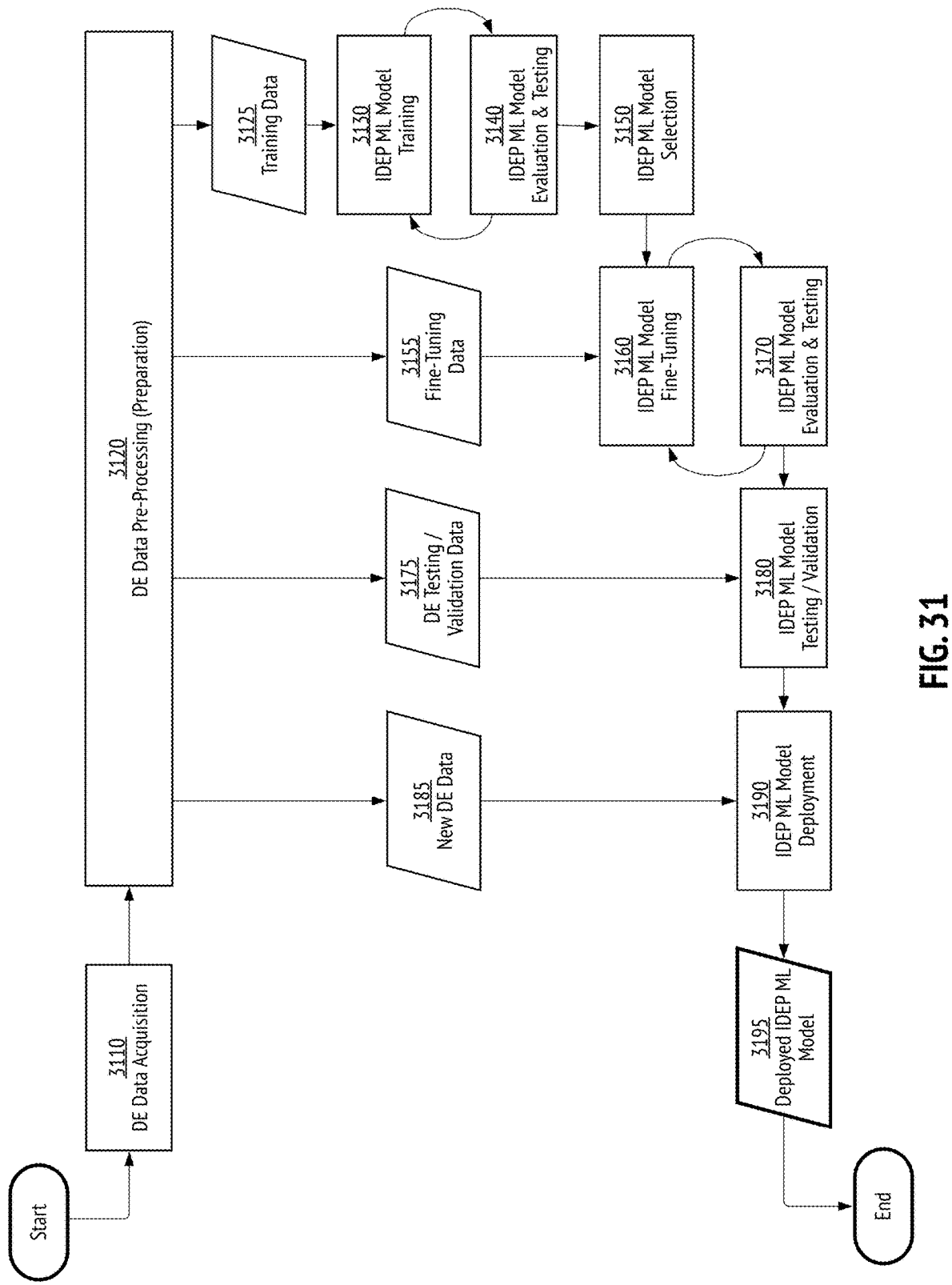

FIG. 31 is an illustrative flow diagram showing the different phases and datasets involved in training an IDEP machine learning model, in accordance with some embodiments of the present invention.

Hardware and Software Architecture for AI-Assisted Digital Threads

Figure 32:
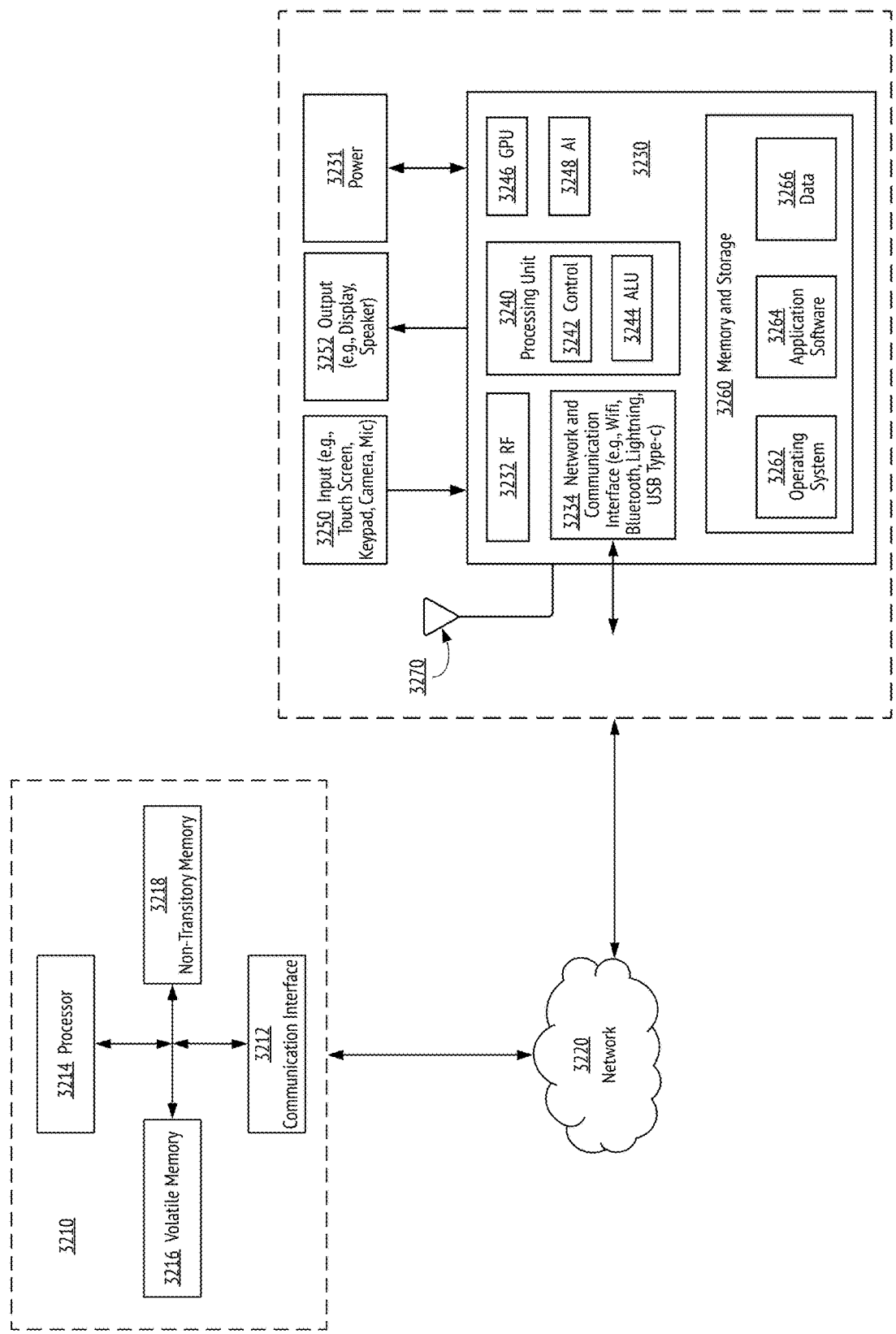

FIG. 32 provides illustrative schematics of a server (management computing entity) and a client (user computing entity) used for documentation within an IDEP, in accordance with some embodiments of the present invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Digital transformation represents a rapidly expanding market characterized by robust profit margins. However, its growth is hindered by a singular challenge driven: the creation of digital twins through interconnected models and simulations—known as a "digital thread"—is impeded by issues such as vendor lock-in, costly licenses, and technical debt. The technology landscape for digital transformation is both well-funded and dynamic, encompassing a range of technologies from the internet-of-things (IoT) and cloud-to-edge computing to API-first and code-first hardware, as well as advanced large language models and AI. This presents a substantial opportunity to integrate models and simulations with these technologies, thereby simplifying the creation of digital threads. Digital twins, which are part of the broader concept of Industry 4.0, are envisioned as interconnected models that not just simulate but also enhance our physical reality. Despite their potential, over 90% of digital transformation initiatives struggle to achieve success. Where they do succeed, they provide companies with exceptional capabilities for optimization and innovation, particularly through the use of AI in complex industrial systems. This invention envisions a future where technical barriers to digital transformation are eliminated, making digitization an easily accessible commodity. By integrating models and simulations through digital threads, the invention envisions the creation of industrial metaverses, the democratization of innovation, and the provision of abundant data for AI to learn from. Instead of the current labor-intensive process of creating digital threads, the invention would allow for their mass production. This would involve an adjustable application layer between models and simulations, uploaded to an interconnected digital engineering platform (IDEP), which would facilitate customization and maintain ease of integration even as models evolve. The invention enables the mass-production of digital threads. By constructing an application layer atop model splices, the platform would offer customization, case of integration, and a suite of applications from third-party developers. The ultimate goal is to create a digital engineering ecosystem that feels akin to a software development stack, providing tremendous customer value and a positive user experience.

With reference to the figures, embodiments of the present invention are now described in detail. First, the general digital engineering (DE) system and terminologies are introduced. Next, the interconnected digital engineering platform (IDEP) is explained in detail. Finally, the digital threading system, with and without AI-assistance, which may be considered a subsystem of the IDEP, is described in detail General Terminology Some illustrative terminologies used with the IDEP are provided below to assist in understanding the present invention, but these are not to be read as restricting the scope of the present invention. The terms may be used in the form of nouns, verbs, or adjectives, within the scope of the definition.

Digital engineering (DE): According to the Defense Acquisition University (DAU) and the Department of Defense (DOD) Digital Engineering Strategy published in 2018, digital engineering is "an integrated digital approach to systems engineering, using authoritative sources of systems' data and models as a continuum across disciplines to support lifecycle activities from concept through disposal." Digital engineering incorporates digital technological innovations into an integrated, model-based approach that empowers a paradigm shift from the traditional design-build-test methodology of systems engineering to a new model-analyze-build methodology, thus enabling systems design, prototyping, and testing all in a virtual environment.

DE data: Digital engineering (DE) data comprises project management, program management, product management, design review, and/or engineering data.

DE data field: A data field for DE data, for example, in a DE document template.

Phases: The stages within a DE product lifecycle, including but not limited to, stakeholder analysis, concept studies, requirements definition, preliminary design and technology review, system modeling, final design, implementation, system assembly and integration, prototyping, verification and validation on system, sub-system, and component levels, and operations and maintenance.

DE model, also referred to as a "digital model": A computer-generated model that represents characteristics or behaviors of a complex product or system. A DE model can be created or modified using a DE tool, and a DE model may be represented by one or more DE model files. A DE model file is the computer model file created or modified using the DE tool. In the present disclosure, the terms "digital model", "DE model" and "DE model file" may be used interchangeably, as the context requires. A DE model within the IDEP as disclosed herein refers to any digital file uploaded onto the platform, including documents that are appropriately interpreted, as defined below. For example, a computer-aided design (CAD) file, a Systems Modeling Language (SysML) file, a Systems Requirements Document (SDR) text file, and a Neural Network Model JSON file may each be considered a DE model, in various embodiments of the present invention. A DE model may be machine-readable only, may be human-readable as well but written in programming codes, or may be human-readable and written in natural language-based texts. For example, a word-processing document comprising a technical specification of a product, or a spreadsheet file comprising technical data about a product, may also be considered a DE model.

Interconnected Digital Engineering Platform (IDEP), also referred to as a "Digital Engineering and Certification Ecosystem": According to the DAU, a "DE ecosystem" is the "interconnected infrastructure, environment, and methodology (process, methods, and tools) used to store, access, analyze, and visualize evolving systems' data and models to address the needs of the stakeholders." Embodiments of the IDEP as disclosed herein comprise software platforms running on hardware to realize the aforementioned capabilities under zero-trust principles. A DE and certification ecosystem performs verification and validation tasks, defined next.

Verification: According to the DAU, verification "confirms that a system element meets design-to or build-to specifications. Through the system's life cycle, design solutions at all levels of the physical architecture are verified through a cost-effective combination of analysis, examination, demonstration, and testing." Verification refers to evaluating whether a product, service, or system meets specified requirements and is fit for its intended purpose, checking externally against customer or stakeholder needs. For example, in the aerospace industry, a verification process may include testing an aircraft component to ensure it can withstand the forces and conditions it will encounter during flight.

Validation: According to the DAU, validation is "1) the review and approval of capability requirement documents by a designated validation authority. 2) The process by which the contractor (or as otherwise directed by the DoD component procuring activity) tests a publication/technical manual for technical accuracy and adequacy. 3) The process of evaluating a system or software component during, or at the end of, the development process to determine whether it satisfies specified requirements." Thus, validation refers to evaluating whether the overall performance of a product, service, or system is suitable for its intended use, including its compliance with regulatory requirements, and its ability to meet the needs of its intended users, checking internally against specifications and regulations. For example, for an industrial product manufacturing, a validation process may include consumer surveys that inform product design, modeling and simulations for validating the design, prototype testing for failure limits and feedback surveys from buyers.

Common Verification & Validation (V&V) products: Regulatory and certification standards, compliances, calculations, and tests (e.g., for the development, testing, and certification of products and/or solutions) are referred to herein as "common V&V products."

DE tool: A tool or DE tool is a DE application software (e.g., a CAD software), computer program, and/or script that creates or manipulates a DE model during at least one stage or phase of a product lifecycle. A DE tool may comprise multiple functions or methods.

Application Programming Interface (API): A software interface that provides programmatic access to services by a software program, thus allowing application software to exchange data and communicate with each other using standardized requests and responses. It allows different programs to work together without revealing the internal details of how each works. A DE tool is typically provided with an API library for code-interface access.

Script: A sequence of instructions that is interpreted and run within or carried out by another program, without compilation into a binary file to be run by itself through a computer processor without the support of other programs.

API scripts: Scripts that implement particular functions available via the IDEP as disclosed herein. An API script may be an API function script encapsulated in a model splice, or an "orchestration script" or "platform script" that orchestrates a workflow through a digital thread built upon interconnected model splices.

Platform API or ISTARI API: A library of API scripts available on the IDEP as disclosed herein.

API function scripts, "splice functions," "splice methods," "ISTARI functions," or "function nodes": A type of API scripts. When executed, an API function script inputs into or outputs from a DE model or DE model splice. An "input" function, input method, or "input node" allows updates or modifications to an input DE model. An "output" function, output method, or "output node" allows data extraction or derivation from an input DE model via its model splice. An API function script may invoke native API function calls of native DE tools, where the terms "native" and "primal" may refer to existing DE model files, functions, and API libraries associated with specific third-party DE tools, including both proprietary and open-source ones.

Endpoints: an endpoint in the context of software and networking is a specific digital location or destination where different software systems communicate with each other. It enables external systems to access the features or data of an application, operating system, or other services. An API endpoint is the point of interaction where APIs receive requests and return data in response. A software development kit (SDK) endpoint or SDK-defined endpoint similarly provides a service handle for use with an SDK. References to API endpoints in the present disclosure are equally applicable to SDK endpoints.

Artifact: According to the DAU, a digital artifact is "an artifact produced within, or generated from, a DE ecosystem" to "provide data for alternative views to visualize, communicate, and deliver data, information, and knowledge to stakeholders." In the present disclosure, a "digital artifact" or "artifact" is an execution result from an output API function script within a model splice. Multiple artifacts may be generated from a single DE model or DE model splice.

Model splice: Within the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. The splice functions provide unified and standardized input and output API endpoints for accessing and manipulating the DE model data. The DE model data are model-type-specific, and a model splice is associated with model-type-specific input and output schemas. One or more different model splices may be generated from the same input DE model file(s), based on the particular user application under consideration, and depending on data access restrictions. In some contexts, the shorter terms "splice", "wrapper", and/or "graft" are used to refer to spliced, wrapped, and/or grafted DE models.

Model representation: Within the present disclosure, "model representation" of a given DE model includes any embodiment of the engineering model in the form of DE model file(s), model splices, and/or collections of digital artifacts derived from the DE model. In some embodiments, a DE model representation comprises model-type-specific locators to DE model data and metadata, potentially including standardized input and output API endpoints for accessing and manipulating the DE model data. Discussions related to the usage of model splices in the present disclosure are applicable to any other forms of model representation as well.

Model splicing or DE model splicing: A process for generating a model splice from a DE model file. DE model splicing encompasses human-readable document model splicing, where the DE model being spliced is a human-readable text-based document.

Model splicer: Program code or script (uncompiled) that performs model splicing of DE models. A DE model splicer for a given DE model type, when applied to a specific DE model file of the DE model type, retrieves, extracts, or derives DE model data associated with the DE model file, generates and/or encapsulates splice functions and instantiates API endpoints according to input/output schemas.

Model splice linking: Generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first and a second splice (e.g., input splice functions from both model splices are called upon). In the present disclosure, "model linking" and "model splice linking" may be used interchangeably, as linked model splices map to correspondingly linked DE models.

Digital thread, Software-defined digital thread, Software-code-defined digital thread, Software digital thread, or Code digital thread: According to the DAU, a digital thread is "an extensive, configurable and component enterprise-level analytical framework that seamlessly expedites the controlled interplay of authoritative technical data, software, information, and knowledge in the enterprise data-information-knowledge systems, based on the digital system model template, to inform decision makers throughout a system's lifecycle by providing the capability to access, integrate, and transform disparate data into actionable information." Within the IDEP as disclosed herein, a digital thread is a platform script that calls upon the platform API to facilitate, manage, or orchestrate a workflow through linked model splices to provide the aforementioned capabilities. That is, a digital thread within the IDEP is a script that connects data from one or more DE models, data sources, or physical artifacts to accomplish a specific mission or business objective, and may be termed a "software-defined digital thread" or "software digital thread" that implements a communication framework or data-driven architecture that connects traditionally siloed DE models to enable seamless information flow among the DE models via model splices.

Tool linking: Similar to model splice linking, tool linking generally refers to jointly accessing two or more DE tools via model splices, where model splice functions that encapsulate disparate DE tool functions are called upon jointly to perform a DE task.

Zero-trust ("ZT") security: An information security principle based on the assumption of no implicit trust between any elements, agents, or users. Zero trust may be carried out by implementing systematic mutual authentication and least privileged access, typically through strict access control, algorithmic impartiality, and data isolation. Within the IDEP as disclosed herein, least privileged access through strict access control and data isolation may be implemented via model splicing and the IDEP system architecture.

Hyperscale capabilities: The ability of a system architecture to scale adequately when faced with massive demand.

IDEP enclave or DE platform enclave: A central command hub responsible for the management and functioning of DE platform operations. An enclave is an independent set of cloud resources that are partitioned to be accessed by a single customer (i.e., single-tenant) or market (i.e., multi-tenant) that does not take dependencies on resources in other enclaves.

IDEP exclave or DE platform exclave: A secondary hub situated within a customer environment to assist with customer DE tasks and operations. An exclave is a set of cloud resources outside enclaves managed by the IDEP, to perform work for individual customers. Examples of exclaves include virtual machines (VMs) and/or servers that the IDEP maintains to run DE tools for customers who may need such services.

Digital twin: According to the DAU, a digital twin is "a virtual replica of a physical entity that is synchronized across time. Digital twins exist to replicate configuration, performance, or history of a system. Two primary sub-categories of digital twin are digital instance and digital prototype." A digital instance is "a virtual replica of the physical configuration of an existing entity; a digital instance typically exists to replicate each individual configuration of a product as-built or as-maintained." A digital prototype is "an integrated multi-physical, multiscale, probabilistic model of a system design; a digital prototype may use sensor information and input data to simulate the performance of its corresponding physical twin; a digital prototype may exist prior to realization of its physical counterpart." Thus, a digital twin is a real-time virtual replica of a physical object or system, with bi-directional information flow between the virtual and physical domains.

Authoritative twin: A reference design configuration at a given stage of a product life cycle. At the design stage, an authoritative twin is the twin configuration that represents the best design target. At the operational stage, an authoritative twin is the twin configuration that best responds to the actual conditions on the ground or "ground-truths".

Admins or Administrators: Project managers or other authorized users. Admins may create templates in the documentation system and have high-level permissions to manage settings in the IDEP.

Requesters: Users who use the platform for the implementation of the modeling and simulations towards certification and other purposes, and who may generate documentation in the digital documentation system, but do not have admin privileges to alter the required templates, document formats, or other system settings.

Reviewers/Approvers: Users who review and/or approve templates, documents, or other system data.

Contributors: Users who provide comments or otherwise contribute to the IDEP.

An Interconnected Digital Engineering Platform (IDEP) Architecture

FIG. 1 shows an exemplary interconnected digital engineering platform (IDEP) architecture, in accordance with some embodiments of the present invention. IDEP 100 streamlines the process of product development from conception to production, by using a virtual representation or digital twin (DTw) 122 of the product to optimize and refine features before building a physical prototype or physical twin (PTw) 132, and to iteratively update DTw 122 until DTw 122 and PTw 132 are in sync to meet the product's desired performance goals.

Specifically, a product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) manufacturer may use IDEP platform 100 to develop a new product. The engineering team from the manufacturer may create or instantiate digital twin (DTw) 122 of the product in a virtual environment 120, encompassing detailed computer-aided design (CAD) models and finite element analysis (FEA) or computational fluid dynamics (CFD) simulations of component systems such as fuselage, wings, engines, propellers, tail assembly, and aerodynamics. DTw 122 represents the product's design and performance characteristics virtually, allowing the team to optimize and refine features before building a physical prototype 132 in a physical environment 130. In some embodiments, PTw 132 may be an existing entity, while DTw 122 is a digital instance that replicates individual configurations of PTw 132, as-built or as-maintained. In the present disclosure, for illustrative purposes only, DTw 122 and PTw 132 are discussed in the context of building a new product, but it would be understood by persons of ordinary skill in the art that the instantiation of DTw 122 and PTw 132 may take place in any order, based on the particular use case under consideration.

Digital models (e.g., CAD models, FEA models, CFD models) used for creating DTw 122 are shown within a model plane 180 in FIG. 1. Also shown in model plane 180 is a neural network (NN) model 184, which may provide machine-learning based predictive modeling and simulation for a DE process. A DE model such as 182 may be spliced into one or more model splices, such as 172 and 173 within a splice plane 170. Individual DTws such as 122 are instantiated from splice plane 170 via an application plane 160. A model splice such as 172 may be linked to another model splice such as 171 by a platform script or application 162 on application plane 160 into a digital thread. Multiple digital threads such as 162 and 163 may be further linked across different stages or phases of a product life cycle, from concept, design, testing, to production. Digital threads further enable seamless data exchange and collaboration between departments and stakeholders, ensuring optimized and validated designs.

As model splicing provides input and output splice functions that can access and modify DE model data, design updates and DE tasks associated with the digital threads may be represented by scripted, interconnected, and pipelined tasks arranged in Directed Acyclic Graphs (DAGs) such as 124. A DE task DAG example is discussed in further detail with reference to FIG. 10.

To enhance the design, external sensory data 140 may be collected, processed, and integrated into application plane 160. This process involves linking data from different sources, such as physical sensors 134 on prototype 132, physical environmental sensors 136, and other external data streams such as simulation data from model plane 180. API endpoints provide access to digital artifacts from various environments (e.g., physical twin (PTw) sensor 134 data) and integrate them into the spliced plane 170 for the DTw 122. Model splices on the splice plane 170 enable autonomous data linkages and digital thread generation, ensuring DTw 122 accurately represents the product's real-world performance and characteristics.

To validate DTw 122's accuracy, the engineering team may build or instantiate PTw 132 based on the same twin configuration (i.e., digital design). Physical prototype 132 may be equipped with numerous sensors 134, such as accelerometers and temperature sensors, to gather real-time performance data. This data may be compared with the DTw's simulations to confirm the product's performance and verify its design.

Processed sensory data 144 may be used to estimate parameters difficult to measure directly, such as aerodynamic forces or tire contact patch forces. Such processed sensory data provide additional data for DTw 122, further refining its accuracy and reliability. Processed sensory data 144 may be generated from physical environment sensors 136 with physical environment 130, and may be retrieved from other external databases 142, as discussed below.

During development, feedback from customers and market research may be collected to identify potential improvements or adjustments to the product's design. At an analysis & control plane (ACP) 150, subject matter experts (SMEs) may analyze processed sensory data 144 and external expert feedback 114, to make informed decisions on necessary design changes. Such an analysis 154 may be enhanced or entirely enabled by algorithms (i.e., static program code) or artificial intelligence (AI) modules. Linking of digital threads such as 162, physical sensors 134 and 136, processed sensory data 144, and expert feedback data 114 occurs at ACP 150, where sensor and performance data is compared, analyzed, leading to modifications of the underlying model files through digital threads.

In particular, sensory data 144 from physical environment 130 and performance data 126 from virtual environment 120 may be fed into a comparison engine 152. Comparison engine 152 may comprise tools that enable platform users to compare various design iterations with each other and with design requirements, identify performance lapses and trends, and run verification and validation (V&V) tools.

Model splicing is discussed in further detail with reference to FIGS. 7 to 9, and 11 to 33. Model splicing enables the scripting of any DE operation involving DE model files in model plane 180, where each DE model is associated with disparate and siloed DE tools. Codification of DE models and DE operations with a unified corpus of scripts enable IDEP 100 to become an aggregator where a large space of DE activities associated with a given product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) may be threaded through program code. Thus, model splicing enables the linking and manipulation of all model files (e.g., 182, 184) associated with a given product within the same interconnected DE platform or DE ecosystem 100. As a consequence, the generation and training of AI modules for the purpose of manipulating DE models (e.g., 182), digital threads (e.g., 162), and digital twins (e.g., 122) become possible over the programmable and unified IDEP 100.

Virtual and Physical Feedback Loops

FIG. 1 uses letter labels "A" to "H" to denote different stages of a product's lifecycle. At each stage, IDEP 100 enables feedback loops whereby data emanating from a PTw or a DTw is analyzed at ACP 150, leading to the generation of a new twin configuration based on design modifications. The new twin configuration may be stored in a twin configuration set and applied through the application and splice planes, yielding modified model files that are registered on the digital thread.

A virtual feedback loop 104 starts with a decision 106 to instantiate new DTw 122. A DAG of hierarchical tasks 124 allows the automated instantiation of DTw 122 within virtual environment 120, based on a twin configuration applied at a process step 108 from a twin configuration set 156. DTw 122 and/or components thereof are then tested in virtual environment 120, leading to the generation of DTw performance data 126. Concurrently, DTw 122 and/or components thereof may be tested and simulated in model plane 180 using DE software tools, giving rise to test and simulation performance data 174. Performance data 126 and 174 may be combined, compared via engine 152, and analyzed at ACP 150, potentially leading to the generation and storage of a new twin configuration. The eventual decision to instantiate a DTw from the new twin configuration completes virtual feedback loop 104.

A physical feedback loop 102 starts with a decision 106 to instantiate a new PTw 132. PTw 132 may be instantiated in a physical environment 130 from the model files of model plane 180 that are associated with an applied twin configuration from the twin configuration set 156. PTw 132 and/or components thereof are then tested in physical environment 132, leading to the generation of sensory data from PTw sensors 134 and environmental sensors 136 located in physical environment 130. This sensory data may be combined with data from external databases to yield processed sensory data 144.

Data from PTw sensors 134 may be directly added to the model files in model plane 180 by the DE software tools used in the design process of PTw 132. Alternatively, PTw sensor data may be added to digital thread 162 associated with PTw 132 directly via application plane 160. In addition, processed sensory data 144 may be integrated into IDEP 100 directly via application plane 160. For example, processed sensory data 144 may be sent to ACP 150 for analysis, potentially leading to the generation and storage of a new twin configuration. The eventual decision to instantiate a PTw from the new twin configuration completes physical feedback loop 102.

At each stage A to H of the product life cycle, the system may label one twin configuration as a current design reference, herein described as an "authoritative twin" or "authoritative reference". The authoritative twin represents the design configuration that best responds to actual conditions (i.e., the ground truth). U.S. provisional patent application No. 63/470,870 provides a more complete description of authoritative twins and their determination, and is incorporated by reference in its entirety herein.

With faster feedback loops from sensor data and expert recommendations, the system updates DTw 122 to reflect latest design changes. This update process may involve engineering teams analyzing feedback 154 and executing the changes through IDEP 100, or automated changes enabled by IDEP 100 where updates to DTw 122 are generated through programmed algorithms or AI modules. This iterative updating process continues until DTw 122 and PTw 132 are in sync and the product's performance meets desired goals. While IDEP 100 may not itself designate the authoritative reference between a DTw or a PTw, the platform provides configurable mechanisms such as policies, algorithms, voting schema, and statistical support, whereby agents may designate a new DTw as the authoritative DTw, or equivalently in what instances the PTw is the authoritative source of truth.

When significant design improvements are made, a new PTw prototype may be built based on the updated DTw. This new prototype undergoes further testing and validation, ensuring the product's performance and design align with project objectives.

Once DTw 122 and PTw 132 have been validated and optimized, the product is ready for production. A digital thread connecting all stages of development can be queried via splice plane 170 to generate documentation as needed to meet validation and verification requirements. The use of model splicing, along with the feedback architecture shown in FIG. 1, improves the efficiency of the overall product innovation process.

Interconnected DE Platform and Product Lifecycle

In FIG. 1, letter labels "A" to "H" indicate the following major steps of a product lifecycle, according to some embodiments of the current invention:

A. Digital models reside within customer environments: a product may be originally represented by model files that are accessible via software tools located within customer environments. Model plane 180 encompasses all model files (e.g., 182) associated with the product.

B. Preparatory steps for design in the digital realm: splice plane 170 encompasses model splices (e.g., 172) generated from DE model file through model splicing. Model splicing enables the integration and sharing of DE model files within a single platform, as described in detail with reference to FIGS. 7 to 9, and 11 to 33

C. Link threads as needed among model splices: to implement a product, model splices are linked through scripts within application plane 160. A digital twin (DTw) 122 englobing as-designed product features may be generated from application plane 160 for running in virtual environment 120. The complete twin configuration of a generated DTw is saved in twin configuration set 156 located at the analysis & control plane (ACP) 150. Features or parts of DTw 122 may be simulated in model plane 180, with performance data 174 accessed through splice plane 170. In one embodiment, features or parts of PTw 132 or DTw 122 configuration may be simulated outside the platform, where performance data is received by the ACP 150 for processing, in a similar way as performance data 126 received from DTw 122.

D. Finalize "As-designed": performance data 126 from DTw 122 or simulation performance data 174 attained through model plane 180 and accessed through model splicing may be collected and sent to ACP 150 for analysis. Performance data from different iterations of DTw 122 may be compared via engine 152 to design requirements. Analysis of the differences may lead to the generation of new twin configurations that are stored at twin configuration set 156. Each twin configuration in twin configuration set 156 may be applied at application plane 160 and splice plane 170 via process step 108 to instantiate a corresponding DTw. Multiple DTws may be generated and tested, consecutively or simultaneously, against the design requirements, through comparison engine 152 and analysis module 154. Verification and validation tools may be run on the various DTw iterations.

E. Finalize "As-manufactured": once a DTw 122 satisfies the design requirements, a corresponding PTw 132 prototype may be instantiated from the spliced model files (e.g., 172). Sensor data originating from the PTw 134 or from within the physical environment 136 may be collected, combined with other external data 142 (e.g., sensor data from other physical environments). The resulting processed sensory data 144 may be sent to the analysis & control plane 150 to be compared with performance data 126 from DTws and simulations (e.g., 174), leading to further DTw 122 and PTw 132 iterations populating the twin configuration set 156. Processed sensory data 144 may also be mapped to the digital threads (e.g., 164) and model splices (e.g., 172) governing the tested PTw 132 through the application plane 160.

F. Finalize "As-assembled": once the manufacturing process is completed for the various parts, as a DTw and as a PTw, the next step is to finalize the assembled configuration. This involves creating a digital representation of the assembly to ensure it meets the specified requirements. The digital assembly takes into account the dimensions and tolerances of the "as-manufactured" parts. To verify the feasibility of the digital assembly, tests are conducted using the measured data obtained from the physical assembly and its individual components. Measurement data from the physical component parts may serve as the authoritative reference for the digital assembly, ensuring alignment with the real-world configuration. The digital assembly is compared with the actual physical assembly requirements for validation of the assembled configuration. Subsequently, the digital assembly tests and configurations serve as an authoritative reference for instructions to guide the physical assembly process and ensure accurate replication. IDEP 100 components described above may be used in the assembly process. In its authoritative iteration, DTw 122 ultimately captures the precise details of the physical assembly, enabling comprehensive analysis and control in subsequent stages of the process.

G. Finalize "As-operated": to assess the performance of the physical assembly or its individual component parts, multiple digital twins 122 may be generated as needed. These digital twins are created based on specific performance metrics and serve as virtual replicas of the physical system. Digital twins 122 are continuously updated and refined in real-time using the operational data (e.g., 144) collected from monitoring the performance of the physical assembly or its components. This data may include, but are not limited to, processed sensory data, performance indicators, and other relevant information. By incorporating this real-time operational data, digital twins 122 stay synchronized with the actual system and provide an accurate representation of its operational performance. Any changes or improvements observed via sensory data 144 during the real-world operation of the assembly are reflected in DE models within the digital twins and recorded in the twin configuration set 156. This ensures that the digital twins remain up-to-date and aligned with the current state of the physical system.

H. Predictive analytics/Future performance: The design process may continue iteratively in virtual environment 120 through new DTw 122 configurations as the product is operated. Multiple digital twins may be created to evaluate the future performance of the physical assembly or its component parts based on specific performance metrics. Simulations are conducted with various control policies to assess the impact on performance objectives and costs. The outcome of these simulations helps in deciding which specific control policies should be implemented (e.g., tail volume coefficients and sideslip angle for an airplane product). The digital twin DE models (e.g., 182) are continuously updated and refined using the latest sensor data, control policies, and performance metrics to enhance their predictive accuracy. This iterative process ensures that the digital twins (e.g., 122, 156) provide reliable predictions of future performance and assist in making informed decisions.

The hardware components making up IDEP 100 (e.g., servers, computing devices, storage devices, network links) may be centralized or distributed among various entities, including one or more DE service providers and DE clients, as further discussed in the context of FIGS. 3 and 4. FIG. 4 shows an illustration of various potential configurations for instancing a DE platform within a customer's physical system and information technology (IT) environment, usually a virtual private cloud (VPC) protected by a firewall.

DE Documentation with Live or Magic Documents

The methods and systems described herein enable the updating and generation of DE documents using the full functionality of the IDEP shown in FIG. 1. In FIG. 1, the IDEP virtual feedback loop 104 allows the scripting of program code within a digital thread 162 for the generation, storing, and updating of digital twins 122 and twin configurations 156. Similarly, the IDEP virtual feedback loop 104 also allows the scripting of program code within a digital thread 162 for the generation, storing, and updating of DE documents. This enables the creation and maintenance of so-called live digital engineering documents.

Live DE documents are more akin to a DTw than a conventional static document in that they are configured, through a digital thread, to be continuously updated to reflect the most current changes within a particular twin configuration. In particular, an authoritative live DE document is configured to reflect the latest authoritative twin configuration. The "printing" of a live DE document corresponds to the generation of a frozen (i.e., static) time-stamped version of a live DE document. Therefore, "printing"—for a live DE document—is equivalent to "instantiation" for a DTw.

Live DE documents may also be known as magic documents as changes implemented within a twin configuration (e.g., through a modification of a model file) may appear instantaneously within the relevant data fields and sections of the live DE document. Similarly, authoritative live DE documents may also be known as authoritative magic documents as they continuously reflect data from the authoritative twin, thus always representing the authoritative source of truth.

Given the massive quantities of data and potential modifications that are carried out during a product's lifecycle, the scripts implementing live DE documentation may be configured to allow for a predefined maximum delay between the modification of a model file and the execution of the corresponding changes within a live DE document. Moreover, for similar reasons, the scripts implementing live DE documentation may be restricted to operate over a specified subset of model files within a DTw, thus reflecting changes only to key parameters and configurations of the DTw.

In one embodiment of the present invention, an IDEP script (e.g., an IDEP application) having access to model data via one or more model splices and DE document templates to create and/or update a live DE document may dynamically update the live DE document using software-defined digital threads over an IDEP platform. In such an embodiment, the IDEP script may receive user interactions dynamically. In response to the user updating data for a model and/or a specific parameter setting, the IDEP script may dynamically propagate the user's updates into the DE document through a corresponding digital thread.

In another embodiment of the present invention, the IDEP script may instantiate a DE document with sufficient specification to generate a physical twin (PTw). In such an embodiment, the IDEP script may receive a digital twin configuration of a physical twin, generate a live DE document associated with the digital twin configuration, receive a predetermined timestamp, and generate a printed DE document (i.e., a static, time-stamped version of the live DE document at the predetermined timestamp). Such an operation may be referred to as the "printing of a digital twin".

In yet another embodiment of the present invention, an IDEP script may instantiate (i.e., "print") a DE document specifying an updated digital twin upon detecting the update. In such an embodiment, the IDEP script may detect a modification of a DE model or an associated digital thread. In response to detecting the modification, the IDEP script may update relevant data fields and sections of the live DE document based on the detected modification, and generate an updated printed DE document with the updated relevant data fields and sections based on the always-updated live DE document.

In various embodiments, a software-code-defined digital thread may be associated with a companion magic document (or "magic doc") that provides explainability and allows an audit trail for the digital thread. This "magic document" may be generated with the help of AI, elucidating the process through which the digital thread efficiently converts the user's intent into orchestration scripts that include relevant model splices and splice functions. Specifically, a magic document generated by the IDEP may explain the digital thread's implementation of the user intent, and may comprise pseudocode, scripts, data fields, and natural language-based descriptions. When the digital thread and accompanying orchestration scripts are executed to perform a DE task, the magic document may record the task completion for auditability. A digital thread may comprise orchestration scripts in sequence. One or more corresponding magic documents for a digital thread may invoke a subset of data points and orchestration script examples as needed. In some embodiments, a script-generating ML model receiving as input pseudocode or detailed user instructions derived from a user's intent, may be trained on prior IDEP digital threads, documents, and optionally the IDEP platform API documentation. In addition to generating a digital thread (with orchestration scripts and comments), the script-generating ML model may also be configured to generate a magic doc that explains how the generated digital thread addresses the user intent.

In some embodiments, receiving user interactions with a DE model, modifications to a DE model, or modifications to an associated digital thread, may be carried out through a push configuration, where a model splicer or a script of the digital thread sends any occurring relevant updates to the IDEP script immediately or within a specified maximum time delay. In other embodiments, receiving user interactions with a DE model, modifications of a DE model, or modifications of an associated digital thread, may be carried out through a pull configuration, where a model splicer or a script of the digital thread flag recent modifications until the IDEP script queries relevant DE models (via their model splices) or associated digital threads, for flagged modification. In these embodiments, the IDEP script may extract the modified information from the modified DE models (via their model splices) or the modified digital threads, in order to update a live DE document. In yet other embodiments, receiving user interactions with a DE model, modifications of a DE model, or modifications of an associated digital thread, may be carried out through a pull configuration, where the IDEP script regularly checks relevant DE models (via their model splices) or associated digital threads, for modified data fields, by comparing the data found in the live DE document with regularly extracted model and digital thread data. In these embodiments, the IDEP script may use the modified data to update the live DE document.

Dynamic Document Updates

Some embodiments described herein center around documentation, or document preparation and update and on document management (e.g., for reviews). As discussed, some embodiments of the system allow for dynamic updates to documents, which pertain to software-defined digital threads in the IDEP platform and the accompanying documentation.

Use of an ML engine with the model data and templates to create and/or update documents almost instantaneously as a one-time action have been presented. Furthermore, the digital engineering platform interacts dynamically with the user. As the user interacts with the system and updates data for a model or a specific parameter setting, these changes may be propagated through the corresponding digital threads and to the associated documentation. The AI architectures involved include locally-instanced large language model (LLMs, for data security reasons) as well as non-LLM approaches (e.g., NLP-based), in order to create, update, or predict documentation in the form of sentences, paragraphs, and whole documents. At the same time, trying to update the entire system of digital threads for every update may be prohibitively slow and may present security risks to the system. Generating live DE documents that are updated based on a subset of a system's DE models and within a maximum time delay may therefore be more efficient.

Interconnected Digital Engineering and Certification Ecosystem

FIG. 2 shows an exemplary implementation of the IDEP as an interconnected digital engineering (DE) and certification ecosystem 200, and exemplary digitally certified products, in accordance with some embodiments of the present invention. Interconnected DE and certification ecosystem 200 may be viewed as a particular instantiation or implementation of IDEP 100 shown in FIG. 1. The IDEP may also be referred to as a "DE Metaverse."

Interconnected DE and certification ecosystem 200 is a computer-based system that links models and simulation tools with their relevant requirements in order to meet verification, validation, and certification purposes. Verification refers to methods of evaluating whether a product, service, or system meets specified requirements and is fit for its intended purpose. For example, in the aerospace industry, a verification process may include testing an aircraft component to ensure it can withstand the forces and conditions it will encounter during flight. Verification also includes checking externally against customer or stakeholder needs. Validation refers to methods of evaluating whether the overall performance of a product, service, or system is suitable for its intended use, including its compliance with regulatory requirements and its ability to meet the needs of its intended users. Validation also includes checking internally against specifications and regulations. Interconnected DE and certification ecosystem 200 as disclosed herein is designed to connect and bridge large numbers of disparate DE tools and models from multitudes of engineering domains and fields, or from separate organizations who may want to share models with each other but have no interactions otherwise. In various embodiments, the system implements a robust, scalable, and efficient DE model collaboration platform, with extensible model splices having data structures and accompanying functions for widely distributed DE model types and DE tools, an application layer that links or connects DE models via APIs, digital threads that connect live engineering model files for collaboration and sharing, digital documentation management to assist with the preparation of engineering and certification documents appropriate for verification and validation (V&V) purposes, and AI-assistance with the functionalities of the aforementioned system components.

More specifically, FIG. 2 shows an example of an interconnected DE and certification ecosystem and examples of digitally certified products 212A, 212B, and 212C (collectively referred to as digitally certified products 212). For example, in some implementations, digitally certified product 212A may be an unmanned aerial vehicle (UAV) or other aircraft, digitally certified product 212B may be a drug or other chemical or biologic compound, and the digitally certified product 212C may be a process such as a manufacturing process. In general, the digitally certified products 212 can include any product, process, or solution that can be developed, tested, or certified (partially or entirely) using DE tools such as 202. In some implementations, digitally certified products 212 may not be limited to physical products, but can include non-physical products such as methodologies, processes and software, etc. While physical and physically-interacting systems often require multiple DE tools to assess for compliance with common V&V products simply by virtue of the need for modeling and simulation (M&S), many complex non-physical systems may also require multiple DE tools for product development, testing, and/or certification. With this in mind, various other possibilities for digitally certified products will be recognized by one of ordinary skills in the art. The inclusion of regulatory and certification standards, compliances, calculations, and tests (e.g., for the development, testing, and certification of products and/or solutions) enables users to incorporate relevant regulatory and certification standards, compliances, calculations, and test data directly into their DE workflow. Regulatory and certification standards, compliances, calculations, and tests are sometimes referred to herein as "common validation and verification (V&V) products."

Digitally certified products 212 in FIG. 2 may be designed and/or certified using interconnected DE and certification ecosystem 200. Interconnected DE and certification ecosystem 200 may include a user device 206A, API 206B, or other similar human-to-machine, or machine-to-machine communication interfaces operated by a user. A user may be a human 204 of various skill levels, or artificial users such as algorithms, artificial intelligence, or other software that interface with ecosystem 200 through API 206B. Ecosystem 200 may further comprise a computing and control system 208 ("computing system 208" hereinafter) connected to and/or including a data storage unit 218, an artificial intelligence (AI) engine 220, and an application and service layer 222. In some embodiments, the artificial intelligence (AI) engine 220 is a machine learning (ML) engine. References to "machine learning engine 220" or "ML engine 220" may be extended to artificial intelligence (AI) engines 220 more generally. For the purposes of clarity, any user selected from various potential human or artificial users are referred to herein simply as the user 204. In some implementations, computing system 208 may be a centralized computing system; in some implementations, computing system 208 may be a distributed computing system. In some cases, user 204 may be considered part of ecosystem 200, while in other implementations, user 204 may be considered separately from ecosystem 200. Ecosystem 200 may include one or more DE tools 202, such as data analysis tool 202A, computer-aided design (CAD) and finite element analysis (FEA) tool 202B, simulation tool 202C, drug modeling and simulation (M&S) tools 202D-202E, manufacturing M&S tools 202F-202G, etc. Ecosystem 200 may also include a repository of common V&V products 210, such as regulatory standards 210A-210F related to the development and certification of a UAV, medical standard 210G (e.g., CE marking (Europe), FCC Declaration of Conformity (USA), IECEE CB Scheme (Europe, North America, parts of Asia & Australia), CDSCO (India), FDA (USA), etc.), medical certification regulation 210H (e.g., ISO 13485, ISO 14971, ISO 9001, ISO 62304, ISO 10993, ISO 15223, ISO 11135, ISO 11137, ISO 11607, IEC 60601, etc.), manufacturing standard 210I (e.g., ISO 9001, ISO 9013, ISO 10204, EN 1090, ISO 14004, etc.), and manufacturing certification regulation 210J (e.g., General Certification of Conformity (GCC), etc.), etc.

In FIG. 2, computing system 208 is centrally disposed within the architecture and is configured to communicate with (e.g., receive data from and transmit data to) user device 206A or API 206B such as an API associated with an artificial user, DE tools 202 via an API or software development kit (SDK) 214, and repository of common V&V products 210 via an API/SDK interface 216. For example, computing system 208 may be configured to communicate with user device 206A and/or API 206B to send or receive data corresponding to a prototype of a design, information about a user (e.g., user credentials), engineering-related inputs/outputs associated with DE tools 202, digitized common V&V products, an evaluation of a product design, user instructions (e.g., search requests, data processing instructions, etc.), and more. Computing system 208 may also be configured to communicate with one or more DE tools 202 to send engineering-related inputs for executing analyses, models, simulations, tests, etc. and to receive engineering-related outputs associated with the results. Computing system 208 may also be configured to communicate with repository of common V&V products 210 to retrieve data corresponding to one or more digitized common V&V products 210 and/or upload new common V&V products, such as those received from user 204, to repository of common V&V products 210. All communications may be transmitted and corroborated securely, for example, using methods relying on zero-trust security. In some implementations, the computing system of the ecosystem may interface with regulatory and/or certification authorities (e.g., via websites operated by the authorities) to retrieve digitized common V&V products published by the regulatory authorities that may be relevant for a product that a user is designing. In some implementations, the user may upload digitized common V&V products to the ecosystem themselves.

Computing and control system 208 may process and/or store the data that it receives to perform analysis and control functionalities, and in some implementations, may access machine learning engine 220 and/or application and service layer 222, to identify useful insights based on the data, as further described herein. The central disposition of computing system 208 within the architecture of the ecosystem has many advantages including reducing the technical complexity of integrating the various DE tools; improving the product development experience of user 204; intelligently connecting common V&V products such as standards 210A-210F to DE tools 202 most useful for satisfying requirements associated with the common V&V products; and enabling the monitoring, storing, and analysis of the various data that flows between the elements of the ecosystem throughout the product development process. In some implementations, the data flowing through and potentially stored by the computing system 208 can also be auditable to prevent a security breach, to perform data quality control, etc. Similarly, any analysis and control functions performed via computing system 208 may be tracked for auditability and traceability considerations.

Referring to one particular example shown in FIG. 2, user 204 may use the DE and certification ecosystem to produce a digitally certified UAV 212B. For example, user 204 may be primarily concerned with certifying the UAV as satisfying the requirements of a particular regulatory standard 210E relating to failure conditions of the UAV (e.g., "MIL-HDBK 516C 4.1.4—Failure Conditions"). In this usage scenario, user 204 may develop a digital prototype of the UAV on user device 206A or using API 206B and may transmit prototype data (e.g., as at least one of a CAD file, a MBSE file, etc.) to computing system 208. Along with the prototype data, user 204 can transmit, via user device 206A, additional data including an indication of the common V&V product that user 204 is interested in certifying the product for (e.g., regulatory standard 210E), user credential information for accessing one or more capabilities of computing system 208, and/or instructions for running one or more digital models, tests, and/or simulations using a subset of DE tools 202.

Referring to another example shown in FIG. 2, user 204 can use the DE and certification ecosystem to produce a digitally certified drug, chemical compound, or biologic 212A. For example, user 204 may be primarily concerned with certifying drug, chemical compound, or biologic 212A as satisfying the requirements of a particular medical standard 210G and medical certification regulation 210H. In this usage scenario, user 204 can develop a digital prototype of the drug, chemical compound, or biologic on user device 206A or using API 206B and can transmit the prototype data (e.g., as a molecular modeling file) to computing system 208. Along with the prototype data, user 204 can transmit, via user device 206A, additional data including an indication of the common V&V products that user 204 is interested in certifying the product for (e.g., medical standard 210G and medical certification regulation 210H), user credential information for accessing one or more capabilities of computing system 208, and/or instructions for running one or more digital models, tests, and/or simulations using a subset of DE tools 202 (e.g., drug M&S tools 202D-202E).

Referring to yet another example shown in FIG. 2, user 204 can use the digital engineering and certification ecosystem to produce a digitally certified manufacturing process 212C. For example, user 204 may be primarily concerned with certifying manufacturing process 212C as satisfying the requirements of a particular manufacturing standard 210I and manufacturing certification regulation 210J. In this usage scenario, user 204 can develop a digital prototype of the manufacturing process on user device 206A or using API 206B and can transmit the prototype data to computing system 208. Along with the prototype data, user 204 can transmit, via the user device 206A, additional data including an indication of the common V&V products that user 204 is interested in certifying the process for (e.g., manufacturing standard 210I and manufacturing certification regulation 210J), user credential information for accessing one or more capabilities of computing system 208, and/or instructions for running one or more digital models, tests, and/or simulations using a subset of DE tools 202 (e.g., manufacturing M&S tools 202F-202G).

In any of the aforementioned examples, computing system 208 can receive the data transmitted from user device 206A and/or API 206B and can process the data to evaluate whether the common V&V product of interest (e.g., regulatory standard 210E, medical standard 210G, medical certification regulation 210H, manufacturing standard 210I, manufacturing certification regulation 210J, etc.) is satisfied by the user's digital prototype, in the context of analysis and control plane 150 shown in FIG. 1. For example, this can involve communicating with the repository of common V&V products 210 via the API/SDK 216 to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, repository of common V&V products 210 can be hosted by a regulatory and/or certification authority (or another third party), and retrieving the regulatory and/or certification data can involve using API/SDK 216 to interface with one or more data resources maintained by the regulatory and/or certification authority (or the another third party). In some implementations, the regulatory and/or certification data can be provided directly by user 204 via user device 206A and/or API 206B (e.g., along with the prototype data).

Evaluating whether the common V&V product of interest is satisfied by the user's digital prototype can also involve processing the prototype data received from user device 206A or API 206B to determine if the one or more identified requirements are actually satisfied. In some implementations, computing system 208 can include one or more plugins, local applications, etc. to process the prototype data directly at the computing system 208. For example, model splicing and digital threading applications are discussed in detail later with reference to FIGS. 6 to 9. In some implementations, the computing system can simply pre-process the received prototype data (e.g., to derive inputs for DE tools 202) and can then transmit instructions and/or input data to a subset of DE tools 202 via API/SDK 214 for further processing.

Not all DE tools 202 are necessarily required for the satisfaction of particular regulatory and/or certification standards. Therefore, in the UAV example provided in FIG. 2, computing system 208 may determine that only a data analysis tool 202A and a finite element analysis tool 202B are required to satisfy regulatory standard 210E for failure conditions. In the drug, chemical compound, or biologic example provided in FIG. 2, computing system 208 may determine that only drug M&S tools 202D-202E are required to satisfy medical standard 210G and medical certification regulation 210H. In the manufacturing process example provided in FIG. 2, computing system 208 may determine that only manufacturing M&S tools 202F-202G are required to satisfy manufacturing standard 210I and manufacturing certification regulation 210J. In other implementations, user 204 may themselves identify the particular subset of DE tools 202 that should be used to satisfy the common V&V product of interest, provided that user 204 is a qualified subject matter expert (SME). In other implementations, user 204 may input to computing system 208 some suggested DE tools 202 to satisfy a common V&V product of interest, and computing system 208 can recommend to user 204 a modified subset of DE tools 202 for final approval by user 204, provided that user 204 is a qualified SME. After a subset of DE tools 202 has been identified, computing system 208 can then transmit instructions and/or input data to the identified subset of DE tools 202 to run one or more models, tests, and/or simulations. The results (or "engineering-related data outputs" or "digital artifacts") of these models, tests, and/or simulations can be transmitted back and received at computing system 208.

In still other implementations, user 204 may input a required DE tool such as 202F for meeting a common V&V product 210I, and the computing system 208 can determine that another DE tool such as 102G is also required to satisfy common V&V product 210I. The computing system can then transmit instructions and/or input data to both DE tools (e.g., 202F and 202G), and the outputs of these DE tools can be transmitted and received at computing system 208. In some cases, the input data submitted to one of the DE tools (e.g., 202G) can be derived (e.g., by computing system 208) from the output of another of the DE tools (e.g., 202F).

After receiving engineering-related data outputs or digital artifacts from DE tools 202, computing system 208 can then process the received engineering-related data outputs to evaluate whether or not the requirements identified in the common V&V product of interest (e.g., regulatory standard 210E, medical standard 2110G, medical certification regulation 210H, manufacturing standard 210I, manufacturing certification regulation 210J, etc.) are satisfied. For example, applications and services 222 may provide instructions for orchestrating validation or verification activities. In some implementations, computing system 208 can generate a report summarizing the results of the evaluation and can transmit the report to device 206A or API 206B for review by user 204. If all of the requirements are satisfied, then the prototype can be certified, resulting in digitally certified product 212 (e.g., digitally certified drug, chemical compound, or biologic 212A; digitally certified UAV 212B; digitally certified manufacturing process 212C, etc.). However, if some of the regulatory requirements are not satisfied, then additional steps may need to be taken by user 204 to certify the prototype of the product. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of distributed engineering tools 202, computing systems 208 may provide user 204 with a report recommending partial certification, compliance, or fulfillment of a subset of the common V&V products (e.g., digital certification of a subsystem or a sub-process of the prototype). The process of generating recommendations for user 204 is described in further detail below.

In response to reviewing the report, user 204 can make design changes to the digital prototype locally and/or can send one or more instructions to computing system 208 via user device 206A or API 206B. These instructions can include, for example, instructions for computing system 208 to re-evaluate an updated prototype design, use one or more different DE tools 202 for the evaluation process, and/or modify the inputs to DE tools 202. Computing system 208 can, in turn, receive the user instructions, perform one or more additional data manipulations in accordance with these instructions, and provide user 204 with an updated report. Through this iterative process, user 204 can utilize the interconnected digital engineering and certification ecosystem to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/tests/simulations, and digital certification), significant amount of time, cost, and materials can be saved in comparison to a process that would involve the physical prototyping, evaluation and/or certification of a similar UAV, drug, manufacturing process, etc. If the requirements associated with a common V&V product are partially met, or are beyond the collective capabilities of DE tools 202, computing system 208 may provide user 204 with a report recommending partial certification, compliance or fulfillment of a subset of the common V&V products (e.g., digital certification of a subsystem or a sub-process of the prototype).

While the examples described above focus on the use of the interconnected digital engineering and certification ecosystem by a single user, additional advantages of the ecosystem can be realized through the repeated use of the ecosystem by multiple users. As mentioned above, the central positioning of computing system 208 within the architecture of the ecosystem enables computing system 208 to monitor and store the various data flows through the ecosystem. Thus, as an increasing number of users utilize the ecosystem for digital product development, data associated with each use of the ecosystem can be stored (e.g., in storage 218), traced (e.g., with metadata), and analyzed to yield various insights, which can be used to further automate the digital product development process and to make the digital product development process easier to navigate for non-subject matter experts.

Indeed, in some implementations, user credentials for user 204 can be indicative of the skill level of user 204, and can control the amount of automated assistance the user is provided. For example, non-subject matter experts may only be allowed to utilize the ecosystem to browse pre-made designs and/or solutions, to use DE tools 202 with certain default parameters, and/or to follow a predetermined workflow with automated assistance directing user 204 through the product development process. Meanwhile, more skilled users may still be provided with automated assistance, but may be provided with more opportunities to override default or suggested workflows and settings.

In some implementations, computing system 208 can host applications and services 222 that automate or partially automate components of common V&V products; expected or common data transmissions, including components of data transmissions, from user 204; expected or common interfaces and/or data exchanges, including components of interfaces, between various DE tools 202; expected or common interfaces and/or data exchanges, including components of interfaces, with machine learning (ML) models implemented on computing system 208 (e.g., models trained and/or implemented by the ML engine 220); and expected or common interfaces and/or data exchanges between the applications and services themselves (e.g., within applications and services layer 222).

In some implementations, the data from multiple uses of the ecosystem (or a portion of said data) can be aggregated to develop a training dataset. For example, usage records 217 collected via computing system 208 may be de-identified or anonymized, before being added to the training set. Such usage records may comprise model parameters and metadata, tool configurations, common V&V product matching to specific models or tools, user interactions with the system including inputs and actions, and other user-defined or system-defined configurations or decisions in using the ecosystem for digital engineering and certification. For instance, an exemplary de-identified usage record may comprise the combination of a specific DE tool, a specific target metric, a specific quantity deviation, and a corresponding specific user update to a DE model under this configuration. Another exemplary de-identified usage record may comprise a user-identified subset of DE tools 202 that should be used to satisfy a common V&V product of interest.

This training dataset can then be used to train ML models (e.g., using ML engine 220) to learn the steps and actions for certification processes and to perform a variety of tasks including the identification of which of DE tools 202 to use to satisfy a particular common V&V product; the identification of specific models, tests, and/or simulations (including inputs to them) that should be performed using DE tools 202; the identification of the common V&V products that need to be considered for a product of a particular type; the identification of one or more recommended actions for user 204 to take in response to a failed regulatory requirement; the estimation of model/test/simulation sensitivity to particular inputs; etc. The outputs of the trained ML models can be used to implement various features of the interconnected digital engineering and certification ecosystem including automatically suggesting inputs (e.g., inputs to DE tools 202) based on previously entered inputs, forecasting time and cost requirements for developing a product, predictively estimating the results of sensitivity analyses, and even suggesting design changes, original designs or design alternatives (e.g. via assistive or generative AI) to a user's prototype to overcome one or more requirements (e.g., regulatory and/or certification requirements) associated with a common V&V product. In some implementations, with enough training data, ML engine 220 may generate new designs, models, simulations, tests, common V&V products and/or digital threads on its own based on data collected from multiple uses of the ecosystem. Furthermore, such new designs, models, simulations, tests, common V&V products and digital threads generated by ML engine 220, once approved and adjusted by a user, may be added to the training set for further fine-tuning of ML algorithms in a reinforcement learning setup.

As shall be discussed in the context of FIGS. 7 to 9 and 11 to 33, the aforementioned collection of training datasets and the training of ML and AI modules including ML engine 220 may be enabled by model splicing technologies. Model splicing, as described herein, allows the scripting of DE model operations encompassing disparate DE tools into a corpus of normative program code, and facilitates the code-defined digital threading of a large space of DE activities involving DE models across different disciplines. ML and AI techniques may be used to create scripts to carry out almost any DE task and to execute any digital thread, allowing for programmable, machine-learnable, and dynamic changes to DE model files, digital threads, and ultimately to digital or physical twins, throughout the product life cycle. For example, in the embodiment shown in FIG. 2, ML engine 220 may manage or orchestrate the interactions between spliced DE models, DE tools, and common V&V products (e.g., DE requirements), based on digital thread options specific to user's intent and input. Sample DE tasks that may be carried out by ML engine 220 include, but are not limited to, (1) aligning models/analysis to certification lifecycle requirement steps, (2) optimizing compute by determining the appropriate fidelity of each model, (3) optimizing compute resources for specific tools/models, or (4) optimizing compute resources across multiple models. ML-enabled executions of DE tasks are not limited to certification or resource optimization, but encompass the whole DE space of operations. Rather, ML engine 220 may act as an AI multiplexer for the DE platform.

In addition to storing usage data to enable the development of ML models, previous prototype designs and/or solutions (e.g., previously designed components, systems, models, simulations and/or other engineering representations thereof) can be stored within the ecosystem (e.g., in storage 218) to enable users to search for and build upon the work of others. For example, previously designed components, systems, models, simulations and/or other engineering representations thereof can be searched for by user 204 and/or suggested to user 204 by computing system 208 in order to satisfy one or more requirements associated with a common V&V product. The previously designed components, systems, models, simulations and/or other engineering representations thereof can be utilized by user 204 as is, or can be utilized as a starting point for additional modifications. This store, or repository, of previously designed components, systems, models, simulations and/or other engineering representations thereof (whether or not they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with user 204 can be checked by computing system 208 to determine which designs and/or solutions stored in the repository can be accessed by user 204. In some implementations, usage of the previously designed components, systems, models, simulations and/or other engineering representations thereof may be available only to other users who pay a fee for a usage.

Exemplary IDEP Implementation Architecture with Services and Features

FIG. 3 shows another exemplary implementation of the IDEP illustrating its offered services and features, in accordance with some embodiments of the present invention. Specifically, an exemplary implementation architecture diagram 300 is shown in FIG. 3 to include multiple illustrative components: an IDEP enclave 302, cloud services 304, and a customer environment 310 which optionally includes an IDEP exclave 316. This exemplary architecture 300 for the IDEP is designed in accordance with zero-trust security principles and is further designed to support scalability as well as robust and resilient operations. IDEP enclave 302 and IDEP exclave 316 together instantiate IDEP 100 shown in FIG. 1, with IDEP exclave 316 implementing model splicing and splice plane 170 in some embodiments of the present invention. An enclave is an independent set of cloud resources that are partitioned to be accessed by a single customer (i.e., single-tenant) or market (i.e., multi-tenant) that does not take dependencies on resources in other enclaves. An exclave is a set of cloud resources outside enclaves managed by the IDEP, to perform work for individual customers. Examples of exclaves include virtual machines (VMs) and/or servers that the IDEP maintains to run DE tools for customers who need such services.

In particular, IDEP enclave or DE platform enclave 302 may serve as a starting point for services rendered by the IDEP, and may be visualized as a central command and control hub responsible for the management and orchestration of all platform operations. For example, enclave 302 may be implemented using computing system 208 of the interconnected DE and certification ecosystem shown in FIG. 2. DE platform enclave 302 is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. Enclave 302 also supports an ML engine such as 220 for real-time analytics, auto-scaling features for workload adaptability, and API-based interoperability with third-party services. Security and resource optimization are enhanced through multi-tenancy support, role-based access control, and data encryption both at rest and in transit. DE platform enclave 302 may also include one or more of the features described below.

First, IDEP enclave 302 may be designed in accordance with zero-trust security principles. In particular, DE platform enclave 302 may employ zero-trust principles to ensure that no implicit trust is assumed between any elements, such as digital models, platform agents or individual users (e.g., users 204) or their actions, within the system. That is, no agent may be inherently trusted and the system may always authenticate or authorize for specific jobs. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

IDEP enclave 302 can also be designed to maintain isolation and independence. A key aspect of the enclave's architecture is its focus on impartiality and isolation. DE enclave 302 disallows cryptographic dependencies from external enclaves and enforces strong isolation policies. The enclave's design also allows for both single-tenant and multi-tenant configurations, further strengthening data and process isolation between customers 306 (e.g., users 204). Additionally, DE enclave 302 is designed with decoupled resource sets, minimizing interdependencies and thereby promoting system efficiency and autonomy.

IDEP enclave 302 can further be designed for scalability and adaptability, aligning well with varying operational requirements. For example, the enclave 302 can incorporate hyperscale-like properties in conjunction with zero-trust principles to enable scalable growth and to handle high-performance workloads effectively.

IDEP enclave 302 can further be designed for workflow adaptability, accommodating varying customer workflows and DE models through strict access control mechanisms. This configurability allows for a modular approach to integrate different functionalities ranging from data ingestion to algorithm execution, without compromising on the zero-trust security posture. Platform 300's adaptability makes it highly versatile for a multitude of use-cases, while ensuring consistent performance and robust security.

IDEP enclave 302 can further be designed to enable analytics for robust platform operations. At the core of the enclave's operational efficiency is a machine learning engine (e.g., machine learning engine 220) capable of performing real-time analytics. This enhances decision-making and operational efficiency across platform 300. Auto-scaling mechanisms can also be included to enable dynamic resource allocation based on workload demand, further adding to the platform's responsiveness and efficiency.

In the exemplary embodiment shown in FIG. 3, IDEP enclave 302 includes several components as described in further detail herein.

A "Monitoring Service Cell. may provide "Monitoring Service" and "Telemetry Service." A cell may refer to a set of microservices, for example, a set of microservices executing within a kubernetes pod. These components focus on maintaining, tracking and analyzing the performance of platform 300 to ensure good service delivery, including advanced machine learning capabilities for real-time analytics. A "Search Service Cell" provides "Search Service" to aid in the efficient retrieval of information from DE platform 300, adding to its overall functionality. A "Logging Service Cell" and a "Control Plane Service Cell" provides "Logging Service," "File Service", and "Job Service" to record and manage operational events and information flow within platform 300, and instrumental in the functioning of platform 300. A "Static Assets Service Cell," provides "Statics Service", and may house user interface, SDKs, command line interface (CLI), and documentation for platform 300. An "API Gateway Service Cell" provides "API Gateway Service," and may provide DE platform API(s) (e.g., APIs 214, 216) and act as a mediator for requests between the client applications (e.g., DE tools 202, the repository of common V&V products 210, etc.) and the platform services. In some embodiments, the API gateway service cell may receive and respond to requests from agents such as DE platform exclave 316 to provide splice functions for model splicing purposes.

As shown in FIG. 3, the architecture of DE platform 300 may also include a cloud services 304 that provide services which cannot interact with customer data but can modify the software for the orchestration of DE platform operations. In example implementations, several cloud resources provide support and foundational services to the platform. For example, in the embodiment of the DE platform 300 shown in FIG. 3, cloud services 304 includes a "Customer Identity and Access Management (IAM) Service" that ensures secure and controlled access to platform 300. Cloud services 304 also includes a "Test Service" that tests tools to validate platform operations. Cloud services 304 may also include an "Orchestration Service" that controls and manages the lifecycle of containers on the platform 300. Cloud services 304 may also include an "Artifact Service" and "Version Control and Build Services," which may be used to maintain the evolution of projects, codes, and instances in the system, while also managing artifacts produced during the product development process.

As shown in FIG. 3, the architecture of DE platform 300 may also include a customer environment 310 with an "Authoritative Source of Truth" 312, customer tools 314, and an optional DE platform exclave 316. Customer environment 310 is where customer data resides and is processed in a zero-trust manner by DE platform 300. As described previously, DE platform enclave 302, by focusing on both zero-trust principles and hyperscale-like properties, provides a robust and scalable environment for the secure processing of significant workloads, according to the customer's unique needs. In some examples, DE platform exclave 316 may be situated within customer environment 310 in order to assist the customer(s) 306 with their DE tasks and operations, including model splicing and digital threading.

When a customer 306 (e.g., user 204) intends to perform a DE task using DE platform 300 (e.g., IDEP 100), typical operations may include secure data ingestion and controlled data retrieval. Derivative data generated through the DE operations, such as updated digital model files or revisions to digital model parameters, may be stored only within customer environment 310, and DE platform 300 may provide tools to access the metadata of the derivative data. Here metadata refers to data that can be viewed without opening the original data, and may comprise versioning information, time stamps, access control properties, and the like. Example implementations may include secure data ingestion, which utilizes zero-trust principles to ensure customer data is securely uploaded to customer environment 310 through a pre-validated secure tunnel, such as Secure Socket Layer (SSL) tunnel. This can enable direct and secure file transfer to a designated cloud storage, such as a simple storage service (S3) bucket, within customer environment 310. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within customer environment 310 while adhering to zero-trust security protocols. Example implementations may also include tokenization utility, in which a specialized DE platform tool referred to as a "tokenizer" is deployed within customer environment 310 for secure management of derivative metadata, conforming to zero-trust guidelines.

Customer environment 310 may interact with other elements of secure DE platform 300 and includes multiple features that handle data storage and secure interactions with platform 300. For example, one element of the customer environment 310 is "Authoritative Source of Truth" 312, which is a principal repository for customer data, ensuring data integrity and accuracy. Nested within this are "Customer Buckets" where data is securely stored with strict access controls, limiting data access to authorized users or processes through pre-authenticated URL links. This setup ensures uncompromising data security within customer environment 310 while providing smooth interactions with other elements of DE platform 300.

Customer environment 310 may also include additional software tools such as customer tools 314 that can be utilized based on specific customer requirements. For example, a "DE Tool Host" component may handle necessary DE applications for working with customer data. It may include a DE Tools Command-Line Interface (DET CLI), enabling user-friendly command-line operation of DE tools (e.g., DE tools 102). A "DE platform Agent" ensures smooth communication and management between customer environment 310 and elements of DE platform 300. Furthermore, there can be another set of optional DE tools designed to assist customer-specific DE workflows. Native DE tools are typically access-restricted by proprietary licenses and end-user license agreements paid for by the customer. IDEP platform functions call upon native DE tools that are executed within customer environment 310, therefore closely adhering to the zero-trust principle of the system design. Exemplary DE tools include, but are not limited to, proprietary and open-source versions of model-based systems engineering (MBSE) tools, augmented reality (AR) tools, computer aided design (CAD) tools, data analytics tools, modeling and simulation (M&S) tools, product lifecycle management (PLM) tools, multi-attribute trade-space tools, simulation engines, requirements model tools, electronics model tools, test-plan model tools, cost-model tools, schedule model tools, supply-chain model tools, manufacturing model tools, cyber security model tools, or mission effects model tools.

In some cases, an optional "IDEP Exclave" 316 may be employed within customer environment 310 to assist with customer DE tasks and operations, supervise data processing, and rigorously adhering to zero-trust principles while delivering hyperscale-like platform performance. IDEP exclave 316 is maintained by the IDEP to run DE tools for customers who need such services. IDEP exclave 316 may contain a "DE Tool Host" that runs DE tools and a "DE Platform Agent" necessary for the operation. Again, native DE tools are typically access-restricted by proprietary licenses and end-user license agreements paid for by the customer. IDEP exclave 316 utilities and manages proprietary DE tools hosted with customer environment 310, for example, to implement model splicing and digital threading functionalities.

In some embodiments, the machine learning (ML) models and artificial intelligence (AI) assistance approaches as described herein adapt to suit different customer instances of the IDEP (see FIG. 4) and the availability of training data. In an example, a pre-trained ML or AI model (e.g. within the IDEP enclave 302) is deployed in instances where there are restrictions in the sharing of customer data. In another example, AI models are deployed in a federated manner adjacent to DE agents and DE tools in the customer environment (e.g., within IDEP exclave 316). In another example, an AI model deployed inside the customer environment is trained behind its firewalls. In yet another example, the customer may allow sharing of subsets of their metadata for a training database located within the IDEP enclave.

IDEP Deployment Scenarios

FIG. 4 shows potential scenarios for instantiating an IDEP in connection to a customer's physical system and IT environment, in accordance with some embodiments of the present invention. Specifically, FIG. 4 illustrates various potential configurations for instancing or instantiating an IDEP ("DE platform) 402 in connection to a customer's IT environment and physical system 404. The IT environment may be located on a virtual private cloud (VPC) protected by a firewall. The physical system may refer to a physical twin as discussed with reference to FIG. 1. In some embodiments, IDEP 402 may be instanced as an enclave such as 302 shown in FIG. 3. For example, IDEP 402 may be instanced on the cloud, possibly in a software-as-a-service (SaaS) configuration. The platform instances in these embodiments include software and algorithms, and may be described as follows:

1. External Platform Instance 410: This option showcases the IDEP as a separate platform instance. The platform interacts with the physical system through the customer's virtual environment, or a Customer Virtual Private Cloud ("Customer VPC"), which is connected to the physical system.
2. External Platform Instance 420 with Internal Agent: The IDEP is instantiated as a separate platform, connected to an internal agent ("DE Agent") wholly instanced within the Customer VPC. For example, the IDEP may be instantiated as enclave 302, and the DE agent may be instantiated as exclave 316 within the Customer VPC linked to the physical system.
3. External Platform Instance with Internal Agent and Edge Computing 430: This scenario displays the IDEP as a separate instantiation, connected to an internal DE Agent wholly instanced within the Customer VPC, which is further linked to an edge instance ("DE Edge Instance") on the physical system. The DE agent is nested within the customer environment, with a smaller edge computing instance attached to the physical system.
4. Edge Instance Connection 440: This option shows the DE platform linked directly to an DE edge instance on the physical system. The DE platform and the physical system are depicted separately, connected by an edge computing instance in the middle, indicating the flow of data.
5. Direct API Connection 450: This deployment scenario shows the DE platform connecting directly to the physical system via API calls. In this depiction, an arrow extends directly from the platform sphere to the physical system sphere, signifying a direct interaction through API.
6. Air-Gapped Platform Instance 460: This scenario illustrates the IDEP being completely instanced on an air-gapped, or isolated, physical system as a DE agent. The platform operates independently from any networks or Internet connections, providing an additional layer of security by eliminating external access points and potential threats. Interaction with the platform in this context would occur directly on the physical system, with any data exchange outside the physical system being controlled following strict security protocols to maintain the air-gapped environment.

Across these deployment scenarios, the IDEP plays an important role in bridging the gap between a digital twin (DTw) established through the IDEP and its physical counterpart. Regardless of how the IDEP is instantiated, it interacts with the physical system, directly or through the customer's virtual environment. The use of edge computing instances in some scenarios demonstrates the need for localized data processing and the trade-offs between real-time analytics and more precise insights in digital-physical system management. Furthermore, the ability of the platform to connect directly to the physical system through API calls underscores the importance of interoperability in facilitating efficient data exchange between the digital and physical worlds. In all cases, the DE platform operates with robust security measures.

In some embodiments, the IDEP deployment for the same physical system can comprise a combination of the deployment scenarios described above. For example, for the same customer, some physical systems may have direct API connections to the DE platform (scenario 5), while other physical systems may have an edge instance connection (scenario 4).

Multimodal User Interfaces

FIG. 5 illustrates the use of multimodal user interfaces 590 for the interconnected DE platform, which can handle various input and output modalities such as Virtual Reality (VR), Mixed Reality (MR), auditory, text, and code. These interfaces are designed to manage the complexity of data streams and decision-making processes, and provide decision support including option visualization, impact prediction, and specific decision invocation. Specifically, data streams 502 and 504 are processed in the Analysis & Control Plane (ACP) 150 of FIG. 1. The user interface may receive data streams from physical and virtual feedback loops 102 and 104, as well as external expert feedback 114, analysis module 154, and twin configuration set 156 of ACP 150.

The multimodal interfaces illustrated in FIG. 5 are configured to carry out all the DE tasks and actions described in the context of FIG. 1, by catering to both humans and bots/algorithms, handling the intricacies of data stream frequency and complexity, decision-making time scales, and latency impacts. In the case of human decision makers, the user interface may need to manage inputs and outputs while for algorithmic decision making, the user interface may need to present rationale and decision analysis to human users. Some examples of human interfaces include a dashboard-style interface 594, a workflow-based interface 596, conversational interfaces 598, spatial computer interfaces 592, and code interfaces 599.

Dashboard-style interface 594 offers a customizable overview of data visualizations, performance metrics, and system status indicators. It enables monitoring of relevant information, sectional review of documents, and decision-making based on dynamic data updates and external feedback. Such an interface may be accessible via web browsers and standalone applications on various devices.

Workflow-based interface 596 guides users through the decision-making process, presenting relevant data, options, and contextual information at each stage. It integrates external feedback and is designed as a progressive web app or a mobile app. In the context of alternative tool selection, workflow-based interface 596 may provide options on individual tools at each stage, or provide combinations of tool selections through various stages to achieve better accuracy or efficiency for the overall workflow.

Conversational interfaces 598 are based on the conversion of various input formats such as text, prompt, voice, audio-visual, etc. into input text, then integrating the resulting input text within the DE platform workflow. Outputs from the DE platform may undergo the reverse process. This enables interoperability with the DE platform, and specifically the manipulation of model splices. In the broad context of audio-visual inputs, the conversational interfaces may comprise data sonification, which involves using sound to represent data, information, or events, and using auditory cues or patterns to communicate important information to users, operators, or reviewers. Sonified alerts (e.g., alerts sent via sound, e.g., via a speaker) are especially useful when individuals need to process information quickly without having to visually focus on a screen. For example, sonified alerts can be used to notify security analysts of potential threats or breaches.

FIG. 5 also illustrates the use of spatial computing interfaces 592 and code interfaces 599 in the management of DTws and PTws. Spatial computing interfaces allow for more immersive and intuitive user experiences, and enable real-time synchronization between DTws and PTws. Code interfaces allow bots and digital engineers to interact with the DE platform through scripting and code. It also allows the collection of user preference, task history, and tool usage patterns for alternative tool selection purposes.

Digital Threads and Autonomous Data Linkages

As discussed previously, a "digital thread" is intended to connect two or more digital engineering (DE) models for traceability across the systems engineering lifecycle, and collaboration and sharing among individuals performing DE tasks. In a digital thread, appropriate outputs from a preceding digital model may be provided as the inputs to a subsequent digital model, allowing for information and process flow. That is, a digital thread may be viewed as a communication framework or data-driven architecture that connects traditionally siloed elements to enable the flow of information and actions between digital models.

FIG. 6 describes the architecture and inherent complexity of digital threads, in accordance with the examples disclosed herein. Specifically, FIG. 6 is a schematic diagram comparing exemplary digital threads 600 of various complexities that manipulate and/or connect DE models, in accordance with some embodiments of the present invention. In the most basic sense, a digital thread may "thread" together DE models into a simple daisy-chain architecture 602 where modifications in any upstream DE model will affect all DE models downstream from the modified DE model. For example, a modification of any parameter or process of a DE model B will cause changes in DE model C, which in turn will cause changes in DE model D. Cause-and-effect changes will therefore cascade downstream. As another example, diagram 604 represents a more complex digital thread where a change in one DE model may affect more than one downstream model. In both 602 and 604, digital threads are represented by a directed acyclic graph (DAG).

DAGs are frequently used in many kinds of data processing and structuring tasks, such as scheduling tasks, data compression algorithms, and more. In the context of service platforms and network complexities, a DAG might be used to represent the relationships between different components or services within the platform. In digital thread 604, different models may depend on each other in different ways. Model A may affect models B, C, and D, with models B and C affecting model E, and models D and E affecting model G. Such dependencies are denoted as a DAG, where each node is associated with a component (e.g., a model), and each directed edge represents a dependency.

A major issue with dealing with interdependent DE models is that graph consistencies can be polynomial, and potentially exponential, in complexity. Hence, if a node fails (e.g., a model is unreliable), this can have a cascading effect on the rest of the digital thread, disrupting the entire design. Furthermore, adding nodes or dependencies to the graph does not yield a linear increase in complexity because of the interdependencies between models. If a new model is added that affects or depends on several existing models, the resulting increase in graph complexity is multiplicative in nature, hence potentially exponential. The multiplicative nature of digital thread consistencies is compounded by the sheer number of interconnected models, which may number in the hundreds or thousands. Diagram 606 is a partial representation of a real-world digital thread, illustrating the complexity of digital threads and its multiplicative growth.

FIG. 6 further shows special cases 603, 605, 607, 608, and 609 of exemplary simple digital threads. Diagram 607 represents a degenerate digital thread where data is shared from a single DE model. Diagram 608 represents a model-to-document digital thread where data (e.g., system attributes, performance attributes) extracted from a single DE model may be used to generate or update a text-based document (e.g., a Capability Development Document (CDD)). Diagrams 603 and 605 are generalized from 608 to represent cases where data extracted from a single model may be used to update multiple models, or vice versa. Specifically, diagram 605 may represent the dynamic updates of live or magic documents discussed in the context of FIG. 1. Here the logic to connect the DE models shown are very simple: data are extracted from multiple DE models A, B, and C to update a document model D. There are no interactions between the extracted data. Furthermore, diagram 609 shows a special case of a digital thread where data is loaded to and extracted from only a single model A. For example, as discussed in the context of FIG. 7 next, input splice functions of the model A shown in 609 may be executed to update the model, and output splice functions of model A shown in 609 may be executed to produce digital artifacts for sharing. For these special simple threads, the IDEP may provide a GUI-based interface to the user to connect the models and execute the digital threads. For complex threads such as 606, a code-based interface may be necessary.

Model Splicing for Digital Threading and Digital Twin Generation

As disclosed herein, model splicing encapsulates and compartmentalizes digital engineering (DE) model data and model data manipulation and access functionalities. As such, model splices provide access to selective model data within a DE model file without exposing the entire DE model file, with access control to the encapsulated model data based on user access permissions. Model splicing also provides the DE model with a common, externally-accessible Application Programming Interface (API) for the programmatic execution of DE models. Model splices thus generated may be shared, executed, revised, or further spliced independently of the native DE tool and development platform used to generate the input digital model. The standardization of DE model data and the generalization of API interfaces and functions allow the access of DE model type files outside of their native software environments, and enable the linking of different DE model type files that may not previously be interoperable. Model splicing further enables the scripting and codification of DE operations encompassing disparate DE tools into a corpus of normative program code, facilitating the generation and training of artificial intelligence (AI) and machine learning (ML) models for the purpose of manipulating DE models through various DE tools across different stages of a DE process, DE workflow, or a DE life cycle.

Digital threads are created through user-directed and/or autonomous linking of model splices. A digital thread is intended to connect two or more DE models for traceability across the systems engineering life cycle, and collaboration and sharing among individuals performing DE tasks. In a digital thread, appropriate outputs from a preceding digital model are provided as inputs to a subsequent digital model, allowing for information flow. That is, a digital thread may be viewed as a communication framework or data-driven architecture that connects traditionally siloed elements to enable the flow of information between digital models. The extensibility of model splicing over many different types of DE models and DE tools enables the scaling and generalization of digital threads to represent each and every stage of the DE life cycle.

A digital twin (DTw) is a real-time virtual replica of a physical object or system, with bi-directional information flow between the virtual and physical domains, allowing for monitoring, analysis, and optimization. Model splicing allows for making individual DE model files into executable splices that can be autonomously and securely linked, thus enabling the management of a large number of DE models as a unified digital thread. Such a capability extends to link previously non-interoperable DE models to create digital threads, receive external performance and sensor data streams (e.g., data that is aggregated from DE models or linked from physical sensor data), calibrate digital twins with data streams from physical sensors outside of native DTw environments, and receive expert feedback that provides opportunity to refine simulations and model parameters.

Unlike a DTw, a virtual replica, or simulation, is a mathematical model that imitates real-world behavior to predict outcomes and test strategies. Digital twins use real-time data and have bidirectional communication, while simulations focus on analyzing scenarios and predicting results. In other words, a DTw reflects the state of a physical system in time and space. A simulation is a set of operations done on digital models that reflects the potential future states or outcomes that the digital models can progress to in the future. A simulation model is a DE model within the context of the IDEP as disclosed herein.

When testing different designs, such as variations in wing length or chord dimensions, multiple DTws (sometimes numbering in 100s to 1,000s) may be created, as a bridge between design specifications and real-world implementations of a system, allowing for seamless updates and tracking of variations through vast numbers of variables, as detailed in the context of FIG. 1. As an example, if three variations of a system are made, each one would have its own DTw with specific measurements. These DTws may be accessed and updated via API function scripts, which allow for easy input of new measurements from the physical parts during the manufacturing process. By autonomous linking with appropriate data, a DTw may be updated to reflect the actual measurements of the parts, maintaining traceability and ensuring accurate data representation through hundreds or thousands of models.

Exemplary Model Splicing Setup

FIG. 7 is a schematic showing an exemplary model splicing setup, according to some embodiments of the present invention. Specifically, FIG. 7 is a schematic showing an embedded CAD model splicing example.

In the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. A model splice may take on the form of a digital file or a group of digital files. A locator refers to links, addresses, pointers, indexes, access keys, Uniform Resource Locators (URL) or similar references to the aforementioned DE digital artifacts and splice functions, which themselves may be stored in access-controlled databases, cloud-based storage buckets, or other types of secure storage environments. The splice functions provide unified and standardized input and output API or SDK endpoints for accessing and manipulating the DE model data. The DE model data are model-type-specific, and a model splice is associated with model-type-specific input and output schemas. One or more different model splices may be generated from the same input DE model file, based on the particular user application under consideration, and depending on data access restrictions. In some contexts, the shorter terms "splice", "wrapper", and/or "graft" are used to refer to spliced, wrapped, and/or grafted models.

Model splicing is the process of generating a model splice from a DE model file. Correspondingly, model splicers are program codes or uncompiled scripts that perform model splicing of DE models. A DE model splicer for a given DE model type, when applied to a specific DE model file of the DE model type, retrieves, extracts, and/or derives DE model data associated with the DE model file, generates and/or encapsulates splice functions, and instantiates API or SDK endpoints to the DE model according to input/output schemas. In some embodiments, a model splicer comprises a collection of API function scripts that can be used as templates to generate DE model splices. "Model splicer generation" refers to the process of setting up a model splicer, including establishing an all-encompassing framework or template, from which individual model splices may be deduced.

Thus, a DE model type-specific model splicer extracts or derives model data from a DE model file and/or stores such model data in a model type-specific data structure. A DE model splicer further generates or enumerates splice functions that may call upon native DE tools and API functions for application on DE model data. A DE model splice for a given user application contains or wraps DE model data and splice functions that are specific to the user application, allowing only access to and enabling modifications of limited portions of the original DE model file for collaboration and sharing with stakeholders of the given user application.

Additionally, a document splicer is a particular type of DE model splicer, specific to document models. A "document" is an electronic file that provides information as an official record. Documents include human-readable files that can be read without specialized software, as well as machine-readable documents that can be viewed and manipulated by a human with the help of specialized software such as word processor and/or web services. Thus, a document may contain natural language-based text and/or graphics that are directly readable by a human without the need of additional machine compilation, rendering, visualization, or interpretation. A "document splice", "document model splice" or "document wrapper" for a given user application can be generated by wrapping document data and splice functions (e.g., API function scripts) that are specific to the user application, thus revealing text at the component or part (e.g., title, table of contents, chapter, section, paragraph) level via API or SDK endpoints, and allowing access to and enabling modifications of portions of an original document or document template for collaboration and sharing with stakeholders of the given user application, while minimizing manual referencing and human errors.

In the CAD model splicing example shown in FIG. 7, a CAD model file diesel-engine.prt 704 proceeds through a model splicing process 710 that comprises a data extraction step 720 and a splice function generation step 730. This input DE model 704 is in a file format .prt native to certain DE tools. Data extraction may be performed via a DE model crawling agent implemented as model crawling scripts within a model splicer to crawl through the input DE model file and to distill model data with metadata 722. Metadata are data that can be viewed without opening the entire input DE model file, and may include entries such as file name, file size, file version, last modified date and time, and potential user input options as identified from a user input 706. Model data are extracted and/or derived from the input DE model, and may include but are not limited to, parts (e.g., propeller, engine cylinder, engine cap, engine radiator, etc.), solids, surfaces, polygon representation, and materials, etc. When a model splicer crawls through the model file, it determines how model data may be organized and accessed, as fundamentally defined by a DE tool 702 that is being used in splicing the DE model, and establishes a model data schema. This data schema describes the structure and format of the model data, some of which are translated into, or used to create input/output API endpoints with corresponding input/output schemas. In some embodiments, model data with metadata 722 may be stored in an access-restricted storage 726, such as the "customer buckets" 312 within customer environment 310 in FIG. 3, so that model splices such as 742, 744, and 746 may be generated on-demand once an input DE model 704 has been crawled through.

The model splicer further generates splice functions (e.g., API function scripts) 732 from native APIs 702 associated with the input CAD model. In the present disclosure, "native" and "primal" refer to existing DE model files, functions, and API libraries associated with specific third-party DE tools, including both proprietary and open-source ones. Native API 702 may be provided by a proprietary or open-source DE tool. For example, the model splicer may generate API function scripts that call upon native APIs of native DE tools to perform functions such as: HideParts (parts_list), Generate2DView( ), etc. These model-type-specific splice functions may be stored in a splice function database 736, again for on-demand generation of individual model splices. A catalog or specification of splice functions provided by different model splices supported by the IDEP, and orchestration scripts that link multiple model splices, constitutes a Platform API. This platform API is a common, universal, and externally-accessible platform interface that masks native API 702 of any native DE tool integrated into the IDEP, thus enabling engineers from different disciplines to interact with unfamiliar DE tools, and previously non-interoperable DE tools to interoperate freely.

Next, based on user input or desired user application 706, one or more model splices or wrappers 742, 744, and 746 may be generated, wrapping a subset or all of the model data needed for the user application with splice functions or API function scripts that can be applied to the original input model and/or wrapped model data to perform desired operations and complete user-requested tasks. In various embodiments, a model splice may take on the form of a digital file or a group of digital files, and a model splice may comprise locators to or copies of the aforementioned DE digital artifacts and splice functions, in any combination or permutation. Any number of model splices/wrappers may be generated by combining a selective portion of the model data such as 722 and the API function scripts such as 732. As the API function scripts provide unified and standardized input and output API endpoints for accessing and manipulating the DE model and DE model data, such API handles or endpoints may be used to execute the model splice and establish links with other model splices without directly calling upon native APIs. Such API endpoints may be formatted according to an input/output scheme tailored to the DE model file and/or DE tool being used, and may be accessed by orchestration scripts or platform applications that act on multiple DE models.

In some embodiments, when executed, an API function script inputs into or outputs from a DE model or DE model splice. "Input" splice functions or "input nodes" such as 733 are model modification scripts that allow updates or modifications to an input DE model. For example, a model update may comprise changes made via an input splice function to model parameters or configurations. "Output" splice functions or "output nodes" 734 are data/artifact extraction scripts that allow data extraction or derivation from a DE model via its model splice. An API function script may invoke native API function calls of native DE tools. An artifact is an execution result from an output API function script within a model splice. Multiple artifacts may be generated from a single DE model or DE model splice. Artifacts may be stored in access-restricted cloud storage 726, or other similar access-restricted customer buckets.

One advantage of model splicing is its inherent minimal privileged access control capabilities for zero-trust implementations of the IDEP as disclosed herein. In various deployment scenarios discussed with reference to FIG. 4, and within the context of IDEP implementation architecture discussed with reference to FIG. 3, original DE input model 704 and model data storage 726 may be located within customer buckets 312 in customer environment 310 of FIG. 3. Splice functions 732 stored in database 736 call upon native APIs 702. The execution or invocation of splice functions 732 may rely on job-specific authentication or authorization via proprietary licenses of DE tools (e.g., residing within customer environment 310 of FIG. 3) and/or information security clearance levels of the requesting user. Thus, model splicing unbundles monolithic access to digital model-type files as whole files and instead provides specific access to a subset of functions that allow limited, purposeful, and auditable interactions with subsets of the model-type files built from component parts or atomic units that assemble to parts.

Digital Threading of DE Models via Model Splicing

FIG. 8 is a schematic showing digital threading of DE models via model splicing, according to some embodiments of the present invention. A digital thread is intended to connect two or more DE models for traceability across the systems engineering lifecycle, and collaboration and sharing among individuals performing DE tasks.

Linking of model splices generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first splice and a second splice (e.g., input splice functions from both model splices are called upon). In the present disclosure, "model linking" and "model splice linking" may be used interchangeably, as linked model splices map to correspondingly linked DE models. Similarly, linking of DE tools generally refers to jointly accessing two or more DE tools via model splices, where model splice functions that encapsulate disparate DE tool functions may interoperate and call each other, or be called upon jointly by an orchestration script to perform a DE task.

Thus, model splicing allows for making individual digital model files into model splices that can be autonomously and securely linked, enabling the management of a large number of digital models as a unified digital thread written in scripts. Within the IDEP as disclosed herein, a digital thread is a platform script that calls upon the platform API to facilitate, manage, or orchestrate a workflow through linked model splices. Model splice linking provides a communication framework or data-driven architecture that connects traditionally siloed elements to enable the flow of information between digital models via corresponding model splices. The extensibility of model splicing over many different types of digital models enables the scaling and generalization of digital threads to represent each and every stage of the DE lifecycle and to instantiate and update DTws as needed.

In the particular example shown in FIG. 8, an orchestration script 894 is written in Python code and designed to interact via API endpoints such as 892 to determine if a CAD model meets a total mass requirement. API endpoint 892 is an output splice function and part of a platform API 890.

Platform API 890 comprises not only splice functions but also platform scripts or orchestration scripts such as 894 itself.

Orchestration script 894 is divided into three main steps:
1. Get Data From a CAD Model Splice: A POST request may be sent via the IDEP platform API to execute a computer-aided design (CAD) model splice 871. This model splice provides a uniform interface to modify and retrieve information about a CAD model 881. The parameters for the CAD model, such as hole diameter, notch opening, flange thickness, etc., may be sent in the request and set via an input splice function. The total mass of the CAD model may be derived from model parameters and retrieved via an output splice function. The response from the platform API includes the total mass of CAD model 881, and a Uniform Resource Identifier/Locator (URL) for the CAD model. The response may further comprise a URL for an image of the CAD model.
2. Get Data From a SysML Model Splice: Another POST request may be sent via the IDEP platform API to execute a Systems Modeling Language (SysML) model splice 872. SysML is a general-purpose modeling language used for systems engineering. Output function 892 of model splice 872 retrieves the total mass requirements for the system from a SysML model 882. The response from the platform API includes the total mass requirement for the system.
3. Align the Variables and Check If Requirement Met: The total mass from CAD model 881 is compared with the total mass requirement from SysML model 882. If the two values are equal, a message is printed indicating that the CAD model aligns with the requirement. Otherwise, a message is printed indicating that the CAD model does not align with the requirement.

In short, orchestration script 894, which may be implemented in application plane 160 of IDEP 100 shown in FIG. 1, links digital models 881 and 882 via model splice API calls. Orchestration script 894 is a scripted platform application that modifies a CAD model, retrieves the total mass of the modified CAD model, retrieves the total mass requirement from a SysML model, and compares the two values to check if the CAD model meets the requirement. In some embodiments, a platform application within IDEP 100 utilizes sets of functions to act upon more than one DE model.

Model Splice Plane

FIG. 9 is a schematic illustrating the linking of DE model splices in a splice plane and comparing digital threading with and without model splicing, according to some embodiments of the present invention. The bottom model plane 180 demonstrates current digital threading practices, where each small oval represents a DE model, and the linking between any two DE models, such as models 982 and 984, requires respective connections to a central platform 910, and potential additional linkages from every model to every other model. The central platform 910 comprises program code that is able to interpret and manipulate original DE models of distinct model types. For example, platform 910 under the control of a subject matter expert may prepare data from digital model 982 into formats that can be accessed by digital model 984 via digital model 984's native APIs, thus allowing modifications of digital model 982 to be propagated to digital model 984. Any feedback from digital model 984 to digital model 982 would require similar processing via platform 910 so that data from digital model 984 are converted into formats that can be accessed by digital model 982 via digital model 982's native APIs. This hub-and-spoke architecture 934 is not scalable to the sheer number (e.g., hundreds or thousands) of digital models involved within typical large-scale DE projects, as model updates and feedback are only possible through central platform 910.

In contrast, once the DE models are spliced, each original model is represented by a model splice comprising relevant model data, unified and standardized API endpoints for input/output, as shown in the upper splice plane 170. Splices within splice plane 170 may be connected through scripts (e.g., python scripts) that call upon API endpoints or API function scripts and may follow a DAG architecture, as described with reference to FIG. 1 and FIG. 6. Note that in FIG. 1, only the set of generated splices are shown within splice plane 170, while in FIG. 9, scripts that link model splices are also shown for illustrative purposes within the splice plane. Such scripts are referred to as orchestration scripts or platform scripts in this disclosure, as they orchestrate workflow through a digital thread built upon interconnected DE model splices. Further note that while splice plane 170 is shown in FIG. 1 as part of IDEP 100 for illustrative purposes, in some embodiments, splice plane 170 may be implemented behind a customer firewall and be part of an agent of the DE platform, as discussed in various deployment scenarios shown in FIG. 4. That is, individual API function scripts generated via model splicing by a DE platform agent may be tailored to call upon proprietary tools the customer has access to in its private environment. No centralized platform 910 with proprietary access to all native tools associated with all individual digital models shown in FIG. 9 is needed. Instead, orchestration scripts call upon universal API function scripts that may be implemented differently in different customer environments.

Hence, model splicing allows model splices such as model splice 972 from digital model 982 and model splice 974 from digital model 984 to access each other's data purposefully and directly, thus enabling the creation of a model-based "digital mesh" 944 via platform scripts and allowing autonomous linking without input from subject matter experts.

An added advantage of moving from the model plane 180 to the splice plane 170 is that the DE platform enables the creation of multiple splices per native model (e.g., see FIG. 7), each with different subsets of model data and API endpoints tailored to the splice's targeted use. For example, model splices may be used to generate multiple digital twins (DTws) that map a physical product or object design into the virtual space. Two-way data exchanges between a physical object and its digital object twin enable the testing, optimization, verification, and validation of the physical object in the virtual world, by choosing optimal digital model configuration and/or architecture combinations from parallel digital twins built upon model splices, each reacting potentially differently to the same feedback from the physical object.

Supported by model splicing, digital threading, and digital twining capabilities, the IDEP as disclosed herein connects DE models and DE tools to enable simple and secure collaboration on digital engineering data across engineering disciplines, tool vendors, networks, and model sources such as government agencies and institutions, special program offices, contractors, small businesses, Federally Funded Research and Development Centers (FFRDC), University Affiliated Research Centers (UARC), and the like. An application example 950 for the IDEP is shown on the right side of FIG. 9, illustrating how data from many different organizations may be integrated to enable cross-domain collaboration while maintaining data security, traceability, and auditability. Here DE models from multiple vendors or component constructors are spliced or wrapped by IDEP agents, and data artifacts are extracted with data protection. Turning DE models into data artifacts enables cross-domain data transfer and allows for the protection of critical information, so that model owners retain complete control over their DE models using their existing security and IT stack, continue to use DE tools that best fit their purposes, and also preserve the same modeling schema/ontology/profile that best fit their purposes. The IDEP turns DE models into micro-services to provide minimally privileged data bits that traverse to relevant stakeholders without the DE models ever leaving their home servers or being duplicated or surrogate. The IDEP also provides simple data access and digital threading options via secure web applications or secure APIs.

DAG Representation of Threaded Tasks

Model splicing provides a unified interface among DE models, allowing model and system updates to be represented by interconnected and pipelined DE tasks. FIG. 10 shows an exemplary directed acyclic graph (DAG) representation 1000 of pipelined DE tasks related to digital threads, in accordance with some embodiments of the present invention. In diagram 1000, tasks performed through a digital thread orchestration script (e.g., 894) are structured as nodes within a DAG. Actions are therefore interconnected and carried out in a pipeline linking the DE model splices with a range of corresponding parameter values. Therefore, a digital thread can be created by establishing, via interpretable DE platform scripts, the right connections between any model splices for their corresponding models at the relevant endpoints.

Referring to FIGS. 1 and 8, DAGs of threaded tasks are built from digital threads and are part of the DE platform's application plane 160. Different DAGs may target different DE actions. For example, in FIG. 1, building or updating a DTw 122 in the virtual environment 120 has its own DAG 124. Model splicing turns DE models into data structures that can be accessed via API, thus enabling the use of software development tools, from simple python scripts to complex DAGs, in order to execute DE actions. A digital thread of model splices eliminates the scalability issue of digital thread management, and speeds up the digital design process, including design updates based on external feedback.

Following the above description of the basic elements and core aspects of the IDEP as disclosed herein, the digital threading system that enhances the IDEP's functionality with respect to digital thread generation is described in detail next.

Digital Threads Overview

Digital transformation represents a rapidly expanding market characterized by robust profit margins. However, its growth is hindered by a singular challenge: the creation of digital twins through interconnected models and simulations—known as a "digital thread"—is impeded by issues such as vendor lock-in, costly licenses, and technical debt. The technology landscape for digital transformation is both well-funded and dynamic, encompassing a range of technologies from the internet-of-things (IoT) and cloud-to-edge computing to API-first and code-first hardware, as well as advanced large language models and AI. This presents a substantial opportunity to integrate models and simulations with these technologies, thereby simplifying the creation of digital threads. Digital twins, which are part of the broader concept of Industry 4.0, are envisioned as interconnected models that not only simulate but also enhance our physical reality. Despite their potential, over 90% of digital transformation initiatives struggle to achieve success. Where they do succeed, they provide companies with exceptional capabilities for optimization and innovation, particularly through the use of AI in complex industrial systems. This invention envisions a future where technical barriers to digital transformation are eliminated, making digitization an easily accessible commodity. By integrating models and simulations through digital threads, the invention envisions the creation of industrial metaverses, the democratization of innovation, and the provision of abundant data for AI to learn from. Instead of the current labor-intensive process of creating digital threads, the new method would allow for their mass production. This would involve an intelligent application layer between models and simulations, integrated with a digital engineering platform, which would facilitate customization and maintain ease of integration even as models evolve. The new method thus enables the mass-production of digital threads. By constructing an application layer atop model splices, the platform would offer customization, ease of integration, and a suite of applications from third-party developers. The ultimate goal is to create a digital engineering ecosystem that feels akin to a software development stack, providing immense customer value and a positive user experience.

The interconnected digital engineering and certification ecosystem is a computer-based system that may be used for a variety of validation and certification and other documentation purposes. The digital documentation management system and methodology is integrated within the digital engineering and certification ecosystem to assist with the preparation of engineering and certification documents and support the creation of the right documentation, with the right data, appropriate for verification and validation (V&V) purposes. For example, the system is integrated with a computer-based system for digital engineering and certification, and includes security and access controls to protect the templates and documents from unauthorized access or modification. In some embodiments, the system includes a user interface for selecting and populating templates with data, and a machine learning algorithm for recommending templates and assisting with document preparation. In alternative embodiments, APIs, and a software IDE (such as VS code) automatically performs these tasks. In some implementations, the system may generate documents, even without a user interface, by directly linking the system data and using the system API(s), software IDE(s), and machine learning algorithm(s) for assisting in document preparation. The system tracks and communicates approval decisions throughout the certification process, and provides metrics for measuring the efficiency, accuracy, and user satisfaction of the system. The system is scalable and flexible, and can be customized to support different types of certification or other documentation processes and user needs. The system may also use blockchain technology to enhance the security and transparency of the system, and may use augmented reality or virtual reality technologies to improve the visualization and interaction with the digital documents.

The digital documentation subsystem is designed to improve efficiency, reduce wasted time and effort, and eliminate the risks associated with manual documentation processes. Such a system may contribute to improved digitally engineered products. As industry becomes increasingly digitized, many of the processes across the product lifecycle are managed by computer systems enhanced by automation and artificial intelligence. To connect phases of a product lifecycle using accepted authorized data sources (e.g., requirements, system architectures, technical data packages, computer-aided design (CAD) models, and project tasks), tools such as digital threads may be employed. A digital thread develops an integration framework that enables efficient and effective monitoring and evaluation of the lifecycle by linking a wide variety of information systems and datasets across the various domains (e.g., design, manufacturing, quality) of the product lifecycle in dynamic ways without requiring one-to-one data mapping.

The interconnected digital engineering and certification ecosystem links models and simulation tools with their relevant requirements in order to meet validation and certification purposes. AI-assistance in creating digital threads, which connect models and tools, improves scalability and versatility of model usage and lowers the need for expert skills when managing multiple models. AI-assisted capabilities will be foundational to the digital engineering system and will include scalable sharing of large libraries of models and versatile linking of different models into digital threads for certification or validation reasons. Data streams serve as training data to fine-tune AI algorithms that can assist users in creating digital threads. The training dataset can be expanded using synthetic data generation and can be customized to train enterprise-specific models for customers.

AI-assisted digital thread creation offers specific benefits to users, such as ease of use for users through the incorporation of AI-assisted digital thread creation and customizable AI-assistants using fine-tuned large language models (LLMs); greater interoperability between digital engineering tools and services through the ability to link and share models through a secure web application or API collection; greater productivity through the optimization of compute resources and alignment of models or analysis to certification/lifecycle requirement steps; broader adoption among users with a lower bar for skillset through the use of the right digital engineering tools; incorporation of relevant regulatory and certification standards, compliances, calculations, and test data directly into digital engineering workflow; improved versatility of potential uses through the ability to generate a report, which can be presented to the user in an easily readable format and include recommendations for improvements to a user's digital prototype of a product; and enhanced user interactions with the system through the ability to utilize AI-assisted digital engineering services, such as AI-assisted project planner and AI-assisted design review plan.

In some embodiments, "AI-assistance" includes workflow augmentation, digital engineering process optimization, and product compliance activities. Examples of such processes include (1) the scalable sharing of models, (2) digital thread creation, (3) AI-assisted documentation and digital thread recalibration, and (4) training data for different services and industries generated by customizing the platform's usage. The scalable sharing of models employs AI-assisted script wrappers and customized AI architectures that may expand to a variety of training data used to fine-tune LLMs. Digital thread creation may include an AI-assisted digital thread creation process, where a work plan is executed with user-inputted data and AI-assisted training. AI-assisted documentation using a digital thread recalibration may include AI-assisted digital thread/security audits (training data is the endpoint metadata tracked for security architecture), AI-assisted data cloaking, AI-assisted M&S optimization (e.g., interrupt and refine an existing simulation if the specs are not currently met, link one model to the next one in the digital thread, and check if the requirements flow through), and high-frequency digital engineering examples. Finally, training data for different services and industries generated by customizing the platform's usage may create an equivalent "engineering pile" training data set (e.g., horizontal digital engineering workflows or alignment with vertical industry specific models). Versatile and customized training data sets may be generated through tiered implementation of fine-tuned LLMs. Some embodiments include the ability to train models on encrypted data and the expansion of synthetic data creation on platform-specific and customer-specific training data.

Ultimately, all engineering will become coding—with AI assistance—and the software-code-defined digital thread makes this all possible.

AI-Assisted Versatile Linking of Models to Generate Digital Threads

In what follows, AI-assistance to the digital threading process discussed in the context of FIGS. 6, 8 and 10 are disclosed in detail within the context of the IDEP.

An AI-Assisted Digital Engineering Workflow

FIG. 11 shows an example schematic of data from digital threads training AI algorithms to assist users in their workflows, in accordance with some embodiments of the present invention.

Specifically, the Systems Engineering "V" diagram or V-model is shown in FIG. 11. The V-model is a framework used in systems engineering. It is a graphical representation illustrating the relationship between development phases and corresponding verification and validation (V&V) activities. The left side of the V refers to development phases, while the right side of the V refers to corresponding V&V phases for each development phase. The V-model is a systematic and integrated approach to the design, development, operation, and maintenance of systems, and may be refined for different industries.

Digital engineering is an integrated digital approach to systems engineering. Digital threads implemented according to embodiments of the present invention connect traditionally siloed elements, allow a connected data flow through phases of the V-model, and provide an integrated view of data throughout a product's lifecycle. Digital threads further allow traceability from one phase of the lifecycle back to the preceding one, facilitate the sharing of information across different stages of the V-model, and enhance efficiency and productivity throughout the system development process.

Furthermore, data from software-code-defined digital threads may be used to train artificial intelligence (AI) algorithms to assist in orchestrating digital engineering workflows. In particular, the following are typical stages of a systems engineering process:

1. Requirements Analysis: This step involves identifying and defining the requirements of the system. This includes understanding the stakeholders' needs, constraints, and objectives.
2. Concept Development: In this step, different concepts are generated and evaluated to determine the best solution to meet the requirements.
3. System Design: In this step, the chosen concept is developed into a detailed design of the system, including specifications for components and subsystems.
4. Implementation: This step involves the construction, assembly, and testing of the system components and subsystems to verify they meet the design specifications.
5. Verification and Validation: This step involves testing the system to ensure it meets the requirements and verifying the design is correct.

6. Operation and Maintenance: This step involves the ongoing operation and maintenance of the system to ensure it continues to meet the needs of the stakeholders.
7. Retirement: This step involves the decommissioning and disposal of the system when it is no longer needed or has reached the end of its life cycle.

In FIG. 11, exemplary digital engineering tasks are shown along the V-model, including a set of definition and decomposition tasks 1111 (e.g., systems engineering management plan 1113, concept of operations 1115, system-level requirements 1117, sub-system requirements 1119 such as high-level design, and component detailed design 1121), as well as a set of integration and test tasks 1131 (e.g., component verification 1133, sub-system verification 1135, system verification 1137, system validation 1139, and commissioned system operations and maintenance 1141. Coding and testing implementation hardware and software 1151 may bridge the two sets of tasks.

Also shown in FIG. 11 is the Observe (1163), Orient (1165), Decide (1167), and Act (1169) loop ("OODA Loop") within a schematic 1161 of AI-assisted workflow. The OODA loop is a decision making framework that describes the cycle of taking actions based on observed information. It provides a strategic framework to help stakeholders make effective decisions quickly. This AI-assisted workflow, combined with the use of software-code-defined digital threads, provides options for both expert and non-expert users to interoperate DE models and DE tools with higher efficiency and enhanced productivity.

In the observation stage 1163, the AI algorithm receives inputs 1171, such as modeling and simulation (M&S) data or user input, and processes this information to understand the current state of the environment or specific M&S step. In the orientation stage 1165, a machine learning engine uses its knowledge, represented in the form of an AI algorithm 1173, to make sense of the data it has observed and determine the current situation. The AI algorithm is trained on prior data sets 1175 and includes the use of fine-tuned generative LLMs. At the decision stage 1167, based on the information it has gathered and its understanding of the situation, the AI algorithm recommends options 1177 to the user on the best course of action (e.g., suggestions for next steps, completion of tasks, status alerts). "AI-assisted" means the user makes a decision 1179 to accept the recommendations or not. In the action stage 1169, a human user takes action, or the system automates the action based upon the algorithm's outputs. Finally, the AI algorithm then repeats the process, continually observing, orienting, deciding, and acting as it interacts with its environment. Note that the OODA loop decision making framework may be used to explain the machine learning engine operating in a continuous manner within a DE platform but may not imply any additional structure or functionality.

Feedback data may originate from user input (either explicitly or implicitly) and/or from the system compilation and/or execution of the platform orchestration script.

Integration of AI-Assisted Digital Threads within a Digital Engineering & Certification Ecosystem FIG. 12 shows an example schematic of AI-assisted digital threads enabling a variety of DE services, in accordance with some embodiments of the present invention. The combination of scalable sharing of models, versatile linking of models, and documentation enables a variety of DE services.

As described earlier with reference to FIG. 2, an interconnected DE and certification ecosystem may include a user device 1206A, API 1206B, or other similar human-to-machine, or machine-to-machine communication interfaces operated by a user 1204. The ecosystem may further comprise a computing and control system 1208 ("computing system 1208" hereinafter) connected to and/or including a data storage unit 1218, an artificial intelligence (AI) engine 1220, and an application and service layer 1222. In some implementations, the data from multiple uses of the ecosystem (or a portion of said data) can be aggregated to develop a training dataset. For example, usage records 1217 collected via computing system 1208 may be de-identified or anonymized, before being added to the training set.

As described earlier with reference to FIG. 11, a typical workflow executed by a digital thread may include an OODA loop of observing 1263, orienting 1265, deciding 1267, and acting 1269. Such a workflow takes in as input user metadata 1251 and/or user inputs 1253 via the user 1204, the user device 1206A, or the API 1206B. The workflow may also take in input (e.g., M&S parameters 1233) from various DE tools 1231 and information (e.g., M&S metadata 1243) from a repository of common V&V products 1241. Within the orient stage, AI algorithms may evaluate the observed data, for example using an LLM fine-tuned on training data. Within the decide stage, actions may be recommended via AI-assistance and a user may decide whether a recommended action should be taken. The workflow then acts to generate user actions 1235 on DE tools 1231 and/or user actions 1245 for V&V products 1241.

The implementation of AI-assisted digital threads includes several components. AI-assisted digital threads are integrated with the digital threads within the computer-based system for DE and certification. Data sources, functions, and data formats link and share models and link models to one another, or for documentation. The implementation may include methods for ensuring the accuracy and consistency of this data. Additionally, the system may implement quality control measures such as data validation and verification. Machine learning algorithms and techniques may be used for recommending scripts to users, linking models, running M&S activities, or assisting with document preparation. For example, the system may use predictive modeling and decision-tree algorithms to assist with document preparation, by providing suggestions for data fields and values based on the user's previous inputs and the overall context of the document. Additionally, the system may use LLMs to generate the text of documents in a combination of semantic (e.g., variable driven) and transformer-based ways. Security and access controls may be put in place to ensure that only authorized users are able to access and modify the models. This may include measures such as authentication, encryption, and role-based access controls, which would ensure that only authorized users are able to access the system and make changes to the models, run simulations, or prepare documents.

The implementation further includes a user interface and a user experience design of the system, including methods for selecting models to share, selecting scripts, and linking with models. Methods for monitoring and evaluating the performance of the system, including metrics for measuring efficiency, accuracy, and user satisfaction, may be considered as well. This may include metrics such as the time taken to share models or create digital threads for specific M&S activities towards specific V&V purposes, the accuracy of the data entered, and the user's satisfaction with the system. The implementation may include blockchain technology to further enhance the security and transparency of the system. The security architecture of the interconnected digital engineering and certification ecosystem may apply to secure users, models, and the documentation. Finally, augmented reality or virtual reality technologies may improve the visualization and interaction with the digital engineering system.

In some embodiments, nested digital threads may be employed. An example implementation is shown below:

```
json defining script recipe:
    {top-level goal: { #potentially target certification reqs
    sub-assembly: { #an assembly to be considered (CAD)
    model-details: { #our splices that get specific data
    the values pointing to other scripts/modules
    }}}
```

The above may include pointers to scripts, which in themselves is a digital thread, but also the json may be considered a digital thread.

An Embodiment of AI-Assisted Digital Threads

FIG. 13 shows a process flow 1300 for generating a software-code-defined digital thread, in accordance with some embodiments of the present invention. The system starts at step 1310. Next, in step 1320, the system trains a script-generating machine learning (ML) model using a training dataset comprising a set of training triplets each comprising a sample intent input, a corresponding sample model representation set, and a corresponding sample platform orchestration script, where the sample platform orchestration script connects the corresponding sample model representation set to accomplish the corresponding sample intent input.

An example of such a training dataset is discussed in reference to FIG. 20. A user may provide text inputs indicating the need to write a Finite Element Analysis (FEA) report from a Computer-Aided Design (CAD) model and an FEA simulation. The IDEP model may splice the input CAD and FEA models. The user may further provide an orchestration script for linking the model splices using API endpoints to generate the desired report. For instance, the orchestration script may run CAD model splice functions to generate a .msh file, run FEA model splice functions to generate a .rst or json file from the .msh file, and call upon a LLM-based generative AI model to generate a FEA analysis report from the .rst or .json file. This set of triplets (3-tuple) of user intent input, model splices, and orchestration script for connecting the model splices to achieve the user intent is logged into an AI training database 2050. Training using such a training dataset may comprise identifying usage patterns of API endpoints (e.g., the sequence of API endpoint calls to appropriately link the models) and/or intermediate digital artifacts that are passed from one model splice to another. In addition to training the LLM-based generative AI model, the AI training database 2050 may be used for fine-tuning and validation.

Next, in step 1330, the system receives a first model representation of a first engineering model. In step 1340, the system receives a second model representation of a second engineering model. Model representation refers to embodiments of the engineering model in the form of model file(s), model splices disclosed in the context of FIGS. 7 to 9, or collections of digital artifacts derived from the engineering model.

In step 1350, the system receives an intent input. Such an intent input describes what task is intended to be accomplished by the software-defined-digital thread and what outcomes are expected from running the digital thread. For example, an intent input may include a user action on the IDEP, a user prompt, a command from an existing software-code-defined digital thread, and a request from a software agent on the IDEP, where a software agent encompasses any high-level AI agent having the authority to request an action on the IDEP.

Next, in step 1360, the system generates, using the script-generating ML model, a platform orchestration script connecting the first model representation and the second model representation based on the intent input, where the platform orchestration script accomplishes the intent input.

Finally, in step 1370, the system stores the platform orchestration script as the software-code-defined digital thread. This completes 1380 the process flow 1300.

In some embodiments, "software-code-defined threads" may be written by the user from scratch, transplanted from another source, and/or received from an AI script executing a ML model and then edited or fine-tuned by an SME user, and the equivalents.

In some embodiments, the generating the software-code-defined digital thread includes training a script-generating machine learning (ML) model using a training dataset comprising a set of training triplets each comprising a sample intent input, a corresponding sample model representation set, and a corresponding sample platform orchestration script, wherein the sample platform orchestration script connects the corresponding sample model representation set to accomplish the corresponding sample intent input: receiving a first model representation of a first engineering model; receiving a second model representation of a second engineering model; receiving an intent input; generating, using the script-generating ML model, a platform orchestration script connecting the first model representation and the second model representation based on the intent input, where the platform orchestration script accomplishes the intent input; and storing the platform orchestration script as the software-code-defined digital thread.

In some embodiments, the generating the software-code-defined digital thread further includes receiving a feedback data on the platform orchestration script; and training and/or fine-tuning the script-generating ML model based on the feedback data.

In some embodiments, the generating the software-code-defined digital thread further includes providing a user interface coding environment in an interconnected digital engineering platform (IDEP); receiving a plurality of user selections of the first engineering model and the second engineering model, where the first engineering model and the second engineering model were selected by a user; receiving a plurality of corresponding model representations from the first engineering model and the second engineering model; receiving a user-defined code for a user-defined platform orchestration script; determining and/or receive a corresponding intent input; determining corresponding model representation endpoints used in the user-defined code from the user-defined platform orchestration script; recording the first and the second engineering models, the first and the second model representations, the corresponding intent input, the corresponding model representation endpoints, and the user-defined platform orchestration script to generate the training dataset; and storing the training dataset for training the script-generating ML model.

In some embodiments, "infer" and/or "receive" are within the scope of those terms: (1) the user explicitly provides the required information, (2) the IDEP platform infers the corresponding information based on user actions, (3) the IDEP platform infers the corresponding information based on user actions and may prompt the user for confirmation in cases where the probability of certainty is below a threshold (e.g., where the user has explicitly turned on advanced AI-training mode), and (4) any equivalent process. "Infer" may further include an AI agent automatically determining the intent. "Infer" may refer to a user's plain-language (e.g., English) intent being mapped by the AI to specific potential actions on the platform. The inference of the user intent by the AI involves mapping the probability of relevance of potential actions and then recommending an appropriate action with the highest probability (or at least actions whose probabilities exceed a threshold).

In some embodiments, the connecting the first model representation and the second model representation based on the intent input comprises linking a first endpoint of the first model representation and a second endpoint of the second model representation based on the intent input.

In some embodiments, the generating the software-code-defined digital thread further includes evaluating, using a sufficiency machine learning (ML) model, the first engineering model and the second engineering model within an interconnected digital engineering platform (IDEP) for sufficiency for accomplishing the intent input.

In some embodiments, the generating the software-code-defined digital thread further includes determining, using a recommender ML model or the script-generating machine learning (ML) model, a first representation endpoint in the first model representation that are relevant to the intent input, in response to sufficiency being determined.

In some embodiments, the generating the software-code-defined digital thread further includes determining using a recommender ML model, a relationship between the first representation endpoint and the second representation endpoint based on the intent input.

In some embodiments, the platform orchestration script comprises scripting code to read data from the first model representation and/or the second model representation.

In some embodiments, the platform orchestration script comprises scripting code to write data to the first model representation and/or the second model representation.

In some embodiments, the platform orchestration script comprises scripting code to connect an input for the second model representation connected to an output of the first model representation.

In some embodiments, the generating the software-code-defined digital thread further includes executing the platform orchestration script for the second model representation, where an output from the first model representation is an input for the second model representation.

In some embodiments, the generating the software-code-defined digital thread further includes reading data from the first model representation; executing a computation on the data; and writing a result of the computation to the first model representation and/or the second model representation.

In some embodiments, the generating the software-code-defined digital thread further includes receiving a third model representation of a third engineering model, where the platform orchestration script further links the first and/or the second model representations and the third model representation.

In some embodiments, the generating the software-code-defined digital thread further includes executing the platform orchestration script by invoking one or more API or SDK endpoints associated with the first model representation and/or with the second model representation.

In some embodiments, the generating the software-code-defined digital thread further includes determining, using an AI algorithm, a recommended third engineering model based on the first engineering model, the second engineering model, and the training dataset. The AI model attempts to build a DAG of the current digital thread and possible continuations. The same model answers whether two models can be linked with applicable model splices to meet the user intent; as well as answer what are potential next model splices and associated models in the thread, again based on the user intent.

In some embodiments, the first engineering model and/or the second engineering model is a human-readable document file.

In some embodiments, one of the first or the second model is a human-readable document file. The generating the software-code-defined digital thread further includes receiving a document template; analyzing the document template using the interconnected digital engineering platform (IDEP); determining, using an AI algorithm, output data from the first model representation and/or the second model representation required to generate the document file; executing appropriate actions on the first model representation and/or the second model representation using a predetermined sequence based on the document template's requirements to generate output required for the document file; and generating the document file by assembling the document template and the output from the first model representation and/or the second model representation. The AI algorithms may include (1) recommender engines (content-based or collaborative filtering based), (2) neural networks, with additional features such as Monte Carlo Tree Search to suggest a change of parameters, (3) transformer models to generate documents, and (4) Markov decision processes, to determine state transitions based on the current state (e.g., analyzing document template, seeing the models, understanding how to compose new document based on model types and other metadata). A recommender engine may determine which possible document template to suggest or types of data to incorporate for certification or other elements in a decision matrix. A neural network may be supported by moves in a MCTS-type exploration that recognizes best states or a transformer to generate templates.

In some embodiments, the generating the software-code-defined digital thread further includes predicting a change in the first model representation of the first engineering model and/or the second model representation of the second engineering model based on a change in the first model representation and/or the second model representation.

In some embodiments, the generating the software-code-defined digital thread further includes predicting a change in the first model representation of the first engineering model based on a change in the second model representation of the second engineering model.

In some embodiments, the generating the software-code-defined digital thread further includes calling a second software-code-defined digital thread.

In some embodiments, one of the first engineering model and/or the second engineering model comprises a neural network model. A model file may comprise a neural network model that interacts with one of the AI models (e.g., the AI models that decide which inputs to receive from the model splices and/or write the orchestration scripts). The interrelationships may include training, providing training data, and augmenting training data. Examples of neural network models that may be used in lieu of a DE model include (1) a neural network trained on the design space of designs to predict the drag and lift coefficients for a design input (e.g., so a CAD model spliced together the neural network will generate drag and lift coefficients without running simulations, which may be time-consuming), and (2) a neural network trained on historical data for engineering designs towards eventual certifications. This may be extended towards an entire certification process.

In some embodiments, the generating the software-code-defined digital thread further includes generating, using the script-generating ML model, a magic document associated with the software-code-defined digital thread, wherein the magic document comprises API endpoints to human-readable text blocks, and wherein the magic document is updated, using the API endpoints, with an audit log in response to an execution of at least a portion of the platform orchestration script.

In some embodiments, the platform orchestration script comprises a code block, where the code block is associated with an information security tag, and where the information security tag indicates a restriction on executing the code block.

In some embodiments, the first model representation of the first engineering model is a first model splice. The generating the software-code-defined digital thread further includes receiving a first engineering model file of the first engineering model having a DE model type, where the first engineering model file is in a native file format; extracting model data from the first engineering model file in the native file format; storing the model data in a model data storage area; generating one or more external, commonly-accessible splice functions that enable external access to one or more digital artifacts derived from the model data stored in the model data storage area, where the one or more external, commonly-accessible splice functions provide addressable Application Programming Interface (API) or Software Development Kit (SDK) endpoints that are accessible by third-party applications and users, and where the API or SDK endpoints enable access to the digital artifacts without access to an entirety of the first engineering model file and without requiring direct engagement by the third-party applications and users with a DE tool associated with the DE model type; and generating the first model splice of the first engineering model, where the first model splice comprises access to a selective portion of the one or more digital artifacts, where the first model splice comprises access to at least one of the one or more external, commonly-accessible splice functions, where the first model splice is accessible via the API or SDK endpoints by the third-party applications and users, and wherein the API or SDK endpoints provide a unified programming interface to sharable model splices generated from DE models having the DE model type.

In some embodiments, the generating the software-code-defined digital thread further includes training a script-generating machine learning (ML) model using a training dataset comprising a set of training triplets each comprising a sample intent input, a corresponding sample model representation set, and a corresponding sample platform orchestration script, where the sample platform orchestration script connects models within the corresponding sample model representation set to accomplish the corresponding sample intent input; receiving a first model representation of a first engineering model; receiving a second model representation of a second engineering model; receiving an intent input; generating, using the script-generating ML model, a platform orchestration script connecting the first model splice and the second model splice based on the intent input, where the platform orchestration script accomplishes the intent input; and storing the platform orchestration script as the software-code-defined digital thread.

FIG. 14 shows a system for generating a software-code-defined digital thread in a digital engineering system, according to exemplary embodiments of the invention. Specifically, FIG. 14 provides an exemplary schematic representation of the modules and data 1420 that may be used for generating a platform orchestration script 1452 by an interconnected digital engineering platform (IDEP) application 1480, according to exemplary embodiments of the invention.

The system may include access to at least one hardware processor 1494 responsible for executing program code 1492 to implement the modules 1420 described below. The system may include access to at least one non-transitory physical storage medium 1490, accessible by the at least one hardware processor 1494, which stores the program code 1492 that is executable by the hardware processor 1494. The program code may be stored and distributed among two or more non-transitory physical storage media, and may be executed by two or more processors.

The system may include an IDEP application 1480 controlling a training module 1440 that may carry out training, fine tuning, and/or validation of an artificial intelligence (AI) module 1450. In one embodiment, the AI module 1450 may include a script-generating machine learning (ML) model. In another embodiment, the AI module 1450 may include a splice/splicing recommender AI module.

In order to train the AI module 1450, the training module 1440 may use training data 1442 including sample data triplets, where each sample data triplet may include a sample intent input, a corresponding sample model file set, and a corresponding sample output platform orchestration script.

At run time, the user 1402 may provide an intent input 1430 through a user interface (UI) 1404. In one embodiment, the intent input 1430 is a user prompt. More generally, the intent input is a phrase or an action encompassing the user's intent, and may be generated from: (1) a user's action as recorded by the UI 1404, (2) an explicit user prompt, (3) a previously generated and stored software-code-defined digital thread, and/or (4) a request from a software agent on the interconnected digital engineering platform (IDEP).

The IDEP application 1480 may also generate or identify two model splices, Model A Splice 1460 and Model B Splice 1470, each associated with a DE model (1410, 1412) related to the intent input 1430. The model A splice 1460 may include splice data 1462 and splice functions 1464. Similarly, the model B splice 1470 may include splice data 1472 and splice functions 1474. The model splices 1460 and 1470, their data, and their functions are accessible through splicing APIs 1466 and 1476.

The trained AI module 1450 may receive the user's intent input 1430, the two model splices 1460 and 1470, and may generate a platform orchestration script 1452. The output platform orchestration script 1452 may accomplish the intent input 1430 and may connect the model A splice 1460 and the model B splice 1470 based on the intent input 1430.

The IDEP application 1480 may store the generated platform orchestration script 1452 as the software-code-defined digital thread.

ALTERNATIVE EMBODIMENTS

Embodiments Applicable to Other Fields Outside of DE

In one alternative embodiment, digital engineering models may be viewed as models and sources of truth generally. For example, they may be viewed as sources of disaggregated truth from the Internet, leading to a next-generation "Internet 4.0," having the features described below.

Although the invention has been described with respect to digital engineering and engineering-related models, the invention has applications to information and data sources outside of engineering. In some embodiments of the invention, the digital engineering system comprises text or data linked as a digital thread with authenticated references to a variety of sources of information in fields outside of DE. Examples of such information sources may include peer-reviewed journals, regulatory or legal documents, common V&V products, financial reports, newspaper articles from reputable news organizations, and other authoritative information sources. Such embodiments present the user with the ability to trace the source of the specific document text and data, and confirm that it is authenticated from a reliable source.

Accordingly, in some embodiments, the live or magic documents are newspaper articles, scientific articles, medical articles, financial reports, engineering documents, media documents, legal documents, online encyclopedias, political speeches, Congressional, federal, or other government reports, or other documents from other information sources. In one embodiment, when a live or magic document is quoting someone or citing statistics from a source, the software-code-defined digital thread in the digital documentation system helps to ensure the immutability, reliability, and consistency of the quoted or cited source or data.

In the era of generative AI and frequent false information sources in newspapers, political speeches, social and broadcast media, and the like, the present invention assists the reader (e.g., the online professional, or the news and/or entertainment consumer) with determining what is real and what is not, based on the reader's judgment of the credibility and/or the reliability of the source of truth being cited. The IDEP platform allows sources of truth to be seamlessly cited and more easily cross-checked by the reader, reducing the risks of false or misleading information gaining wide traction.

In one embodiment, the live or magic document references or links to authoritative sources of underlying truth, for example, the original scientific report that is cited by a newspaper article or political speech, can be cross-checked by the reader or by AI agents with probabilistic models of truth.

In one embodiment, authoritative sources of truth, e.g., scientific reports and articles, will release underlying models and metadata during publication, rather than releasing only the report (and possibly sample data) as is common currently. As a result, the model splicer can interface with third-party models and data sources, and generate and authenticate live or magic documentation surrounding those models. For example, a scientist may publish underlying models of their research, rather than just their published article and some sample data. In one embodiment, the present digital documentation system would enable a live or magic scientific article to be released on the Internet/Web, which is linked to the underlying models, simulations, and data released by the scientist. This would enable the scientific community, the media community, and general members of the public to cite, review, annotate, and seamlessly comment on the scientific results, while having full visibility into the underlying models used to arrive at the results. Furthermore, any updates from new, subsequent experiments could be pushed directly into the scientific model released by the scientist, and automatically update the digital documentation associated with the scientific model (e.g., the scientific publication) in real-time.

One advantage of such a system is that scientists may publish preliminary research earlier than they would otherwise instead of first waiting for all their experiments and analysis to be completed. This would accelerate the dissemination of cutting-edge scientific information among both the research community as well as the broader general public. Furthermore, third-parties like the media and the general public (e.g., on social media) can cite to the underlying scientific articles and underlying scientific models provided by the scientist as an authoritative source of truth. Such a capability would also enable third parties to replicate experiments, review data, and confirm scientific conclusions as a safeguard against or to mitigate errors, fraud, or statistically insignificant results.

In other embodiments, the scientific article comprises a medical-related article, for example, a medical journal article, a medical reference, and/or another article or document with medical information (e.g., a newspaper article with medical information). The medical article may cite to underlying sources of truth that are considered reputable in the medical community, for example, peer-reviewed medical journal articles with their underlying medical models, or to authoritative medical reference sources.

In some embodiments, auditing of the underlying sources and source data is enabled. In some embodiments, the documents are accessible in a zero-trust, secure manner and may be auditable. In other embodiments, the documents are stored in a decentralized manner, for example, in a decentralized datastore or blockchain. In other embodiments, the documents are stored in a centralized fashion, but metadata associated with the document and its source may be stored in a decentralized manner, for example, in a decentralized datastore or blockchain.

In short, software-defined digital threading of centralized and decentralized data sources results in potential for Web 4.0-type applications on various data sources available on the Internet/Web.

Training Data Generation

The software-code-defined digital thread is a piece of program code or program script that connects data from two or more digital engineering models, data sources, or physical artifacts to accomplish a specific mission or business objective. In one embodiment, training data is generated for a software-code-defined digital thread using model splicers without AI-assistance. The IDEP platform monitors and records the user interactions to generate the training data set. For example, software developers using the IDEP platform generate platform orchestration scripts from model splices. The IDEP platform monitors a SME or software developer generating the software-code-defined digital threads by manually linking model splices and manually writing code, and then generates the training data based on the inferred information from the code.

In one embodiment, the relevant ML model (e.g., the digital thread generation model, the API endpoint recommendation model, etc.) may be trained through IDEP-recorded feedback loops. In this embodiment, the IDEP records modifications and improvements to platform API scripts, user inputs, documentation, and DE model API endpoints, and uses the modifications to generate training data for the ML model.

IDEP Platform with Pre-Trained ML Models

In one embodiment, training can be performed by an entity that is separate from the IDEP. In such an embodiment, the relevant ML model may be pre-trained, or trained separately, and the trained ML model may be saved, stored, and/or transferred in order to be used by the IDEP platform. In such an embodiment, the execution of the program code utilizes the pre-trained ML model, without necessarily needing further training steps. In one embodiment, a given ML model is pre-trained, and the IDEP system collects training data as described herein, and further trains, fine-tunes, and/or validates the given ML model.

Feedback Data for Improving Digital Threads

When running a digital thread, feedback may go from the generated documentation or output (e.g., simulation results) back to the input engineering models. For example, a verification document may show that verification has failed, leading the system to go back and use either SME input or a ML model trained on prior SME input to modify the underlying engineering models in order to meet the requirements. Accordingly, in one embodiment, the non-transitory physical storage medium for digital thread generation further comprises program code to analyze the generated software-code-defined digital thread in relation to the first input engineering model, and modify the first input engineering model based on an output of the software-code-defined digital thread.

In one embodiment, the analysis step may be iterative, where the results of each iteration (e.g., running the digital thread, analyzing its output, modifying an input engineering model) is used as the starting point for the next iteration. This approach may be used to refine and improve a product or design through successive approximations of the data and/or parameters of its underlying engineering models.

In another embodiment, once the digital thread computes an output, feedback is sent to the first input engineering model regarding the outcome. For example, while completing requirements chocking for a design, the digital thread may indicate that the design either meets the requirements or not. The outcome is then recorded within the input engineering model(s).

In both examples, the IDEP may be used to host analysis and feedback cycles, each suggesting perturbing the parameters of the input engineering model(s) in order to test the range of the design parameters that meet the design requirements. In one embodiment, the requirements checking digital thread may be nested within a master analysis and feedback digital thread running on the IDEP.

In yet another embodiment, the script-generating ML model may be further trained, or fine-tuned, using feedback loops involving the input engineering model(s) and modified "output" versions thereof. For example, once the script-generating ML model generates the software-code-defined digital thread, the latter may be executed one or more times using different input engineering models, leading to modifications to the input engineering models. This process yields one or more input-output engineering model pairs that may be used to further train or fine-tune the script-generating ML model.

In yet another embodiment, a script-generating ML model that generates a digital thread involving API endpoint recommendation may be further trained, or fine-tuned, using feedback loops involving the input engineering model(s) and the recommended API endpoint(s). For example, once the script-generating ML model generates the software-code-defined digital thread, the latter may be executed one or more times using different input engineering models, yielding one or more recommended API endpoints. This process yields one or more sets of input engineering models and recommended API endpoints that may be used to further train or fine-tune the script-generating ML model.

In another embodiment, a script-generating ML model that generates a digital thread having an output document may be further trained, or fine-tuned, using feedback loops involving the input engineering model(s) and the output document. For example, once the script-generating ML model generates the software-code-defined digital thread, the latter may be executed one or more times using different input engineering models, yielding one or more output documents. This process yields one or more sets of input engineering models and output documents that may be used to further train or fine-tune the script-generating ML model.

User Input for Platform Orchestration Script Generation

In one embodiment, an AI algorithm further considers the user input when generating the orchestration script. Accordingly in one embodiment, the non-transitory physical storage medium further comprises program code to receive user input, wherein the one more orchestration scripts are generated based on the user input.

In one embodiment, the user input is selected from a user action on the IDEP and a user prompt. In one embodiment, the intent input is selected from the group consisting of a user action on an interconnected digital engineering platform, a user prompt, an existing software-code-defined digital thread, and a request from a software agent on the interconnected digital engineering platform.

Intent input can also be another digital thread, as described in the detailed disclosure.

Manual Generation of Scripting Code for Software-Code-Defined-Digital Threads

In one embodiment of the present invention, the platform orchestration script is generated by a software developer and/or an SME, but without using AI automation. The user is using the IDEP platform and model splicers to manually code digital threads. In one embodiment, the user generates the code with no AI assistance. In another embodiment, the user generates the code with some AI assistance. In another embodiment, the AI generates the code, but the user has to accept it before use. Other combinations and sub-combinations of the user working with the AI assistant agent are within the scope of the present invention.

Accordingly, one embodiment of the present invention is a non-transitory physical storage medium comprising program code to provide a user interface coding environment in an interconnected digital engineering platform (IDEP); receive a plurality of user selections of the first engineering model and the second engineering model, where the first engineering model and the second engineering model were selected by a user; receive a plurality of corresponding model representations from the first engineering model and the second engineering model; receive a user-defined code for a user-defined platform orchestration script; determine and/or receive a corresponding intent input. The user-defined code may be input by the user into the user interface coding environment by the user typing new code, copying-and-pasting and reusing code, generating template code with AI assistance and further editing and finetuning of the code by the user.

Software-Code-Defined Digital Threads without Model Splicing

One embodiment of the present invention includes software-code defined digital threads without use of a model splicer. Various embodiments are contemplated herein. In one embodiment, the IDEP interfaces directly to third-party tools using their proprietary APIs and/or SDKs and using the native file formats, without model splicing. In another embodiment, data is extracted from the native file formats and stored in the IDEP platform, but without the use of model splicers with their common external APIs Other embodiments include using model representations that are not model splicers, as explained in the detailed disclosure.

Digital Threads for Digital Documentation

In various embodiments, the generated software-code-defined digital thread is configured to create and/or maintain a live DE document (i.e., a magic doc). In another embodiment, the generated software-code-defined digital thread is configured to output a user-readable document.

In one embodiment, the generated software-code-defined digital thread includes instructions to generate a document generation ML model that is fine-tuned on a specific document type, such as a specific document structure (e.g., a result report, a certification report), or a specific content (e.g., drone documentation). In this embodiment, the software-code-defined digital thread includes instructions to assemble a training dataset encompassing a plurality of sample documents of the target document type, and to train the ML model to generate documents of the target document type with a predetermined maximum level of a specified cost function. In one embodiment, the document type is a live DE document.

Single Model Orchestration Script and Recursive Digital Threads

In one embodiment, the software-code-defined digital thread comprises a platform orchestration script for a single engineering model file. One example of a platform orchestration script with just one model file may include reading data from a single model file, performing a computation, displaying the data, and/or inserting data into the model file. Accordingly in one embodiment, the non-transitory physical storage medium may further include program code to execute at least one of one or more external, commonly-accessible splice functions of a model splice to access and perform at least one action or computation on a selective portion of one or more digital artifacts from the model splice.

In some embodiments, the intent input may be a command from another software-code-defined digital thread or a software agent. In other embodiments, a first software-code-defined digital thread may include instructions to run a second software-code-defined digital thread. For example, a digital thread for the generation of a live document on the attributes of a product may include instructions to run a digital thread for the computation of a total mass of the product.

In one embodiment, a requirement-checking digital thread may be configured to iteratively, or recursively, traverse a requirement and its variants.

AI-Assisted Application of DE Tools

FIG. 15 shows an example schematic of digital engineering tools applied to requirements files and design files, in accordance with some embodiments of the present invention. In one embodiment, the digital thread is generated in the IDEP with user input from subject matter experts without AI assistance.

As described earlier with reference to FIGS. 2 and 12, an interconnected DE and certification ecosystem may include a user device 1506A, API 1506B, or other similar human-to-machine, or machine-to-machine communication interfaces operated by a user 1504. The ecosystem may further comprise a computing and control system 1508 ("computing system 1508" hereinafter) connected to and/or including a data storage unit 1518, an artificial intelligence (AI) engine 1520, and an application and service layer 1522. In some implementations, the data from multiple uses of the ecosystem (or a portion of said data) can be aggregated to develop a training dataset. For example, usage records 1517 collected via computing system 1508 may be de-identified or anonymized, before being added to the training set. As described earlier with reference to FIGS. 11 and 12, a typical workflow may take in as input varies DE tools 1531 and information from a repository of common V&V products 1541.

In a first sequence of steps, a user 1504 uploads 1551 an MBSE file onto a digital engineering platform, which receives 1553 the MBSE file. The platform then extracts 1555 requirements (e.g., weight) from the MBSE file and transmits 1557 data based on those requirements to an MBSE tool, which is part of a set of digital engineering tools 1531. After the MBSE tool receives 1559 the data, it updates 1561 data (e.g., weight) in the MBSE file and exports 1563 the updated MBSE file back to the digital engineering platform, which receives 1565 the updated MBSE file.

In a second sequence of steps that may be in parallel or in series with the first sequence of steps, a user 1504 uploads 1571 a CAD file onto the digital engineering platform, which receives 1573 the CAD file. The platform then calculates 1575 properties (e.g., mass) from the CAD file and transmits 1577 data to a CAD tool, which is part of the set of digital engineering tools 1531. After the CAD tool receives 1579 the data, it highlights 1581 issues in the CAD file (which may include updating the CAD file), and exports 1583 the updated CAD file back to the digital engineering platform, which receives 1565 the updated CAD file.

The digital engineering platform now holds both an updated MBSE file from the first sequence and an updated CAD file from the second sequence.

AI-Assisted Scalable Sharing of Models through Model Splicing

In one embodiment, 'model splicing' and 'model wrapping' allow digital models to be shared securely with third-parties, as defined above. (The terms 'splicing' and 'wrapping' are used interchangeably.)

The AI-assisted approach to linking and sharing models in model-based systems engineering (MBSE) utilizes a combination of machine learning techniques to analyze and extract relevant information, suggest appropriate functions and parameters, create scripts to control digital engineering tools, and suggest the optimal sequence of scripts for creating or modifying an MBSE file. This allows for dynamic changes to the file and the option to incorporate user inputs to create a variant of the MBSE file. The machine learning engine is trained on a dataset of user inputs and example scripts, allowing for greater customization and flexibility. This approach can be further enhanced by the use of fine-tuned language models, which are better suited to understand the specific language and context of the MBSE files. With the ability to continually improve performance over time, the AI-assisted approach allows for efficient and effective manipulation of MBSE files.

In some embodiments, MBSE files may be generalized to digital models. A digital model represents a complex system via a model that is machine readable and in many cases rendered via UI for human interpretation (i.e., model-driven engineering (MDE)). A difference between an MDE file and a digital model is that a digital model elevates the importance that the model remains machine readable and may be manipulated without a UI/UX for a human user.

FIG. 16 shows an example of implementation steps of the scalable sharing of models, in accordance with some embodiments of the present invention. A user uploads a file (e.g., MBSE), which is then received by the digital system, which then analyzes the file to extract relevant information. An AI algorithm suggests appropriate API functions and parameters for the file, creates scripts to control a DE tool, and suggests the sequence of scripts. User inputs may create a variant of a file. The DE tool may be commanded to create or modify the file, which enables the system to create functions that allow dynamic changes to the file. Finally, the system provides the user with a wrapper, allowing a sandbox for a model.

FIG. 16 outlines the process of: uploading an MBSE file, extracting relevant information, suggesting appropriate functions and parameters, creating scripts to control digital engineering tools, creating or modifying the MBSE file, and allowing for dynamic changes to the file. Additionally, it includes an alternative option for incorporating user inputs to create a variant of the MBSE file and outputting a wrapper as a sandbox model.

As described earlier with reference to FIGS. 2 and 12, an interconnected DE and certification ecosystem may include a user device 1606A, API 1606B, or other similar human-to-machine, or machine-to-machine communication interfaces operated by a user 1604. The ecosystem may further comprise a computing and control system 1608 ("computing system 1608" hereinafter) connected to and/or including a data storage unit 1618, an artificial intelligence (AI) engine 1620, and an application and service layer 1622. In some implementations, the data from multiple uses of the ecosystem (or a portion of said data) can be aggregated to develop a training dataset. For example, usage records 1617 collected via computing system 1618 may be de-identified or anonymized, before being added to the training set. As described earlier with reference to FIGS. 11 and 12, a typical workflow may take in as input varies DE tools 1631 and information from a repository of common V&V products 1641.

In a first sequence of steps, a user 1604 uploads 1651 an MBSE file onto a digital engineering platform, which receives 1653 the MBSE file. The machine learning engine on the digital engineering platform then analyzes 1655 the MBSE file to extract relevant information. The machine learning engine (e.g., an AI algorithm) then suggests 1657 appropriate API functions and parameters for the MBSE file. Next, the machine learning engine creates 1659 scripts to control the digital engineering tool. Then, the system commands 1667 the appropriate digital engineering tool to create or modify the MBSE file.

In an alternative sequence, the machine learning engine suggests 1661 the sequence of the scripts, and the user 1604 provides 1663 text inputs. The user inputs can create 1665 a variant of an MBSE file. The sequence then proceeds to step 1667 as described earlier.

After step 1667, the machine learning engine creates 1669 functions that allow dynamic changes to the MBSE file. Finally, the system outputs 1671 a wrapper allowing a sandbox for a model.

The AI-assisted functions are created in the machine learning engine by utilizing a combination of supervised and unsupervised learning techniques. Once the model is trained, it can then be applied to the MBSE file to suggest appropriate functions and parameters, create scripts to control the digital engineering tool, and suggest the sequence of scripts for optimal results. Additionally, the machine learning engine can also be trained on new data, improving its performance over time.

An implementation example for an AI-assisted approach is through the use of fine-tuned language models. In this scenario, the machine learning engine is trained on a dataset of user inputs and example scripts based on MBSE files. The fine-tuned language model is then able to understand the specific language and context of the MBSE files, making it better suited to suggest appropriate functions and parameters, create scripts to control the digital engineering tool, and suggest the sequence of scripts for optimal results. Additionally, as new data is added, the machine learning engine can continually improve its performance over time. This approach allows for greater customization and flexibility, as the machine learning engine can be tailored to the specific needs and requirements of the user.

AI-Assisted Versatile Linking of MBSE Files

FIG. 17 shows an example schematic of an AI-assisted versatile linking of MBSE files, in accordance with some embodiments of the present invention. In some embodiments, this implementation extends or modifies the implementation steps of the scalable sharing of models, as shown in FIG. 7. A user uploads a file (e.g., MBSE) which is then received by the digital system, which then analyzes the file to extract relevant information. An AI algorithm suggests appropriate API functions and parameters for the file, and creates a set of wrappers for V&V purposes. The multiple wrappers are then linked into a digital thread. Corresponding DE tools may be connected with the wrappers, and corresponding DE tools may be linked in sequence. Under this paradigm, the repository of common V&V products may monitor the digital thread, particularly after corresponding DE tools are linked in sequence. User inputs may refine and execute the digital thread. Note that the starting steps may be the same as for linking any model, the system is based on user inputs and creates links between two models in an AI-assisted manner, and the progressive linking of models may lead to complete or partial digital threads.

The system receives the file, analyzes it, and extracts relevant information. The AI algorithm then suggests appropriate API functions and parameters to prepare the file. The platform generates API scripts using API calls from the relevant tool and creates an API endpoint that returns a relevant file (e.g., mesh file or analysis result file). The process can be repeated with additional files to create links between multiple files, and the machine learning engine can learn from the use of API endpoints to provide better recommendations for connecting digital engineering models in the future.

As described earlier with reference to FIGS. 2 and 12, an interconnected DE and certification ecosystem may include a user device 1706A, API 1706B, or other similar humanto-machine, or machine-to-machine communication interfaces operated by a user 1704. The ecosystem may further comprise a computing and control system 1708 ("computing system 1708" hereinafter) connected to and/or including a data storage unit 1718, an artificial intelligence (AI) engine 1720, and an application and service layer 1722. In some implementations, the data from multiple uses of the ecosystem (or a portion of said data) can be aggregated to develop a training dataset. For example, usage records 1717 collected via computing system 1718 may be de-identified or anonymized, before being added to the training set. As described earlier with reference to FIGS. 11 and 12, a typical workflow may take in as input varies DE tools 1731 and information from a repository of common V&V products 1741.

In a first sequence of steps, a user 1704 uploads 1751 an MBSE file onto a digital engineering platform, which receives 1753 the MBSE file. The machine learning engine on the digital engineering platform then analyzes 1675 the MBSE file to extract relevant information. The machine learning engine (e.g., an AI algorithm) then suggests 1757 appropriate API functions and parameters for the MBSE file. At this point, the user 1704 may input 1759 (e.g., via texting) inputs (e.g., search terms, feedback to system recommendations). The platform then creates 1761 a set of wrappers for V&V purposes based on the user inputs and/or and the suggested appropriate API functions and parameters for the MBSE file.

After the set of wrappers is created, the platform assists 1767 in sequencing the wrappers, and the multiple wrappers are linked 1769 into a digital thread. In parallel or in series with steps 1767 and 1769, a corresponding set of DE tools are connected 1763 with wrappers. Then, based on the digital thread from step 1769 and the corresponding set of DE tools from 1763, corresponding DE tools are linked 1765 in sequence. At this point, repository of common V&V products 1741 may monitor 1771 the digital thread. The user may also input 1773 information to refine and/or execute the digital thread.

Thus, the platform generates API scripts using API calls from the relevant tool, and creates API endpoint that returns a relevant file (e.g., mesh file or analysis result file). The user may upload another file and the process repeats in order to link one or more files. As a specific example, consider a user providing text inputs or prompts to link a CAD file and an FEA tool. An AI algorithm creates the necessary wrappers based on the user input. Another AI algorithm checks the scripts, and links the CAD file and the FEA model together by calling the API endpoints. The machine learning engine logs the use of API endpoints and learns the relation between them. Additionally, a user may link the CAD and FEA models with final documentation by merging the files together and calling all API endpoints. The machine learning engine uses this feedback loop to make better recommendations on which digital engineering models should be connected.

One specific example of the AI-assisted functions in the machine learning engine is when it uses fine-tuned language models, such as GPT-3, using user inputs and example scripts based on MBSE files and their API scripts as training data. The process starts with collecting and preparing a large dataset of MBSE files and their corresponding API scripts, which serve as the training data for the fine-tuned language model.

The language model is fine-tuned using a supervised learning approach, where the model is trained to predict appropriate API functions and parameters for a given MBSE file. The fine-tuned language model can then be used to generate API scripts for new MBSE files based on user inputs and the MBSE file. Additionally, unsupervised learning techniques can be used to further improve the model's ability to suggest relevant API functions. The unsupervised learning algorithm can learn to identify patterns and relationships between different MBSE files and their corresponding API scripts, allowing the system to suggest new and potentially useful API functions that have not been used before.

Once the fine-tuned language model is trained and validated, it is integrated into the platform's workflow. The AI-assisted functions continue to improve over time as the machine learning engine receives feedback from users and logs the use of API endpoints. The fine-tuned language model can also be retrained periodically to incorporate new data and continue to improve its accuracy and performance.

AI-Assisted Digital Thread Generation

FIGS. 18-20 show an example schematic of a variety of tasks performed by an AI-assisted digital thread, in accordance with the examples disclosed herein. In particular, FIGS. 18-20 illustrates the tasks performed to generate a report document dynamically linked to a CAD model and an FEA model. Actions shown are performed by a user (204, 206A/B), the IDEP (208, 217, 220, 222), one or more DE tools (202), and one or more V&V products (210), as described in the context of FIG. 2.

More specifically, FIG. 18 shows an exemplary process for extracting DE model (CAD or FEA) data for sharing, in accordance with some embodiments of the present invention. While CAD and FEA models are discussed explicitly in this example, DE models of other types may be processed in a similar fashion.

The process of preparing a CAD model for sharing begins with the user uploading a CAD file (e.g., sld.prt) to the IDEP at a step 1802. The IDEP receives the CAD model at a step 1810 and forwards it to an AI algorithm (e.g., a recommender ML model) configured to suggest appropriate API functions and parameters for the CAD file at a step 1812. The IDEP then creates appropriate API endpoints that return a mesh file (e.g., in .msh format) at a step 1814. In some embodiments, a corresponding DE tool (e.g., a CAD tool) runs the API script (e.g., in Python, C#) of the API endpoint to generate the mesh file at a step 1820. The linkable CAD model 1815 is now ready for sharing. Note this process of preparing the CAD model may be viewed as AI-assisted CAD model splicing. A digital artifact (e.g., the mesh file) is generated from a CAD model splice having dedicated API endpoints in the form of splice functions for accessing or generating this digital artifact. The AI algorithm used at step 1812 may recommend these dedicated API endpoints from an API function library for CAD models. In some embodiments, this AI algorithm may be trained using an AI training database 1830 including sample DE model files, corresponding sample output API endpoints, and optionally corresponding common V&V products that may list specific types of digital artifacts needed for specific V&V purposes. The AI training database 1830 may receive relevant training data from common V&V products that are available to the platform (e.g., design verification documents such as dynamic and static stress analyses 1840).

Using the same steps, the process of preparing an FEA model for sharing begins with the user uploading an FEA simulation project file (e.g., mechanical project file, .wbpj) to the IDEP at step 1802. The AI-assisted system receives the FEA file, and the AI algorithm suggests appropriate API functions and parameters for the FEA file. The platform may then create an API endpoint that accepts the mesh file (e.g., .msh) as mentioned above and returns a textual data file (e.g., .rst). In some embodiments, a corresponding DE tools (e.g., an FEA tool) runs an API script (e.g., in Python, C#) and generates the output textual data file (e.g., .rst, json). The output 1815 of the FEA simulation on the digital model is now ready for sharing.

FIG. 19 shows an exemplary process for generating a magic docs-type documentation, in accordance with some embodiments of the present invention. The process of performing AI-assisted documentation of a current project begins with the user uploading an example or template FEA report (e.g., MSWord, PDF) to the IDEP at a step 1902. Optionally, the user may update or correct this example report at step 1904. That is, the user may override system text. For example, the user may indicate that a .rst file or a .json file from FEA simulation output can be used in subsequent steps. The IDEP receives the FEA report at a step 1910 and forwards it to an AI algorithm (e.g., a recommender ML model) configured to suggest, at a step 1912, appropriate DE model artifacts or DE model inputs required to generate a complete version of the report (e.g., .rst file from an FEA simulation). Next at a step 1914, the IDEP may generate an output report using a fine-tuned LLM from the suggested DE model artifacts, for example, in the form of a magic doc. A magic doc may be built upon a document splice and may comprise appropriate API endpoints (e.g., addressable references and functional access to individual sections of the document) that can be connected to DE models for live, dynamic updates in response to changes in the linked DE models. In some embodiments, a webpage may be created at step 1914 for the generated FEA report to provide secure, web-based access to its API endpoints. In some embodiments, a corresponding DE tool (e.g., a FEA tool) runs API scripts (e.g., in Python, C#) of the API endpoints at a step 1920 to generate data required for report generation step 1914 (e.g., a mesh file for an CAD model, or an .rst file or .json file for an FEA model). An output report 1915 with the appropriate API endpoints linking to the two DE models (CAD and FEA models) for live linking data is now ready for sharing.

In some embodiments, the process 1914 used to generate the output report with the required API endpoints may use an ML model or AI algorithm trained using an AI training database 1930 comprising sample input data artifacts, corresponding sample output reports, and optionally corresponding common V&V products that may list specific types of digital artifacts needed for specific V&V purposes. The AI training database 1930 may receive relevant training data from common V&V products that are available to the platform.

In other embodiments, the process for suggesting 1912 DE model artifacts required to generate an output report may also include an ML model trained using an AI training database 1930 comprising sample input DE model files and corresponding sample output data artifacts. In one embodiment, the inputs of such an ML model may also include API endpoints generated for different DE models files at step 1814 in FIG. 18.

FIG. 20 shows the linking of CAD and FEA models 1815 with the documentation of an analysis 1915, according to exemplary embodiments of the present invention. The process begins with the IDEP detecting that the user, at a step 2040, is writing an orchestration script for merging the files together by calling API endpoints from all three (e.g., CAD API endpoint, FEA API endpoint, and document API endpoint). An example of an orchestration script for linking the models and documents to generate a report is provided below. This software code defines a digital thread that upon execution, generates a FEA report from digital artifacts extracted from a CAD model and an FEA model.

```
import IstariCollaborationPlatform
# API endpoint for extracting .msh file from CAD file
extract_api=
    "https://istari.com/api/enterprise/CustomerCo/models/CAD/ext
    ract/{unique_ID}"
# API endpoint for performing FEA analysis on .msh file
fea_api=
    "https://istari.com/api/enterprise/CustomerCo/models/FEA/ana
    lyze/{unique_ID}"
# API endpoint for converting .rst file to PDF for FEA report
pdf_api                                                        =
    "https://istari.com/api/enterprise/CustomerCo/models/report/
    pdf/{unique_ID}"
# Unique ID for the CAD file
unique_ID = "PI314159"
# Call the CAD extraction API to get the .msh file
response   =   requests.get(extract_api.format(unique_ID        =
    unique_ID) )
msh_file = response.content
# Perform the FEA analysis on the .msh file by calling the FEA
    API
response   =   requests.post(fea_api.format(unique_ID = unique_ID),
    data = msh_file)
rst_file = response.content
# Convert the .rst file into a PDF document for the FEA report
headers = {"Content-Type: application/octet-stream"}
response   =   requests.post(extract_api.format (unique_ID      =
    unique_ID), data = rst_file, headers = headers)
pdf_file = response.content
# Save the PDF file to disk
with open("fea_report.pdf", "wb") as f:
    f.write(pdf_file)
```

Upon execution of this digital thread written as an orchestration script, a CAD tool may run the CAD model API scripts (e.g., the CAD tool is used during execution of a requested API function) and generate an output file (e.g., .msh) at a step 2080; a FEA tool may run the FEA model API scripts and generate an output file (e.g., .rst or .json) at a step 2084. An LLM generation model may then take in the data from the output file at a step 2060 and generate a draft FEA analysis report. The user may now edit the report and send the edited report or a link to the edited report elsewhere at a step 2010. Furthermore, The AI-assisted system may log the use of the API endpoints at a step 2070 and learns that the .msh and .rst API endpoints are part of an "FEA report" and can be invoked in sequence in a digital thread because they are called in close relation to each other.

In some embodiments, instead of manually writing the script, the user may provide an optional prompt at a step 2030. The user inputs texts (e.g., a search or prompt) instructing the IDEP to write an FEA report from the CAD model and the FEA simulation. The LLM generation model at step 2060 interprets the user intent input, and creates and runs a script that links the API endpoints appropriately to write the FEA analysis report. In some embodiments, both the script and the report may be presented to the user, and the user may provide feedback to the AI algorithm. For example, the user may correct the AI algorithm and indicate the script may take a .rst file or a json file from an output of an FEA simulation. In some embodiments, the user may ask for a different report (e.g., provide additional text inputs), or accept the report but edit parts of the report for a specific use case. Such edits may be logged as training data for the AI algorithm as well.

In yet another illustrative example, one or more of the following steps may be performed in generating and running a digital thread to create a FEA analysis report dynamically linked to a CAD model and an FEA model, in accordance with some embodiments of the present invention.

1. CAD Model Preparation for Sharing
   a. A user uploads a CAD file (e.g., .sldprt) to the IDEP, which may provide an HTTP 202 response.
   b. The IDEP receives the CAD file (HTTP 206 response) and analyzes to extract relevant information.
   c. A first AI algorithm suggests appropriate API functions and parameters for the CAD file.
   d. The IDEP generates API scripts (e.g., using a second AI algorithm to write python or C#scripts using API calls from a CAD tool). One of the scripts transforms the CAD file into a mesh for FEA analysis (e.g., as an "output" function). The CAD tool can run the API script (Python or C#) and generates the mesh file (.msh).
   e. The IDEP creates an API endpoint that returns the msh file (e.g., Istari/User/CAD/EP8736181).
2. FEA Model Preparation for Sharing, Linked from the CAD Model
   a. The user uploads a FEA simulation project file (e.g., Mechanical project file (.wbpj)) (HTTP 202 response)
   b. The IDEP receives the FEA file (HTTP 206 response) and analyzes to extract relevant information.
   c. The first AI algorithm suggests appropriate API functions and parameters for the FEA file.
   d. The IDEP generates API scripts (e.g., using the second AI algorithm to write python or C#scripts using API calls from a FEA tool). One of the scripts accepts a .msh and runs the FEA analysis using the parameters associated with the FEA file. The FEA tool can run the API script (Python or C#) and generates an output file (.rst or json).
   e. The IDEP creates an API endpoint that accepts the .msh file and returns the .rst file (e.g., Istari/User/FEA/EP8736181).
3. AI-Assisted Documentation of Current Project
   a. The user uploads an example FEA report (e.g., MS Word or PDF).
   b. The IDEP receives the example report document (e.g., a Word file) and analyzes to extract relevant information
   c. An AI algorithm may create a sub-LLM fine-tuned on the structure and content of the document (e.g., tokenization-embeddings-transformers)
   d. The AI algorithm suggests DE model inputs required (e.g., .rst file from an FEA analysis) to generate a complete version of the report from the example.
   e. The user may update or correct the AI algorithm (e.g., indicate that it can take a .rst file or a json file from an output of an FEA simulation to generate the report).
   f. The IDEP creates a webpage for the FEA-Report fine-tuned LLM and API endpoints for the FEA-Report (e.g., "https://istari.com/api/enterprise/aerospace/models/CAD/FEA/report/{.rst file}?format={pdf|word|html}").
4. Linking the CAD Model and the FEA Model Using a User Script and Collecting AI Training Data
   a. The user writes a script for merging the files together, calling both CAD API endpoint, the FEA API endpoint, and the document API endpoint.
   b. The CAD tool runs the API script and generates the mesh file (.msh).
   c. The FEA tool runs the API script and generates an output file (.rst or .json) from the mesh file.
   d. The system logs the use of the API endpoints and learns from the user script that the msh and .rst API endpoints are related because they are called in close relation to each other.
   e. The user can use the .rst file in further analysis.
   f. Linking the CAD model, the FEA model with the documentation of analysis, using a user script and collecting AI training data g. The user writes a script for merging the files together, calling all three API endpoints: the CAD API endpoint, the FEA API endpoint, and the document API endpoint.
   h. The CAD tool runs the API script and generates the mesh file (.msh).
   i. The FEA tool runs the API script and generates an output file (.rst or .json) from the mesh file.
   j. An LLM generation model takes in data from the .rst file and generates a draft FEA analysis report.
   k. The system logs the use of the API endpoints and learns from the user script that the .msh and .rst API endpoints are part of an "FEA Report" and can be invoked in sequence in a digital thread because they are called in close relation to each other in the user script.
   l. The user can edit the report and send it to their team or share it via a link. Any user feedback on the report (e.g., requesting a different report, edits to the report) may be logged as AI training data for the LLM generation model.
5. AI-Assisted Orchestration Script Generation to Link the CAD Model, the FEA Model, and the Documentation of Analysis
   a. Instead of providing the orchestration script as in steps 4a or 5a above, the user provides text inputs (via search or prompt) indicating the need to link a CAD model to a FED model, or the need to write an FEA report from a CAD model and an FEA simulation. This is a user intent input.
   b. The IDEP performs steps 1, 2, and 3 above to create CAD, FEA, and documentation API endpoints. Corresponding DE tools are connected with the API endpoints.
   c. An AI algorithm trained on usage patterns of API endpoints (e.g., logged during step 4d or 5c above) assists in sequencing and linking the CAD model, the FEA model, and the documentation with appropriate API endpoints to generate the report. Corresponding DE tools are linked in sequence as well. This AI algorithm may be implemented as a script-generating ML model that creates a digital thread in the form of an orchestration script such as the example discussed in the context of FIG. 20.
   d. The user can refine and execute the digital thread to generate the desired report.
   e. Any user feedback for refining the digital thread and editing the report may be logged as AI training data.

AI training data collected in steps 4d, 5e and 6d may be used in training the AI algorithms in steps 1c, 1d, 2c, 2d, 3d, 5d, and 6c above. This feedback loop of monitoring the API endpoints on when and how they are called allows the system to make better recommendations on which DE models should be connected to each other and which DE models should be connected with which reports.

Digital Thread and Associated Magic Document Generation and Update

In the interconnected Development Environment Platform (IDEP), a digital thread represents an orchestration or coordination script which associates suitable model splices, and specified splice functions aided by code annotations for enhancing overall code comprehension. In certain embodiments, artificial intelligence (AI) is employed for creating digital threads in response to user input. Within these systems, the AI-facilitated digital thread may be combined with a "magic document" that provides explainability and allows an audit trail for the digital thread. This "magic document" may be generated with the help of AI, elucidating the process through which the digital thread efficiently converts the user's intent into orchestration scripts that include relevant model splices and splice functions. Specifically, a magic document generated by the IDEP may explain the digital thread's implementation of the user intent, and may comprise pseudocode, scripts, data fields, and natural language-based descriptions. When the digital thread and accompanying orchestration scripts are executed to perform a DE task, the magic document may record the task completion for auditability. A digital thread may comprise orchestration scripts in sequence. One or more corresponding magic documents for a digital thread may invoke a subset of data points and orchestration script examples as needed. In one example, a companion magic doc for a given digital thread may include key data points (e.g., material strength, battery life) and key orchestration script examples that are related to and may be executed to achieve a user's intent (e.g., "increase a drone's wing span by 1%"). In some implementations the dynamic nature of a magic document with dynamic data links can be timestamped, digitally signed and turned static, that is, magic docs can also be turned into a document reflecting the operation of a specific digital thread in the IDEP at a specific time in a specific user context, thereby meeting auditability requirements. In another implementation, such a static magic doc may still tie dynamically to a specific version of a DE task's certification, while no longer updated to the most recent data.

FIG. 21 shows an update process flow swimlane for a digital thread and an associated magic document, in accordance with some embodiments of the present invention. Note that some steps and components in FIG. 21 contain numerals from two sets: the four-digit numerals (e.g., 2120, 2122) are reference characters, whereas the bolded single- and double-digit numbers (e.g., 1, 2) show the general chronological sequence of steps.

The process for updating an existing digital thread 2104 involves at least two entities: a DE platform 2106 and a requester 2108. The process begins 2110 when the requester 2108 selects 2112 a required digital thread and magic document to update. The DE platform 2106 may then update 2120 data fields of linked information (e.g., user data, modeling and simulation parameters, simulation outputs). The DE platform 2106 may then determine 2122 whether the data matches predefined criteria. If the answer is "no," then the requester 2108 may update 2114 the digital thread and accompanying magic document with text details manually, referring to data from the DE platform 2106. The requester 2108 may then update the 2116 metadata, thus completing the digital thread. The digital thread is hence ready for submission review, thus completing 2118 a first branch of the process.

On the other hand, if the DE platform 2106 determines 2122 that the data indeed matches predefined criteria, then the digital engineering platform 2106 may suggest 2124 related data fields available to the DE platform 2106 for the requester 2108 to include. The requester 2108 may then select or reject 2134 the suggested related data fields/recommended splices, splice functions, or digital scripts.

After the DE platform 2106 suggests 2124 data fields from the DE platform 2106 that are relevant for the requester 2108 to include, the resulting data fields (e.g., user data prompts and digital thread field sections, including scripts and document fields) may be input 2126 to the NLP/LLM model. The NLP/LLM model may then generate a digital thread and a companion magic document, or assist 2128 in digital thread and magic document text generation by making script/section suggestions and guiding the user. The DE platform 2106 may recommend 2130 code comment and script code additions to the digital thread, as well as text additions to the magic document. The requester 2108 may select or reject 2132 the recommended updates to the digital thread or document text, as appropriate. The requester 2108 may then update 2116 metadata for the generated or modified orchestration script. This renders the digital thread and associated magic document completed and ready for submission review, thus completing 2118 a second branch of the process.

For digital thread generation, an NLP/LLM model may be used, as mentioned above. The DE platform 2106 may train 2136 an NLP/LLM model by taking the outputs of two competing networks and evaluating them against a known standard, according to one embodiment of the present invention. The training may use generative adversarial networks (GANs) trained to select between options, in conjunction with Q learning, where an agent is provided reinforcement learning feedback, and is able to operate with minimal supervision. To carry out digital thread generation, various other ML model architectures are within the scope of the current invention, as discussed in the machine learning (ML) and neural networks section below.

In the embodiment of FIG. 21, the inputs of the training process 2136 are represented using dashed arrows. These may include the system-recommended 2124 orchestration scripts and splices that were selected or rejected 2134 by the user for the generation of their digital thread. Other inputs to the training process 2136 may also include the ML-generated 2128 digital thread updates that were selected or rejected 2132 by the user. Such user feedback (e.g., 2132, 2134) may be stored in a training database on the IDEP for ML training, fine-tuning, and testing/validation purposes.

In some embodiments, a "user" and a "requester" are the same entity when they perform selection 2112, manual update 2114, feedback (2132, 2134), and/or metadata update 2116 tasks. In other embodiments, a requester may only perform the initial selection task 2112 then hand over the process to a second user to complete manual update 2114 and metadata update 2116 tasks. In one embodiment, the metadata update 2116 is carried out by a script running on the IDEP.

FIGS. 22 and 23 show a detailed process flow for digital thread and magic document recommendation, creation and update, in accordance with some embodiments of the present invention. The detailed process flow for digital thread and magic document creation and updating includes a first part (flowchart 2200 shown in FIG. 22) and a second part (flowchart 2300 shown in FIG. 23).

In the example of FIGS. 22 and 23, the objective is the generation of a digital thread and an associated document (e.g., a companion magic doc) such as may be useful for purposes of explainability and auditability. The flowcharts shown in FIGS. 22 and 23 may utilize a generator ML engine, or generator ML model, that is trained to generate a digital thread and an associated document from a user input (e.g., a user prompt) and, optionally, a document template. The flowcharts shown in FIGS. 22 and 23 may also utilize a recommender engine for recommending document templates, prior digital thread examples, or prior document examples, to facilitate the digital thread generation process.

The process starts with user-initiated steps 2204, including steps 2206 and 2208. In step 2206, a user creates digital thread and magic documents based on target outcome and purpose, following a template. Then, in step 2208, the user adds metadata tags about specific purpose, priority etc. Next, system data steps 2210, including steps 2212 and 2214, are carried out. In step 2212, a documentation system adds any new digital thread and magic document, along with metadata, to a library. In step 2214, the system runs scripts to clean and/or pre-process metadata regularly, e.g., so that features are on corresponding common scales. Next, digital thread and magic document creation steps 2216, including steps 2218, 2220, and 2222, are carried out. In step 2218, the user selects specific metadata from a query menu. In step 2220, the system provides a list of templates or prior digital thread or magic document examples (with sanitized data), including the corresponding metadata. In step 2222, if no prior digital thread or magic document or template is available, the system creates a new digital thread or magic document or template. Next, system output steps 2224, including steps 2226 and 2228, are carried out. In step 2226, the user selects an appropriate document for use for their selected purpose and/or need. In step 2228, the user may update the metadata of the selected document with a new need or requirement. The process may then proceed back to step 2212, or may proceed to step 2258 (point A), leading to flowchart 2300 (see FIG. 23).

At step 2214, the system run scripts to clean and/or pre-process metadata regularly, e.g., so that features are on corresponding common scales. At this stage, the system may perform clustering steps 2254, as part of the AI-assisted document creation process 2252. The clustering steps 2254 include steps 2230, 2232, 2234, and 2236. In step 2230, the system applies supervised or unsupervised clustering techniques to create clusters within the library. In step 2232, the system conducts silhouette coefficient or other performance metrics for measuring the quality of clusters in the template library. In step 2234, the system determines whether the clusters are of high quality, based on the metrics. If the clusters are not high quality clusters (i.e., the outcome is "no"), then the process returns to step 2230. If the clusters are high quality clusters (i.e., the outcome is "yes"), then, in step 2236, the system creates small sub-groups of clusters within the document library (of templates and previous documents that likely will be required in combination together).

Upon completing the clustering phase 2254, the system proceeds to perform classification steps 2256, which include steps 2238, 2240, 2242, 2244, 2246, 2248, and 2250. In step 2238, the system uses and/or collects metadata of sub-groups as training data. In step 2240, the user provides text input (which may include specific data fields, metadata, or target outcomes). In step 2242, the system runs a classifier algorithm to identify a best-fit sub-group for the user input. In step 2244, the system recommends template(s) or prior document example(s) accordingly. In step 2246, the user selects templates or rejects the recommended document examples. The process may then proceed to fine-tune or further fine-tune the recommender engine by returning back to step 2242. In step 2248, if no prior digital thread or magic document or template is available, the system creates a new digital thread or magic document or template. In some implementations, the system may recommend a generic document in steps 2246, 2248 and 2250, where the user may select and then build a new magic document off the recommended document. In step 2250, the user may update the metadata of the selected digital thread or magic document with a new need/requirement. In the embodiment of FIG. 22, the clustering 2254 and classification steps 2256 together constitute AI-assisted document creation 2252 (using clustering and classifier algorithm). The process may then proceed to step 2258 (point A), leading to flowchart 2300 (see FIG. 23).

Referring to FIG. 23, flowchart 2300 continues flowchart 2200 of FIG. 22 at point A, which connects steps 2258 and 2304. After step 2304, the system proceeds to step 2306, where the user has been assigned the digital thread or magic document to update. After step 2306, the process may proceed to a semi-automated digital thread or magic document update 2308 or to an AI-assisted digital thread and magic document update 2334.

The semi-automated digital thread or magic document update steps 2308 include steps 2310 and 2312. In step 2310, the system updates data fields of linked information (e.g. user data, modeling and simulation parameters, simulation outputs). In step 2312, the user updates the digital thread or magic document with text details manually, referring to data from the DE system. At this point, the process may proceed to step 2332, where the digital thread and magic document is completed and is ready for submission review.

The AI-assisted digital thread and magic document update process 2334 includes steps 2316, 2318, 2320, 2322, 2324, 2326, 2328, and 2330. In step 2316, the system updates data fields of linked information (e.g., user data, modeling and simulation parameters, simulation outputs). In step 2320, the system suggests related data fields in the DE system for the user to include. In step 2324, the user data prompts, digital thread sections, and document fields are input to the generator ML model. Separately, in step 2318, training data is prepared. This training data includes a large number (e.g., hundreds or thousands) of example digital threads and associated magic documents related to the data fields of interest. These fields may have been previously tagged, hence the data may already be labeled for training. In step 2322, the training data is used to train the generator ML model. Given the training data, a classical neural network architecture may become sensitive to a particular type of documents (e.g., companion magic docs) and recognize what combinations make sense.

In step 2326, the outputs of steps 2322 and 2324 are then input into a generator ML model with NLP/LLM support that assists in digital thread and magic document text generation. In step 2328, the system recommends text additions to the digital thread and the magic document. In step 2330, the user selects or rejects the recommended text. The system may fine-tune the generator ML engine by returning to step 2326.

Finally, in step 2332, the digital thread and magic document is completed and ready for submission review.

Content and Collaborative Filtering Recommender Engine for Digital Threads

In some implementations of AI-assisted digital thread creation, a machine learning (ML) engine employs both content and collaborative filtering for recommending digital threads. In the user input phase, a user searches for specific digital threads or compiles various code sections. The system input phase involves a repository of script templates and previous digital threads being labeled with metadata, thus defining a thread profile. The data fields from prior threads are checked and removed if they are found irrelevant or sensitive.

In the recommendation phase, the engine filters threads based on their profiles, correlates these with the user's profile, and assigns fitness metrics. The digital thread with the highest fitness metric, gauged from the user's past actions and their profile, is then recommended. This engine not only evaluates and stores the action steps related to the current user-thread pair but also updates the fitness metric considering the participation of other users working on similar tasks.

These recommendation steps involve using machine learning models, trained on datasets procured from the user input stage, encompassing a library of digital threads, templates, and user-profile metadata. As the database expands with more user inputs and associated threads, certain input-output pairs are selected for fine-tuning. User feedback on a digital thread generated by an ML-based generator engine can further refine the system, effectively enhancing the digital thread recommendation process.

Markov Chain Monte Carlo (MCMC) Recommender Engine for Digital Threads

In other implementations, a recommender engine may utilize a Markov Chain Monte Carlo (MCMC) approach for recommending digital threads, which uses stochastic processing reliant on the occurrence and sensitivity of specific steps within the digital thread. The process launches with a user input phase where the user defines requirements and constraints for the digital thread's sequence, such as specific code snippets, functions, or library calls.

Following user input, the MCMC phase initiates by constructing a state space comprising several digital threads matching the user-defined requirements. The process then assigns a relevance score and acceptance criteria for each thread, with a higher score signaling a higher likelihood of selection. Next, a proposal distribution is determined, where threads are randomly selected from the library based on a calculated probability distribution, which may be proportional to each digital thread's relevance score.

The MCMC algorithm then initializes the Markov chain by selectively picking an initial state from the state space. Iterative rounds of the Markov chain begin, with each iteration pulling at random a new state from the proposal distribution. Each randomly selected digital thread undergoes evaluation of selection probabilities and is accepted or rejected based on the specified acceptance criteria. The algorithm continually cycles through these iterations until the probabilities converge. The final state is selected from the highest relevance score, representing the most suited sequence of steps for the digital thread that fulfills the user-defined criteria. Ultimately, the final output of the algorithm is the selected digital thread sequence.

Generative AI Approach for Digital Thread and Associated Magic Document Creation FIG. 24 shows a detailed process flow for digital thread and associated magic document creation using a generative AI-assisted approach (i.e., a generator engine based on generative AI), in accordance with the examples disclosed herein. For instance, a user may upload a requirements model of an engine and a CAD model design of the engine, then request a summary digital thread and magic document report detailing whether the CAD model parameters meet the specific requirements of the uploaded DE model. The generation engine described in FIG. 24 may utilize the input DE model data and prepare the document, as described below.

In reference to FIG. 24, the digital thread and associated magic document creation and update process starts with a first user input phase 2404 where, at step 2406, a user provides a text input conveying their objective for use with the interconnected digital engineering and certification ecosystem.

At step 2408, the user may select specific purposes for the digital thread and the magic document (as part of an overall certification or validation). Alternatively, at step 2410, the user may input specific product design, update, or requirement constraints (e.g., "single engine", "fixed wing", "2,000 lbs.", etc.). At step 2412, the user may select a pre-trained LLM (e.g., GPT-3 DaVinci model) for baseline document generation/update. In another embodiment, the system may select an adequate LLM based on the user's profile (e.g., user-document profile data).

At step 2416, baseline metadata is collected from the user, comprising ontology of requirements, with associated hierarchies, for certification or other documentation purposes. For example, such baseline metadata may include the requirements specified for Major Capability Acquisition (MCA) or 516c airworthiness requirements, etc.

In an AI-assisted phase 2418 of the process where the document is created and/or updated, at step 2420, a training set is prepared manually. At step 2420, synthetic data is added to the training set. LLMs are well suited for implementing this step, where training data may include prior document and digital thread examples, for which metadata can be further added using an external expert user. Alternatively, synthetic data can be generated using random perturbation on an already accepted data element (e.g., data field in a document), then introduced in the training data by a subject matter expert.

An LLM fine-tuning step 2426 is then carried out, including the fine-tuning of the LLM using prompt-response pairs 2428 (e.g., from a database of examples), leading to the development of a custom fine-tuned LLM that is targeted to the thread creation and documentation process 2430.

An example of a prompt-response pair is provided below:
Prompt: I want to build a fixed wing airplane, with 2000 lbs weight and using gas turbine engines. I need to demonstrate the safety of my engines.
Response: In 516c, Chapter 7 for propulsion system safety, the requirements are: JSSG-2007: A.3.1, A.4.1; A.3.2, A.4.2; A.3.2.1, A.4.2.1; A.3.3.1, A.4.3.1; A.3.3.2, A.4.3.2; A3.4, A.4.4; A.3.5.1, A.4.5.1; A.3.7, A.4.7; A.3.7.2.1, A.4.7.2.1; A.3.11, A.4.11; A.3.12, A.4.12; Table XLIXa USAF PCoE BP 99-06D 14 CFR 33.5, 33.35, 33.7, 33.75, 33.8 FAA AC 33-2

At step 2432, the custom fine-tuned LLM is utilized to recommend code comments, script code (e.g., code blocks), or text additions (e.g., text blocks) to a digital thread and magic document. At step 2434, FIG. 24 illustrates the use of reinforcement learning from human feedback (RLHF) to loop back to step 2432, whereby the user selects or rejects the recommended code comments, orchestration code or text. LLM fine-tuning using fine-tuning data sets, as described below, may also be used. The system loops to step 2432 as long as new script and/or document additions are requested or as long as fine-tuning has not reached a pre-specified level of accuracy.

Note that the LLM in step 2432 will utilize the user input as context to differentiate between an update and a creation process. Digital thread updating differs from new digital thread generation in the data fields or orchestration script code checks that may be needed for generation or modification. A user may prompt a ML model (e.g., LLM) to modify specific orchestration scripts or data fields or magic document parts within a particular document. Alternatively, an ML model (e.g., LLM) may identify the data fields and orchestration script code and magic document parts to be modified after being trained on a dataset of sample unmodified and modified digital thread and magic document pairs. If the IDEP detects an anomaly within the values for certification after passing updated "requirements", then the parts of the digital thread and magic document to be updated can be determined and highlighted by a ML model (e.g., LLM) using the user input.

As an example, the architecture of such a fine-tuned LLM used to generate digital thread and magic documents is described. In an implementation example, the IDEP maintains fine-tuning datasets from various fine-tuned LLMs, each targeting different domain-specific applications. The fine-tuning process includes generating tags for these datasets using a backend of LLMs, storing these tags along with updated metadata in a tags database, and extracting this information through a cross-platform frontend to create new or updated fine-tuning datasets. These datasets are then reviewed by subject matter experts before being stored in the database according to CRUD practices. The architecture can utilize commercial off-the-shelf (COTS) infrastructure like Azure Database for MongoDB Servers for storing fine-tuning and tags databases. The frontend can integrate datasets and tags using tools such as PyQt, facilitating the creation or update of fine-tuning datasets.

Based on the use of platform data, this architecture may be reused on separate fine-tuning datasets to train and create a library of fine-tuned LLMs, each customized to specific AI-assistance use cases (e.g., different types of documentation, model sharing), or targeted to a different DE software or tool.

In various embodiments, during LLM training and/or fine-tuning:
1. Training data may include previously generated and modified digital threads or documents, as well as thread or document creation/modification history for different user profiles.
2. Synthetic data creation may follow a rule-based approach for permutations on existing data, using an abstract syntax tree for variants, where a compiler is used to verify success.
3. Prompt-response pairs for fine-tuning the LLM may be increased through permutations following an abstract syntax tree.
4. System architecture may be reused to train and create a library of fine-tuned LLMs, each customized to a specific AI-assistance use case (e.g., DE task types, documentation types, model sharing).

Furthermore, training data examples may include any of the following:
1. Tool-specific and platform documentation, such as API reference guides, user guides, and tutorials.
2. Technical articles and blog posts, specifically discussing digital engineering operations.
3. Online forums (e.g., Stack Overflow) and other Q&A threads.
   a. The training dataset would include stack overflow and other Q&A threads that discuss digital engineering documentation.
4. Publicly available documents, such as DE tool and API descriptions and other information that can be gathered from publicly available sources.

In some embodiments, synthetic data generation may rely on:
1. Abstract syntax tree-customized for specific digital engineering applications.
2. Selectively run permutations on training data.
3. Test for compile, then recommend adding to synthetic data.
4. Expert feedback.

In some embodiments, a digital thread and related documentation outline may be generated iteratively, progressively, or incrementally using a generative-AI based algorithm (e.g., LLM). Specifically, a digital thread and a related human-readable documentation on the digital thread may be generated from one or more machine-readable DE models via model-to-model and model-to-document linking, with the assistance of an LLM-based AI module. For example, a Computer Aided Design (CAD) file of an airline seat design and a SysML file of requirements may be spliced and linked, and a report template may be respectively spliced and linked to generate an airline seat certification report. Once the digital thread and related documentation outline are created, they may be updated automatically and dynamically based on revisions to constituting DE models.

In an exemplary process, the following steps may be carried out:

LLM Training/Fine-Tuning: an AI model such as an Orchestration Script and Systems Reference Documents (SRD) LLM (or LLM-OSSRD) may be trained based on few-shot learning of a generic LLM such as GPT4, LLAMA2, and/or MISTRAL, and fine-tuned on examples of orchestration scripts of digital threads with related SRDs.

Model Splicing: any input DE model (e.g., CAD model, SysML model) is spliced, and resulting API endpoints may be accessed via product function API calls (e.g, extract a center of gravity and weight from a CAD model, export requirement parameters in the SysML model).

Outline Generation via LLM: the API response may be added to a prompt for linking DE models into a digital thread and for generating a related documentation outline.

Digital Thread and Document Generation via LLM, by Sections: the LLM-OSSRD fine-tuned above may be prompted on a per-part or per-section basis, one part of the digital thread and a corresponding section of the documentation outline at a time, until all parts of the digital thread and related documentation have been created. As discussed previously, a digital thread may be represented by an orchestration script, which may constrain multiple sections, such as code blocks with transaction/execution metadata, and text blocks (see FIG. 27). When executed, a code block may carry out a specific subtask within the orchestration script. A code block may contain actual code or links to code. Text blocks provide contextual, parametric, requirements-related, and/or certification-related information on linked DE models. Each block or groups of consecutive blocks may be generated via the LLM upon proper prompting. Similarly, parts of the related documentation outline may be generated iteratively. In some embodiments, a digital thread section (e.g., a code block) and a corresponding related documentation outline section (e.g., descriptions of the code block's functionality and input/output ranges) may be generated by the LLM as a single output. A motivation behind this iterative approach is that LLMs typically have token limits on their input sequences, and prompt generation needs to take this limitation into account, but aggregating only subsets of DE model data that are relevant to a single part.

Digital Thread and Documentation Compilation: all parts are compiled into a complete draft.

In some embodiments, the related documentation outline or companion magic document ("magic doc") provides auditability and traceability capabilities by logging the execution of parts of the orchestration scripts. These features enable a user or third parties to record and audit the evolution of the digital thread and its interaction with other entities and files, which enables accountability and trust. To implement these features, the magic doc comprises API endpoints to human-readable text blocks, and when a portion of the orchestration script (e.g., a code block) is executed, an associated audit log may be added to the magic document using its API endpoints. This addition may be permanent and/or unerasable by third parties. This audit log may comprise digital thread transaction records and/or endpoint metadata associated with the invocation of API endpoints. Exemplary endpoint metadata may include model owner organization, model owner ID, user ID, access rights of user, device ID, device location according to IP number and geographic location identifiers, and ID for the model splice and splice functions, transaction commands related to the model splice and splice function calls, a time associated with each transaction command, and a value associated with the transaction. Other examples may include a function ID, a type of method to be called; a start time of the transaction; an end time of the transaction, a duration; the parameters of the call made by the model splice and splice function; the success of the call (e.g., either "TRUE" or "FALSE" or "NULL"); CPU cost time in money, time and/or cycles; and GPU cost time in money, time and/or cycles. Other examples are also possible.

Domain Specific Language (DSL) Generator Engine for Digital Threads

In certain implementations, the IDEP incorporates a generator engine for digital threads using a Domain Specific Language (DSL). Digital threads naturally fit within the DSL's rule-based generation system.

In an example implementation, a user may specify the requirements for an orchestration script and select a suitable DSL parser. The user may then develop DSL rules to delineate the orchestration script, detailing how various software components or services will interact. The user may also refer to necessary code documentation for API scripts for various DE tools.

During the operational phase, the DSL engine may employ these rules to manage the workflow. It may scan a database of scripts or service definitions to identify matches that fulfill the user's specified criteria. These elements may then be compiled to produce a functional digital thread where the DSL provides tight control over the orchestration process.

Generally, a DSL-based generator engine being memoryless, it may not benefit from the context available to a ML-based or transformer-based generator engine. However, a ruleset for the "types" of digital thread templates for a range of DE tasks may be provided in a digital thread template database. Based on the digital thread template data fields to be filled, rules may be provided to traverse a data-field tree and assign values or labels as the tree is built out and subsequently traversed. This results in a dynamic tree approach, where rules are dependent on the needs of the digital thread to be generated.

Exemplary Digital Thread Graphical User Interfaces
Exemplary Digital Engineering Verification and Certification Process FIG. 25 shows graphical user interfaces (GUIs) associated with an example digital thread for verifying and certifying requirements within an IDEP, in accordance with the examples disclosed herein. FIG. 25 shows an example of an unmanned aerial vehicle (e.g., drone) undergoing digital certification.

A series of example displays 2500 shown on the user device illustrate the certification digital thread, in accordance with the examples disclosed herein. It is noted that in implementations involving artificial users that interface with the computing system via an API 206B, no displays are needed since artificial users can directly process digital computer files received at the API 206B without further visualization. The series of example displays 2500 can correspond to the example digital thread workflows described in relation to FIGS. 15-20. Once again, these displays are not intended to be limiting, but are merely demonstrative of the kinds of user experiences that the user 204 (and in particular, a human user) may encounter while implementing a digital thread over the interconnected digital engineering and certification ecosystem 200. The series of example displays 2500, as described herein, highlights the ease of use of the ecosystem 200 and the avoided complexity of requiring a user to separately interface with individual digital engineering tools and manually review complex common V&V products to evaluate if a prototype of a product should be certified.

Display 2502 shows a log-in screen that can be displayed on the user device 206A. The log-in screen can prompt the user 204 to input user credentials (e.g., username and password) to access the computing system 208 and the rest of the interconnected digital engineering and certification ecosystem 200. The user credentials associated with user 204 can serve a variety of functions. For example, as previously described, the user credentials can be associated with a skill level of the user, which can control what functionalities of the ecosystem 200 that the user 204 can access. In some implementations, the user credentials can additionally or alternatively be associated with an affiliation of the user (e.g., with a particular company and/or organizational entity), which can govern the previously designed products 208 and/or solutions that a user may search for and/or be suggested by the computing system 208. In general, user credentials can help ensure that the user 204 is only able to access information within the ecosystem 200 that the user 204 is qualified and/or authorized to access.

Once the user 204 has logged in from the user device 206A, the user device 206A can be used to develop a digital prototype for a product. For example, display 2504 shows a modeling screen that the user 204 might see while developing a digital model of a UAV (e.g., using a CAD tool). Once the prototype has been developed, the user can upload prototype data, such as a CAD file and/or a MBSE file to the computing system 208. Accordingly, display 2506 shows a screen that can prompt the user 204 to upload the MBSE file and the CAD file to the computing system 208.

Once the user has uploaded the MBSE file and the CAD file to the computing system 208, the computing system 208 can perform a number of steps to evaluate the prototype with respect to one or more requirements identified in a common V&V product and to generate a report summarizing the evaluation. In the illustrative example of FIG. 25, the evaluation is carried out in view of weight and center of gravity certification. In doing so, the computing system 208 may also communicate with the digital engineering tools 202 and repository of common V&V products 210, which can themselves perform operations to facilitate the evaluation of the prototype. These steps take time to complete (e.g., ranging from a few seconds to several hours), during which the display 2508 can be shown on a screen of the user device 206A, providing information about the current status of the evaluation of the prototype.

Once the evaluation of the prototype is complete, a generated report can be transmitted to the user device 206A from the computing system 208. Display 2510 shows a screen of the user device 206A that presents the report to the user 204. The report can present information indicating whether or not one or more requirements identified in the common V&V product of interest have been satisfied and can also present information about one or more issues that resulted in a failed requirement (e.g., a problematic component of the device). In some implementations, the presented information can also include more detailed data from the evaluation and/or a suggested solution for resolving the one or more issues to satisfy the requirements. For example, a weight and center of gravity certification report may include a general overview that lists which requirements are met and which requirements are not met, a list of issues encountered in a CAD overview, and one or more suggested solutions (e.g., "replace material of component C from steel to aluminum", where C is a given component of the UAV). The easily digestible format of the report presented on the display 2510 can assist the user 204 with understanding the reasons why a prototype might fail one or more requirements and can provide the user 204 with actionable suggestions to improve the digital prototype. The generation of the report on the display 2510 marks the completion of the certification digital thread.

Even in implementations involving an artificial user (where screen displays are not needed), a concise or standardized report in the form of a digital computer file sent to the API 206B can likewise assist the artificial user in summarizing the reasons why a prototype might fail one or more requirements and can provide the artificial user with actionable suggestions to improve the digital prototype.

Exemplary GUI for Digital Artifacts in a Digital Thread

FIG. 26 shows a screenshot of an exemplary graphical user interface (GUI) used to operate a digital thread over the IDEP, according to one embodiment of the present invention. The GUI provides the user of the interconnected digital engineering platform (IDEP) with the ability to select and view digital artifacts that they are authorized to access, including the initial version, most recent version, and any intermediate versions. FIG. 26 shows a browser window header 2602 which includes a digital thread link for easy navigation. Below the header, a domain and security level banner 2604 displays the domain, platform software version, and security level, ensuring that users are aware of the domain they are operating in and the security protocols in place. The security level indicator 2606 displays the user's maximum security access level within the platform (e.g., "Level 1"). The security level indicator is interchangeably referred to as "info security tag", "infosec tag" or "info see tag", herein.

The interface also includes a search bar 2612, allowing the user to carry out comprehensive cross-platform searches through the IDEP for digital engineering models, files, and documents, thus facilitating efficient retrieval of information across the platform. Adjacent to this, the user & domain field 2610 provides information on the user's domain (e.g., client name). The user and domain field may allow the user to login and to access user profile and subscription information.

The top menu of the GUI offers additional functionalities. For example, the digital artifact name field 2620 displays the digital model or document's name, and may include its version. In addition, the digital thread artifact field 2626 displays the digital artifact name. The digital artifact security level indicator 2622 displays the security level (e.g., "Level 1") of the digital artifact being accessed. In one embodiment, using an expandable security level menu adjacent to the digital artifact security level indicator 2622, the user may select the digital artifact's target security access level "view", thus filtering only the parts of the digital artifact accessible through a given security level. In other embodiments, the user may also use the digital artifact security level indicator 2622 to down-select the security level while sharing the digital artifact, thus sharing portions of the digital artifact that correspond to the specified security level. Only security access levels below the user's security level (e.g., "Level 1" in FIG. 26) would be available for the user to view and share. The user interface buttons 2624 include options to copy the digital artifact link, open a comment section, access digital artifact information, manage sharing access, and export the digital artifact.

In some embodiments, the granular dynamic info security tags (e.g., 2606 and 2622, and the like), are important elements of the digital thread and magic system and its associated GUI. The model splicer and the IDEP system enable the granular dynamic information security tags 2606 and 2622. In some embodiments, the digital thread system in the IDEP uses metadata of DE models or documents to cross-reference against authorizations, licenses, or regulations to update. In some embodiments, the granular dynamic information security tags 2606 and 2622 are dynamic, and are refreshed ahead of any digital thread updates to confirm the right authenticated user has the right authorized access to the digital artifacts and data to perform or view the updates.

At the center of FIG. 26, the digital artifact viewer 2640 displays the digital artifact that the user is authorized to access at the right info see level. Lastly, on the right of FIG. 26, the version pane 2650 exhibits the version history of the digital artifact within the digital thread. In the exemplary GUI of FIG. 26, the version card 2652 shows that the user is viewing the 'Most Recent' version of a digital artifact shown in the viewer. The version card 2654 shows the option to select the 'Initial' version of the digital artifact. In some embodiments, all versions of the artifact that the user is allowed to view at their infosec level are accessible through a versions menu in the version pane 2650.

Revisions of digital artifacts are highly likely during the course of execution of a digital thread associated with complex DE tasks. The Versioning GUI illustrated in FIG. 26 presents an example of how the IDEP can provide users with the ability to track versions with the right security controls and access controls.

Exemplary GUI for Orchestration Scripts in Digital Threads

FIG. 27 shows a screenshot of another exemplary graphical user interface (GUI) used to operate a digital thread over the IDEP, according to one embodiment of the present invention. The GUI provides the user of the interconnected digital engineering platform (IDEP) with the digital thread creation capabilities described herein. FIG. 27 shows a browser window header 2702 which includes a digital thread link for easy navigation. Below the header, a domain and security level banner 2704 displays the domain, platform software version, and security level, ensuring that users are aware of the domain they are operating in and the security protocols in place. The security level indicator 2706 displays the user's maximum security access level within the platform (e.g., "Level 1").

The interface also includes a search bar 2712, allowing the user to carry out comprehensive cross-platform searches through the IDEP for digital engineering models, files, digital threads and documents, thus facilitating efficient retrieval of information across the platform. Adjacent to this, the user & domain field 2710 provides information on the user's domain (e.g., client name). The user and domain field may allow the user to login and to access user profile and subscription information.

The top menu of the GUI offers additional functionalities. For example, the digital thread name field 2720 displays the digital thread's name, and may include its version. The digital thread security level indicator 2722 displays the security level (e.g., "Level 1") of the digital thread being accessed. In one embodiment, using an expandable security level menu adjacent to the digital thread security level indicator 2722, the user may select the digital thread's target security access level "view", thus filtering only the parts of the digital thread accessible through a given security level. In other embodiments, the user may also use the digital thread security level indicator 2722 to down-select the security level while sharing the digital thread or an associated magic document for the digital thread, thus sharing portions of the digital thread that correspond to the specified security level. Only security access levels below the user's security level (e.g., "Level 1" in FIG. 27) would be available for the user to view and share. The user interface buttons 2724 include options to copy the digital thread link, open a comment section, access digital thread information, manage sharing access, and export the digital thread.

In some embodiments, the granular dynamic info security tags (e.g., 2706 and 2722, and the like) are an important element of the digital thread and magic doc system, as well as its associated GUI. The model splicer and the IDEP system enable the granular dynamic information security tags 2706 and 2722. In various embodiments, the digital thread system in the IDEP uses metadata of DE models or documents to cross-reference against authorizations, licenses, or regulations to update. In some embodiments, the granular dynamic information security tags 2706 and 2722 are dynamic, and are refreshed ahead of any digital thread updates to confirm the right authenticated user has the right authorized access to the digital artifacts and data to perform or view the updates.

As discussed above, digital threads are a set of orchestration scripts to orchestrate the selective exchange of data among documents and DE model files. Digital threads therefore link all the resources relevant to accomplishing a given DE task, including the various sections of an orchestration script, the relevant DE models, as well as relevant context information and metadata.

For a secure digital thread organization and navigation, the illustrative GUI of FIG. 27 features a digital thread outline viewer 2730 on the left of FIG. 27, providing links to the digital thread's individual sections, including code blocks that may carry out individual subtasks within the orchestration script, text blocks that may provide contextual, parametric, requirement-related, and/or certification-related information on linked DE models. Text blocks may also include text paragraphs and/or orchestration code comments and data sources. Within the digital thread outline viewer 2730, a digital thread detailed viewer 2732 shows sections of the secure digital thread along with the linked digital engineering (DE) model(s), the associated magic documents, the source IT domain, and the last update timestamp, each tagged with the appropriate information security level (e.g., "L1" or "Level 1"). In some embodiments, the information security tag on a code block indicates a restriction on executing the code block. That is, a code block may only be run by an user entity with an equal or higher information security level. In some embodiments, the information security tag may indicate a viewing privilege, so the code block is only presented and viewable by an user entity with an equal or higher information security level.

In some embodiments, if sections of a secure digital thread contain content requiring a higher security level for viewing, the user may be presented with an option to request access. Were the user to request such access, an authorized user with access at a higher security level is notified for their review. In other embodiments, if sections of a digital thread contain content requiring a higher security level for viewing, such sections will not be shown for display, nor will the user be provided with any prompt for requesting access.

At the center of FIG. 27, the section viewer 2740 displays the content of each secure digital thread section and ensures that every orchestration script code, code comment, and text block is updated based on the data of the DE models that are linked to it. The model data and associated security access may be provided through model splicing, as discussed previously. Lastly, on the right of FIG. 27, the comment pane 2750 exhibits the digital thread comments and may include functionalities for comment sharing and resolution.

Exemplary GUI for Magic Documentation and Digital Threads

FIG. 28 shows a screenshot of an exemplary graphical user interface (GUI) 2800 used with a digital documentation system, in accordance with some embodiments of the present invention. The GUI provides the user of the IDEP with digital documentation capabilities. FIG. 28 shows a browser window header 2802 which includes a document link for easy navigation. Below the header, a domain and security level banner 2804 displays the domain, platform software version, and security level, ensuring that users are aware of the domain they are operating in and the security protocols in place. The security level indicator 2806 displays the user's maximum security access level within the platform (e.g., "Level 1").

The interface also includes a search bar 2812, allowing the user to carry out comprehensive cross-platform searches through the IDEP for digital engineering models, files, and documents, thus facilitating efficient retrieval of information across the platform. Adjacent to this, the user & domain field 2810 provides information on the user's domain (e.g., client name). The user and domain field may allow the user to login and to access user profile and subscription information.

The top menu of the GUI offers additional functionalities. For example, the document name field 2820 displays the document's name, and may include its version. The document security level indicator 2822 displays the security level (e.g., "Level 1") of the document being accessed. In one embodiment, using an expandable security level menu adjacent to the document security level indicator 2822, the user may select the document's target security access level "view", thus filtering only the parts of the document accessible through a given security level. In other embodiments, the user may also use the document security level indicator 2822 to down-select the security level while sharing the document, thus sharing portions of the document that correspond to the specified security level. Only security access levels below the user's security level (e.g., "Level 1" in FIG. 28) would be available for the user to view and share. The user interface buttons 2824 include options to request access to all models related to this document, or email review information to a stakeholder.

The granular dynamic info security tags (e.g., 2806 and 2822, and the like) are an important but optional element of the digital documentation system and its associated GUI. The model splicer and the IDEP system enable the granular dynamic information security tags 2806 and 2822. In some embodiments, the digital documentation system uses metadata of DE models or documents to cross-reference against authorizations, licenses, or regulations to update. In some embodiments, the granular dynamic information security tags 2806 and 2822 are dynamic, and are refreshed ahead of any document updates to confirm the right authenticated user has the right authorized access to the digital artifacts and data to perform or view the updates.

For document organization and navigation, the GUI features a document outline viewer 2830 on the left of FIG. 28, providing links to the document's headers and paragraphs and/or sections. Within the outline viewer 2830, a digital thread viewer 2832 shows sections of the document along with the linked digital engineering (DE) model(s), the source IT domain, and the last update timestamp, each tagged with the appropriate security level (e.g., "L1"). In some examples, if sections of a document contain content requiring a higher security level for viewing, the user may be presented with an option to request access. Were the user to request such access, an authorized user with access at a higher security level is notified for their review. In other examples, if sections of a document contain content requiring a higher security level for viewing, such sections will not be shown for display, nor provide the user with any prompt for requesting access.

At the center of FIG. 28, the section viewer 2840 displays the content of each document section and ensures that every paragraph is updated based on the data of the DE models that are linked to it. The model data and associated security access may be provided through model splicing, as discussed previously. Lastly, on the right of FIG. 28, a digital thread metadata pane 2850 lists digital thread execution/transaction information. In some embodiments, such digital thread execution event logs may be stored separately in a companion magic document for auditing purposes.

Machine Learning (ML) and Neural Networks

Machine learning (ML) algorithms are characterized by the ability to improve their performance at a task over time without being explicitly programmed with the rules to perform that task (i.e., learn). An ML model is the output generated when a ML algorithm is trained on data. As described herein, embodiments of the present invention use one or more artificial intelligence (AI) and ML algorithms to perform API endpoint recommendation, digital thread updating, and/or digital thread generation. Various exemplary ML algorithms are within the scope of the present invention. The following description describes illustrative ML techniques for implementing various embodiments of the present invention.

Neural Networks

A neural network is a computational model comprising interconnected units called "neurons" that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 29 describes neural network operation fundamentals, according to exemplary embodiments of the present invention.

FIG. 29 shows a single-layered neural network, also known as a single-layer perceptron. The operation of a single-layered neural network involves the following steps:

1. Input: Receiving a DE input vector v 2904 with elements $v_j$, with $j \in [1, n]$ representing the $j^{th}$ DE input, and where each element of the vector corresponds to an element 2906 in the input layer. For an exemplary neural network model (e.g., to implement a recommender engine that recommends API endpoints to generate a digital thread) trained to determine whether a target API endpoint is to be recommended based on user input, the DE input vector v 2904 may take the form of a user prompt. A DE input can be a user prompt, a DE document, a DE model, DE program code, system data from the IDEP, and/or any useful form of data in digital engineering.

2. Transfer Function: Multiplying each element of the DE input vector by a corresponding weight $w_j$ 2908. These weighted inputs are then summed together as the transfer function, yielding the net input to the activation function $\Sigma_{j=1}^{n} v_j \cdot w_j$ 2910.

Each neuron in a neural network may have a bias value 2912, which is added to the weighted sum of the inputs to that neuron. Both the weights and bias values are learned during the training process. The purpose of the bias is to provide every neuron with a trainable constant value that can help the model fit the data better. With biases, the net input to the activation function is $\Sigma_{j=1}^{n} \{v_j \cdot w_j\} + b$.

In the exemplary neural network model described above (e.g., to implement an API endpoint recommender engine), the value of the transfer function 2910 may represent the probability that the target API endpoint will be recommended.

3. Activation Function: Passing the net input through an activation function 2914. The activation function σ determines the activation value o 2918, which is the output of the neuron. It is typically a non-linear function such as a sigmoid or ReLU (Rectified Linear Unit) function. The threshold θ 2916 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

In the exemplary neural network model described above (e.g., to implement an API endpoint recommender engine), the activation function σ 2914 may be a ReLU that is activated at a threshold θ 2916 representing the minimum probability for the target API endpoint to be recommended. Hence, the activation function 2914 will yield a positive recommendation when the recommendation likelihood exceeds the threshold θ 2916.

4. Output: The activation value o 2918 is the output of the activation function. This value is what gets passed on to the next layer in the network or becomes the final DE output in the case of the last layer. In the exemplary neural network model described above (e.g., to implement an API endpoint recommender engine), the activation value o 2918 is a DE output that is a boolean or binary parameter taking a positive value when the target API endpoint is to be recommended and a negative value otherwise. A DE output can be a DE document, a DE model, DE program code, or any useful form of data in digital engineering.

In the exemplary neural network discussions of FIG. 29, examples are provided with respect to a particular API endpoint recommender engine implementation using neural networks. Analogous approaches can be used to implement a digital thread generator engine and any other NN-based components of the systems and subsystems described herein.

FIG. 30 shows an overview of an IDEP neural network training process, in accordance with some embodiments of the present invention.

The training of the IDEP neural network involves repeatedly updating the weights and biases 3010 of the network to minimize the difference between the predicted output 3004 and the true or target output 3006, where the predicted output 3004 is the result produced by the network when a set of inputs from a dataset is passed through it. The predicted output 3004 of an IDEP neural network 3002 corresponds to the DE output 2918 of the final layer of the neural network. The true or target output 3006 is the true desired result. The difference between the predicted output and the true output is calculated using a loss function 3008, which quantifies the error made by the network in its predictions.

The loss function is a part of the cost function 3008, which is a measure of how well the network is performing over the whole dataset. The goal of training is to minimize the cost function 3008. This is achieved by iteratively adjusting the weights and biases 3010 of the network in the direction that leads to the steepest descent in the cost function. The size of these adjustments is determined by the learning rate 3008, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

For an IDEP neural network model 3002 based on the exemplary neural network model (e.g., to implement an API endpoint recommender engine) discussed above in the context of FIG. 29, and trained to determine whether a target API endpoint is to be recommended for the generation of a digital thread based on user instructions:

- the weights and biases 3010 are the IDEP neural network's hyperparameters that get updated at each iteration of the training process, as discussed in the context of FIG. 29,
- the predicted output 3004 is the binary prediction on whether the target API endpoint is to be recommended based on a sample user prompt, (or a normalized score ranking prioritizing the order of API endpoints to be recommended),
- the true/target output 3006 is the correct decision (i.e., sample ground truth output) on whether to recommend the target API endpoint based on the sample user prompt,
- the loss function 3008 is the difference between the evaluation and the true output (e.g., a binary error indicating whether the IDEP neural network's decision was correct),
- the cost function 3008 is the average of all errors over a training dataset including sample user prompts and corresponding binary recommendations on the target API endpoint, and
- the learning rate 3008 is the rate at which the cost function 3008 in consecutive training epochs approaches a pre-specified tolerable cost function.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 3010 of the network based on the error (e.g., cost function) 3008 of the output. After forward propagation through the IDEP neural network 3002, the output 3004 of the network is compared with true output 3006, and the error 3008 is calculated. This error is then propagated back through the network, starting from the output layer and moving towards the input layer. The weights and biases 3010 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

FIG. 31 provides additional details on the training process or an IDEP machine learning model, according to exemplary embodiments of the present invention.

Transformer Model Architecture

The transformer architecture is a neural network design that was introduced in the paper "*Attention is All You Need*" by Vaswani et al. published in June 2017 (available at https://arxiv.org/abs/1706.03762), and incorporated herein by reference as if fully set forth herein. Large Language Models (LLMs) heavily rely on the transformer architecture.

The architecture (see FIG. 1 in Vaswani et al.) is based on the concept of "attention", allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens". This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding", transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding". Therefore, the training of a neural network and its evaluation (i.e., its use upon deployment) both occur within the embeddings space.

In this document, the processes of tokenization, encoding, decoding, and de-tokenization may be assumed. In other words, the processes described below occur in the "embeddings space". Hence, while the tokenization and encoding of training data and input prompts may not be represented or discussed explicitly, they may nevertheless be implied. Similarly, the decoding and de-tokenization of neural network outputs may also be implied.

Training and Fine-Tuning Machine Learning (ML) Modules

FIG. 31 is an illustrative flow diagram showing the different phases and datasets involved in training an IDEP ML model, according to exemplary embodiments of the present invention.

The training process starts at step 3110 with DE data acquisition, retrieval, assimilation, or generation. At step 3120, acquired DE data are pre-processed, or prepared. At step 3130, the IDEP ML model is trained using training data 3125. At step 3140, the IDEP ML model is evaluated, validated, and tested, and further refinements to the IDEP ML model are fed back into step 3130 for additional training. Once its performance is acceptable, at step 3150, optimal IDEP ML parameters are selected.

Training data 3125 is a dataset containing multiple instances of system inputs (e.g., user inputs, user prompts, database digital threads and/or magic docs, etc.) and correct outcomes (e.g., digital thread, digital thread section, code block, text block, API endpoints, etc.). It trains the IDEP ML model to optimize the performance for a specific target task, such as the prediction of a specific target output data field within a specific target document. In FIG. 31, training data 3125 may also include subsets for validating and testing the IDEP ML model, as part of the training iterations 3130 and 3140. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 3125 may be expanded via a document database augmentation process.

In some embodiments, an additional fine-tuning 3160 phase including iterative fine-tuning 3160 and evaluation, validation, and testing 3170 steps, is carried out using fine-tuning data 3155. Fine-tuning in machine learning is a process that involves taking a selected 3150 pre-trained model and further adjusting or "tuning" its parameters to better suit a specific task or fine-tuning dataset 3155. This technique is particularly useful when dealing with deep learning models that have been trained on large, general training datasets 3125 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 3125, such as ImageNet (available at https://image-net.org/) for image recognition tasks. The model's existing weights, which have been learned from the original training, serve as the starting point. During fine-tuning, the model is trained further on a new fine-tuning dataset 3155, which may contain different classes or types of data than the original training set. This additional training phase allows the model to adjust its weights to better capture the characteristics of the new fine-tuning dataset 3155, thereby improving its performance on the specific task it is being fine-tuned for.

In some embodiments, additional test and validation 3180 phases are carried out using DE test and validation data 3175. Testing and validation of a ML model both refer to the process of evaluating the model's performance on a separate dataset 3175 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the IDEP ML model is trained 3130, selected 3150, and optionally fine-tuned 3160 and validated/tested 3180, the process ends with the deployment 3190 of the IDEP ML model. Deployed IDEP ML models 3195 usually receive new DE data 3185 that was pre-processed 3180.

In machine learning, data pre-processing 3120 is tailored to the phase of model development. During model training 3130, pre-processing involves cleaning, normalizing, and transforming raw data into a format suitable for learning patterns. For fine-tuning 3160, pre-processing adapts the data to align with the distribution of the specific targeted task, ensuring the pre-trained model can effectively transfer its knowledge. Validation 3180 pre-processing mirrors that of training to accurately assess model generalization without leakage of information from the training set. Finally, in deployment 3190, pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*", by S. Raschka (posted Feb. 7, 2023, available at https://sebastianraschka.com/blog/2023/llm-reading-list.html), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances (e.g., intent input and DE model file representations) and output instances (eg., API endpoint recommendations, finalized orchestration scripts and/or magic docs), or may be generated synthetically by subject matter exports.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be cloud-based, and in direct or indirect communication with, for example, one another over the same or different wired or wireless networks. All of these devices, including servers, clients, and other computing entities or nodes may be run internally by a customer (in various architecture configurations including private cloud), internally by the provider of the IDEP (in various architecture configurations including private cloud), and/or on the public cloud.

FIG. 32 provides illustrative schematics of a server (management computing entity) 3210 connected via a network 3220 to a client (user computing entity) 3230 used for documentation within an interconnected digital engineering platform (IDEP), according to some embodiments of the present invention. While FIG. 32 illustrates the various system entities as separate, standalone entities, the various embodiments are not limited to this particular architecture. Additionally, the terms "client device", "client computing entity", "edge device", and "edge computing system" are equivalent and are used interchangeably herein.

Exemplary Management Computing Entity

An illustrative schematic is provided in FIG. 32 for a server or management computing entity 3210. In general, the terms computing entity, computer, entity, device, system, and/or similar words used herein interchangeably may refer to, for example, one or more cloud servers, computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, crawling, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably), as they are used in a digital engineering process.

In one embodiment, management computing entity 3210 may be equipped with one or more communication interfaces 3212 for communicating with various computing entities, such as by exchanging data, content, and/or information (similar terms used herein interchangeably) that can be transmitted, received, operated on, processed, displayed, stored, and/or the like. For instance, management computing entity 3210 may communicate with one or more client computing devices such as 3230 and/or a variety of other computing entities. Network or communications interface 3212 may support various wired data transmission protocols including, but not limited to, Fiber Distributed Data Interface (FDDI), Digital Subscriber Line (DSL), Ethernet, Asynchronous Transfer Mode (ATM), frame relay, and data over cable service interface specification (DOCSIS). In addition, management computing entity 3210 may be capable of wireless communication with external networks, employing any of a range of standards and protocols, including but not limited to, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

As shown in FIG. 32, in one embodiment, management computing entity 3210 may include or be in communication with one or more processors 3214 (also referred to as processors and/or processing circuitry, processing elements, and/or similar terms used herein interchangeably) that communicate with other elements within management computing entity 3210, for example, via a bus. As will be understood, processor 3214 may be embodied in a number of different ways. For example, processor 3214 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. The term circuitry may refer to an entire hardware embodiment or a combination of hardware and computer program products. Thus, processor 3214 may be embodied as integrated circuits (ICs), application-specific integrated circuits (ASICs), field-programmable gate arrays (FPGAs), programmable logic arrays (PLAs), hardware accelerators, other circuitry, and/or the like. As will therefore be understood, processor 3214 may be configured for a particular use or configured to execute instructions stored in volatile or non-volatile (or non-transitory) media 3216 and 3218, or otherwise accessible to processor 3214. As such, whether configured by hardware or computer program products, or by a combination thereof, processor 3214 may be capable of performing steps or operations according to embodiments of the present disclosure when configured accordingly.

In one embodiment, management computing entity 3210 may further include or be in communication with non-transitory memory 3218 (also referred to as non-volatile media, non-volatile storage, non-transitory storage, physical storage media, memory, memory storage, and/or memory circuitry-similar terms used herein interchangeably). In one embodiment, the non-transitory memory or storage may include one or more non-transitory memory or storage media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store cloud storage buckets, databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, management computing entity 3210 may further include or be in communication with volatile memory 3216 (also referred to as volatile storage, memory, memory storage, memory and/or circuitry-similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, processor 3214. Thus, the cloud storage buckets, databases, database instances, database management systems, data, applications, programs, program modules, scripts, source code, object code, byte code, compiled code, interpreted code, machine code, executable instructions, and/or the like may be used to control certain aspects of the operation of management computing entity 3210 with the assistance of processor 3214 and an operating system.

Although not shown, management computing entity 3210 may include or be in communication with one or more input elements, such as a keyboard input, a mouse input, a touch screen/display input, motion input, movement input, audio input, pointing device input, joystick input, keypad input, and/or the like. Management computing entity 3210 may also include or be in communication with one or more output elements, also not shown, such as audio output, visual output, screen/display output, motion output, movement output, spatial computing output (e.g., virtual reality or augmented reality), and/or the like.

As will be appreciated, one or more of the components of management computing entity 3210 may be located remotely from other management computing entity components, such as in a distributed system. Furthermore, one or more of the components may be combined and additional components performing functions described herein may be included in management computing entity 3210. Thus, management computing entity 3210 can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial user such as algorithms, artificial intelligence, or other software that interfaces, and/or the like. FIG. 32 further provides an illustrative schematic representation of a client user computing entity 3230 that may be used in conjunction with embodiments of the present disclosure. In various embodiments, computing device 3230 may be a general-purpose computing device with dedicated modules for performing digital engineering-related tasks. It may alternatively be implemented in the cloud, with logically and/or physically distributed architectures.

As shown in FIG. 32, user computing entity 3230 may include a power source 3231, an antenna 3270, a radio transceiver 3232, a network and communication interface 3234, and a processor unit 3240 that provides signals to and receives signals from the network and communication interface. The signals provided to and received may include signaling information in accordance with air interface standards of applicable wireless systems. In this regard, user computing entity 3230 may be capable of operating with one or more air interface standards, communication protocols, modulation types, and access types. More particularly, user computing entity 3230 may operate in accordance with any of a number of wireless communication standards and protocols, such as those described above with regard to management computing entity 3210. Similarly, user computing entity 3230 may operate in accordance with multiple wired communication standards and protocols, such as those described above with regard to management computing entity 3210.

Via these communication standards and protocols, user computing entity 3230 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 3230 may also download changes, add-ons, and updates, for instance, to its firmware, software (e.g., including executable instructions, applications, program modules), and operating system.

In some implementations, processing unit 3240 may be embodied in several different ways. For example, processing unit 3240 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. Further, processing unit 3240 may be embodied as one or more other processing devices or circuitry. The term circuitry may refer to an entirely hardware embodiment or a combination of hardware and computer program products. Thus, processing unit 3240 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 3240 may be configured for a particular use or configured to execute instructions stored in volatile or non-volatile media or otherwise accessible to the processing unit. As such, whether configured by hardware or computer program products, or by a combination thereof, processing unit 3240 may be capable of performing steps or operations according to embodiments of the present invention when configured accordingly.

In some embodiments, processing unit 3240 may comprise a control unit 3242 and a dedicated arithmetic logic unit (ALU) 3244 to perform arithmetic and logic operations. In some embodiments, user computing entity 3230 may comprise a graphics processing unit (GPU) 3246 for specialized parallel processing tasks, and/or an artificial intelligence (AI) module or accelerator 3248, also specialized for applications including artificial neural networks and machine learning. In some embodiments, processing unit 3240 may be coupled with GPU 3246 and/or AI accelerator 3248 to distribute and coordinate digital engineering related tasks.

In some embodiments, computing entity 3230 may include a user interface, comprising an input interface 3250 and an output interface 3252, each coupled to processing unit 3240. User input interface 3250 may comprise any of a number of devices or interfaces allowing computing entity 3230 to receive data, such as a keypad (hard or soft), a touch display, a mic/speaker for voice/speech/conversation, a camera for motion or posture interfaces, and appropriate sensors for spatial computing interfaces. User output interface 3252 may comprise any of a number of devices or interfaces allowing computing entity 3230 to provide information to a user, such as through the touch display, or a speaker for audio outputs. In some embodiments, output interface 3252 may connect computing entity 3230 to an external loudspeaker or projector, for audio and/or visual output. In some embodiments, user interfaces 3250 and 3252 integrate multimodal data in an interface that caters to human users. Some examples of human interfaces include a dashboard-style interface, a workflow-based interface, conversational interfaces, and spatial-computing interfaces. As shown in FIG. 5, computing entity 3230 may also support bot/algorithmic interfaces such as code interfaces, text-based API interfaces, and the like.

User computing entity 3230 can also include volatile and/or non-volatile storage or memory 3260, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory 3260 may store an operating system 3262, application software 3264, data 3266, databases, database instances, database management systems, data, applications, programs, program modules, scripts, source code, object code, byte code, compiled code, interpreted code, machine code, executable instructions, and/or the like to implement functions of user computing entity 3230. As indicated, this may include a user application that is resident on the entity or accessible through a browser or other user interface for communicating with management computing entity 3210 and/or various other computing entities.

In some embodiments, user computing entity 3230 may include one or more components or functionalities that are the same or similar to those of management computing entity 3210, as described in greater detail above. As will be recognized, these architectures and descriptions are provided for exemplary purposes only and are not limited to the various embodiments.

In some embodiments, computing entities 3210 and/or 3230 may communicate to external devices like other computing devices and/or access points to receive information such as software or firmware, or to send information from the memory of the computing entity to external systems or devices such as servers, computers, smartphones, and the like.

In some embodiments, two or more computing entities such as 3210 and/or 3230 may establish connections using a network such as 3220 utilizing any of the networking protocols listed previously. In some embodiments, the computing entities may use network interfaces such as 3212 and 3234 to communicate with each other, such as by communicating data, content, information, and/or similar terms used herein interchangeably that can be transmitted, received, operated on, processed, displayed, stored, and/or the like.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "processor", "computer," "data processing apparatus", and the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, code, program code, and the like) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a backend component, e.g., as an information/data server, or that includes a middleware component, e.g., an application server, or that includes a frontend component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "program code," "computer program(s)", "computer code(s)," and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes parameters, etc., to provide a thorough understanding of the present invention. The particular features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom. Features of the transitory physical storage medium described may be incorporated into/used in a corresponding method, digital documentation system and/or system, and vice versa.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. A non-transitory physical storage medium storing program code, the program code executable by a hardware processor to cause the hardware processor to execute a computer-implemented process for generating a software-code-defined digital thread, the program code comprising code to:
    train a script-generating machine learning (ML) model using a training dataset comprising a set of training triplets, each of the training triplets comprising a sample intent input, a corresponding sample model representation set, and a corresponding sample platform orchestration script, wherein the sample platform orchestration script connects models within the corresponding sample model representation set to accomplish the corresponding sample intent input;
    receive a first model representation of a first engineering model,
    receive a second model representation of a second engineering model:
    receive an intent input, wherein the intent input is selected from the group consisting of a user action on an interconnected digital engineering platform, a user prompt, an existing software-code-defined digital thread, and a request from a software agent on the interconnected digital engineering platform;
    generate, using the script-generating ML model, a platform orchestration script connecting the first model representation and the second model representation based on the intent input, wherein the platform orchestration script accomplishes the intent input;
    store the platform orchestration script as the software-code-defined digital thread; and
    wherein the platform orchestration script, when executing, invokes one or more Application Programming Interface (API) or Software Development Kit (SDK) endpoints associated with the first model representation and/or with the second model representation, wherein the API or SDK endpoints provide a unified programming interface to model representations generated from the first and/or the second engineering models.

2. The non-transitory physical storage medium of claim 1, further comprising the program code to:
    receive a feedback data on the platform orchestration script; and
    train and/or fine-tune the script-generating ML model based on the feedback data.

3. The non-transitory physical storage medium of claim 1, further comprising the program code to:
    provide a user interface coding environment in an interconnected digital engineering platform (IDEP);
    receive a plurality of user selections of the first engineering model and the second engineering model, wherein the first engineering model and the second engineering model were selected by a user,
    receive a plurality of corresponding model representations from the first engineering model and the second engineering model;
    receive a user-defined code for a user-defined platform orchestration script;
    determine and/or receive a corresponding intent input;
    determine corresponding model representation endpoints used in the user-defined code from the user-defined platform orchestration script;
    record the first and the second engineering models, the first and the second model representations, the corresponding intent input, and the corresponding model representation endpoints, and the user-defined platform orchestration script to generate the training dataset; and
    store the training dataset for training the script-generating ML model.

4. The non-transitory physical storage medium of claim 1, wherein the connecting the first model representation and the second model representation based on the intent input comprises linking a first endpoint of the first model representation and a second endpoint of the second model representation based on the intent input.

5. The non-transitory physical storage medium of claim 4, further comprising the program code to:
    evaluate, using a sufficiency machine learning (ML) model, the first engineering model and the second engineering model within an interconnected digital engineering platform (IDEP) for sufficiency for accomplishing the intent input.

6. The non-transitory physical storage medium of claim 5, further comprising the program code to:
    determine, using a recommender ML model or the script-generating ML model, a first endpoint in the first model representation that is relevant to the intent input, in response to sufficiency being determined.

7. The non-transitory physical storage medium of claim 6, further comprising the program code to:
    determine, using the recommender ML model, a relationship between the first endpoint and the second endpoint based on the intent input.

8. The non-transitory physical storage medium of claim 1, wherein the platform orchestration script comprises scripting code to read data from the first model representation and/or the second model representation.

9. The non-transitory physical storage medium of claim 1, wherein the platform orchestration script comprises scripting code to write data to the first model representation and/or the second model representation.

10. The non-transitory physical storage medium of claim 1, wherein the platform orchestration script comprises scripting code to read data from the first model representation, execute a computation on the data, and write a result of the computation to the first model representation and/or the second model representation.

11. The non-transitory physical storage medium of claim 1, further comprising the program code to:
receive a third model representation of a third engineering model,
wherein the platform orchestration script further links the first and/or the second model representation with the third model representation.

12. The non-transitory physical storage medium of claim 1, further comprising the program code to:
determine, using an Artificial Intelligence (AI) algorithm, a recommended third engineering model based on the first engineering model, the second engineering model and the training dataset.

13. The non-transitory physical storage medium of claim 1, wherein the first engineering model and/or the second engineering model is a document file that is human-readable.

14. The non-transitory physical storage medium of claim 13, further comprising the program code to:
receive a document template;
analyze the document template using an interconnected digital engineering platform (IDEP);
determine, using an Artificial Intelligence (AI) model, output data from the first model representation and/or the second model representation required to generate the document file;
execute appropriate actions on the first model representation and/or the second model representation using a predetermined sequence based on requirements of the document template to generate output required for the document file, and
generate the document file by assembling the document template and the output from the first model representation and/or the second model representation.

15. The non-transitory physical storage medium of claim 1, further comprising the program code to:
predict a change in one or more items selected from the group consisting of the first model representation of the first engineering model and the second model representation of the second engineering model based on a change in one of the items selected from the group consisting of the first model representation of the first engineering model and the second model representation of the second engineering model.

16. The non-transitory physical storage medium of claim 1, further comprising the program code to:
predict a change in the first model representation of the first engineering model based on a change in the second model representation of the second engineering model.

17. The non-transitory physical storage medium of claim 1, further comprising the program code to:
call a second software-code-defined digital thread.

18. The non-transitory physical storage medium of claim 1, wherein one of the first engineering model and/or the second engineering model comprises a neural network model.

19. The non-transitory physical storage medium of claim 1, further comprising the program code to:
generate, using an Artificial Intelligence (AI) model, a magic document associated with the software-code-defined digital thread, wherein the magic document comprises API endpoints to human-readable text blocks, and wherein the magic document is updated, using the API endpoints, with an audit log in response to an execution of at least a portion of the platform orchestration script.

20. The non-transitory physical storage medium of claim 1, wherein the platform orchestration script comprises a code block, wherein the code block is associated with an information security tag, and wherein the information security tag indicates a restriction on executing the code block.

21. The non-transitory physical storage medium of claim 1, wherein the first model representation is a first model splice, and further comprising the program code to generate the first model splice of the first engineering model, utilizing the program code to:
receive a first engineering model file of the first engineering model having a Digital Engineering (DE) model type, wherein the first engineering model file is in a native file format;
extract model data from the first engineering model file in the native file format;
store the model data in a model data storage area;
generate one or more external, commonly-accessible splice functions that enable external access to one or more digital artifacts derived from the model data stored in the model data storage area, wherein the one or more external, commonly-accessible splice functions provide addressable Application Programming Interface (API) or Software Development Kit (SDK) endpoints that are accessible by third-party applications and users, and wherein the API or SDK endpoints enable access to the digital artifacts without access to an entirety of the first engineering model file and without requiring direct engagement by the third-party applications and users with a DE tool associated with the DE model type; and
generate the first model splice of the first engineering model, wherein the first model splice comprises access to a selective portion of the one or more digital artifacts, wherein the first model splice comprises access to at least one of the external commonly-accessible splice functions, wherein the first model splice is accessible via the API or SDK endpoints by the third-party applications and users.

22. A computer-implemented method for generating a software-code-defined digital thread, comprising:
training a script-generating machine learning (ML) model using a training dataset comprising a set of training triplets, each of the training triplets comprising a sample intent input, a corresponding sample model representation set, and a corresponding sample platform orchestration script, wherein the sample platform orchestration script connects the corresponding sample model representation set to accomplish the corresponding sample intent input;
receiving a first model representation of a first engineering model;
receiving a second model representation of a second engineering model:
receiving an intent input, wherein the intent input is selected from the group consisting of a user action on an interconnected digital engineering platform, a user prompt, an existing software-code-defined digital thread, and a request from a software agent on the interconnected digital engineering platform;

generating, using the script-generating ML model, a platform orchestration script connecting the first model representation and the second model representation based on the intent input, wherein the platform orchestration script accomplishes the intent input;

storing the platform orchestration script as the software-code-defined digital thread; and wherein the platform orchestration script, when executing, invokes one or more Application Programming Interface (API) or Software Development Kit (SDK) endpoints associated with the first model representation and/or with the second model representation, wherein the API or SDK endpoints provide a unified programming interface to model representations generated from the first and/or the second engineering models.

* * * * *